(12) United States Patent
Purpura

(10) Patent No.: US 10,171,632 B2
(45) Date of Patent: *Jan. 1, 2019

(54) CONTROLLING CLIENT ACCESS TO A SERVER APPLICATION

(71) Applicant: INTERNATIONAL BUSINESS MACHINES CORPORATION, Armonk, NY (US)

(72) Inventor: Robert J. Purpura, Naperville, IL (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/814,459

(22) Filed: Nov. 16, 2017

(65) Prior Publication Data

US 2018/0077265 A1    Mar. 15, 2018

Related U.S. Application Data

(60) Division of application No. 14/319,218, filed on Jun. 30, 2014, now Pat. No. 9,854,067, which is a continuation of application No. 11/938,394, filed on Nov. 12, 2007, now Pat. No. 8,832,286.

(51) Int. Cl.
*H04L 29/06* (2006.01)
*H04L 29/08* (2006.01)
*H04L 12/26* (2006.01)

(52) U.S. Cl.
CPC ............. *H04L 67/42* (2013.01); *H04L 43/16* (2013.01); *H04L 63/10* (2013.01); *H04L 63/102* (2013.01); *H04L 67/22* (2013.01); *G06F 2201/86* (2013.01); *G06F 2201/87* (2013.01); *G06F 2201/875* (2013.01); *G06F 2201/88* (2013.01)

(58) Field of Classification Search
USPC ................................ 709/229, 226, 203, 200
See application file for complete search history.

(56) References Cited

U.S. PATENT DOCUMENTS

| | | | |
|---|---|---|---|
| 6,018,519 | A | 1/2000 | Ginzboorg |
| 7,032,026 | B1 | 4/2006 | Biswas et al. |
| 7,577,239 | B1 | 8/2009 | Shim et al. |

(Continued)

OTHER PUBLICATIONS

Amendment After Notice of Appeal filed Jan. 29, 2010 on U.S. Appl. No. 11/938,394, filed Nov. 12, 2007; Confirmation No. 3901.

(Continued)

*Primary Examiner* — El Hadji M Sall
(74) *Attorney, Agent, or Firm* — Schmeiser, Olsen & Watts; William H. Hartwell

(57) ABSTRACT

An approach is provided for controlling a rate at which requests from a client computer will be received by a server application executed on a server computer. Requests are received by the server computer at different times from the client computer and time intervals between different pairs of successive requests are measured. The server computer determines that each time interval is within a predefined range of time intervals. Based on each time interval being within the predefined range, the server computer determines and blocks a denial of service attack or an overload of requests from the client computer.

19 Claims, 36 Drawing Sheets

(56) References Cited

U.S. PATENT DOCUMENTS

| | | |
|---|---|---|
| 8,832,286 B2 | 9/2014 | Purpura |
| 2002/0042828 A1 | 4/2002 | Peiffer |
| 2004/0236966 A1 | 11/2004 | D'Souza et al. |
| 2005/0086530 A1 | 4/2005 | Goddard |
| 2005/0108551 A1 | 5/2005 | Toomey |
| 2005/0114673 A1 | 5/2005 | Raikar et al. |
| 2005/0188423 A1 | 8/2005 | Motsinger et al. |
| 2006/0037064 A1 | 2/2006 | Jeffries et al. |
| 2006/0062146 A1 | 3/2006 | Sebire et al. |
| 2006/0130140 A1 | 6/2006 | Andreev et al. |
| 2006/0236402 A1 * | 10/2006 | Russell ............... H04L 63/1458 726/25 |
| 2007/0081554 A1 | 4/2007 | Saffre |
| 2009/0125632 A1 | 5/2009 | Purpura |
| 2014/0317178 A1 | 10/2014 | Purpura |

OTHER PUBLICATIONS

Amendment filed Mar. 1, 2010 in response to Office Action (dated Sep. 30, 2009) on U.S. Appl. No. 11/938,394, filed Nov. 12, 2007; Confirmation No. 3901.

Appeal Brief filed Nov. 1, 2010 on U.S. Appl. No. 11/938,394, filed Nov. 12, 2007; Confirmation No. 3901.

Examiner's Answer (Mail Date Jan. 14, 2011) in response to Appeal Brief filed Nov. 1, 2010 on U.S. Appl. No. 11/938,394, filed Nov. 12, 2007; Confirmation No. 3901.

Final Office Action (dated Mar. 1, 2010) on U.S. Appl. No. 11/938,394, filed Nov. 12, 2007; Confirmation No. 3901.

Notice of Allowance (dated Apr. 25, 2014) on U.S. Appl. No. 11/938,394, filed Nov. 12, 2007; Confirmation No. 3901.

Notice of Appeal filed Sep. 1, 2010 on U.S. Appl. No. 11/938,394, filed Nov. 12, 2007; Confirmation No. 3901.

Office Action (dated Sep. 30, 2009) on U.S. Appl. No. 11/938,394, filed Nov. 12, 2007; Confirmation No. 3901.

Patent Board Decision—Examiner Reversed (Mail Date Feb. 5, 2014) on U.S. Appl. No. 11/938,394, filed Nov. 12, 2007; Confirmation No. 3901.

Reply Brief filed Mar. 14, 2011 in response to Examiner's Answer to Appeal Brief (Mail Date Jan. 14, 2011) on U.S. Appl. No. 11/938,394, filed Nov. 12, 2007; Confirmation No. 3901.

Office Action (dated Sep. 21, 2016) on U.S. Appl. No. 14/319,218, filed Jun. 30, 2014; Confirmation No. 4552.

Amendment filed Dec. 20, 2016 in response to Office Action (dated Sep. 21, 2016) on U.S. Appl. No. 14/319,218, filed Jun. 30, 2014; Confirmation No. 4552.

Final Office Action (dated May 5, 2017) on U.S. Appl. No. 14/319,218, filed Jun. 30, 2014; Confirmation No. 4552.

Amendment filed Jul. 5, 2017 in response to Final Office Action (dated May 5, 2017) on U.S. Appl. No. 14/319,21, filed Jun. 30, 2014; Confirmation No. 4552.

Notice of Allowance (dated Sep. 6, 2017) on U.S. Appl. No. 14/319,218, filed Jun. 30, 2014; Confirmation No. 4552.

* cited by examiner

*1000*

| PERFORMANCE LEVEL | TRANSACTION RATE (TRANSACTIONS PER SECOND) | TIME UNTIL HALT (MM:SS) |
|---|---|---|
| 1 | 100 | 00:20 |
| 2 | 50 | 01:00 |
| 3 | 20 | 05:00 |
| 4 | 10 | 20:00 |

| THRESHOLD LEVELS BASED ON TEMPORARY TRANSACTION HALT THRESHOLD = 100,000 | PERCENT OF TEMPORARY TRANSACTION HALT THRESHOLD | ACCUMULATOR VALUE |
|---|---|---|
| WARNING THRESHOLD | 70% | 70,000 |
| DELAY THRESHOLD | 90% | 90,000 |
| PERMANENT ACCESS DENIAL THRESHOLD | 300% | 300,000 |

| OTHER CONTROL PARAMETERS | VALUE |
|---|---|
| RESET TIME INTERVAL IN MM:SS | 01:00 |
| DELAY TIME INTERVAL (SLOWDOWN PAUSE) IN MM:SS | 00:01 |
| CONCURRENT CONNECTION LIMIT PER USER ID/NETWORK ADDRESS | 10 |

| PERFORMANCE LEVEL | TRANSACTIONS UNTIL HALTED |
|---|---|
| 1 | 2000 IN 20 SECONDS |
| 2 | 3000 IN 60 SECONDS |
| 3 | 6000 IN 300 SECONDS |
| 4 | 12000 IN 1200 SECONDS |

| PERFORMANCE LEVEL | TIME INTERVAL BETWEEN TRANSACTIONS (MILLISECONDS) |
|---|---|
| 1 | 10 |
| 2 | 20 |
| 3 | 50 |
| 4 | 100 |

| PERFORMANCE LEVEL | TRANSACTIONS IN 20 SECONDS |
|---|---|
| 1 | 2,000 |
| 2 | 1,000 |
| 3 | 400 |
| 4 | 200 |

| PERFORMANCE LEVEL | TRANSACTIONS IN 60 SECONDS |
|---|---|
| 1 | 2,000 ONLY IN 20 SECONDS |
| 2 | 3,000 |
| 3 | 1,200 |
| 4 | 600 |

| PERFORMANCE LEVEL | TRANSACTIONS IN 300 SECONDS |
|---|---|
| 1 | 2,000 ONLY IN 20 SECONDS |
| 2 | 3,000 ONLY IN 60 SECONDS |
| 3 | 6,000 |
| 4 | 3,000 |

| PERFORMANCE LEVEL | TRANSACTIONS IN 20 MINUTES |
|---|---|
| 1 | 2,000 ONLY IN 20 SECONDS |
| 2 | 3,000 ONLY IN 60 SECONDS |
| 3 | 6,000 ONLY IN 5 MINUTES |
| 4 | 12,000 |

| PERFORMANCE LEVEL | TRANSACTIONS IN 20 MINUTES WITH 1 MINUTE RESET TIME |
|---|---|
| 1 | 30,000 WITH 15 DELAYS |
| 2 | 30,000 WITH 10 DELAYS |
| 3 | 20,400 WITH 3 DELAYS |
| 4 | 12,000 |

| PERFORMANCE LEVEL | ACCUMULATOR ADJUSTMENT VALUES |
|---|---|
| 1 | 50 |
| 2 | 33 |
| 3 | 17 |
| 4 | 8 |

| ARRAY ELEMENT | SOURCE FOR COUNTER IN ARRAY | GROUP |
|---|---|---|
| 1 | LEVEL 1 | 1 |
| 2 | LEVEL 1 + LEVEL 2 | 1 |
| 3 | LEVEL 2 | 2 |
| 4 | LEVEL 1 + LEVEL 3 | 2 |
| 5 | LEVEL 1 + LEVEL 4 | 2 |
| 6 | LEVEL 2 + LEVEL 3 | 3 |
| 7 | LEVEL 3 | 3 |
| 8 | LEVEL 2 + LEVEL 4 | 4 |
| 9 | LEVEL 3 + LEVEL 4 | 4 |
| 10 | LEVEL 4 | 4 |

| CURRENT TRANSACTION INTERVAL LEVEL | GROUP SELECTED | ACCUMULATOR ADJUSTMENT |
|---|---|---|
| 1 | 1 | + ACCUMULATOR ADJUSTMENT VALUE 1 (+50) |
| 1 | 2 | + ACCUMULATOR ADJUSTMENT VALUE 2 (+33) |
| 1 | 3 | + ACCUMULATOR ADJUSTMENT VALUE 3 (+17) |
| 1 | 4 | + ACCUMULATOR ADJUSTMENT VALUE 4 (+8) |
| 2 | 1 | + ACCUMULATOR ADJUSTMENT VALUE 2 (+33) |
| 2 | 2 | + ACCUMULATOR ADJUSTMENT VALUE 2 (+33) |
| 2 | 3 | + ACCUMULATOR ADJUSTMENT VALUE 3 (+17) |
| 2 | 4 | + ACCUMULATOR ADJUSTMENT VALUE 4 (+8) |
| 3 | 1 | - ACCUMULATOR ADJUSTMENT VALUE 1 (-50) |
| 3 | 2 | - ACCUMULATOR ADJUSTMENT VALUE 2 (-33) |
| 3 | 3 | + ACCUMULATOR ADJUSTMENT VALUE 3 (+17) |
| 3 | 4 | + ACCUMULATOR ADJUSTMENT VALUE 4 (+8) |
| 4 | 1 | - ACCUMULATOR ADJUSTMENT VALUE 1 (-50) |
| 4 | 2 | - ACCUMULATOR ADJUSTMENT VALUE 2 (-33) |
| 4 | 3 | - ACCUMULATOR ADJUSTMENT VALUE 3 (-17) |
| 4 | 4 | + ACCUMULATOR ADJUSTMENT VALUE 4 (+8) |
| STEADY STATE | 1 | - ACCUMULATOR ADJUSTMENT VALUE 1 (-50) |
| STEADY STATE | 2 | - ACCUMULATOR ADJUSTMENT VALUE 2 (-33) |
| STEADY STATE | 3 | - ACCUMULATOR ADJUSTMENT VALUE 3 (-17) |
| STEADY STATE | 4 | - ACCUMULATOR ADJUSTMENT VALUE 4 (-8) |
| CURRENT TRANSACTION INTERVAL > RESET TIME INTERVAL | N/A | SET ACCUMULATOR = 0 |

CONTROLLING CLIENT ACCESS TO A SERVER APPLICATION

This application is a divisional application claiming priority to Ser. No. 14/319,218 filed Jun. 30, 2014, now U.S. Pat. No. 9,854,067, issued Dec. 26, 2017, which is a continuation application claiming priority to Ser. No. 11/938,394 filed Nov. 12, 2007, now U.S. Pat. No. 8,832,286 issued Sep. 9, 2014.

FIELD OF THE INVENTION

The present invention relates to a computer-implemented method and a computer system for controlling client access to a server application, and more particularly to a technique for controlling client access to a server application via a warning to a client, a delay of a current transaction, a temporary halt of transaction processing, or a permanent denial of access based on current and accumulated, historical transaction rates associated with user identifiers and network addresses.

BACKGROUND OF THE INVENTION

Any client with the correct target network address and port may send requests to the server, regardless of whether the requests are valid or invalid, and the server must respond to each request. A remote client machine providing a malicious attack or having a non-malicious, internal program logic failure looping condition floods the server with invalid requests that are quickly rejected or repeats the same valid request that requires normal processing. Alternatively, a client application may be designed to periodically download a large subset of the server database with many requests in a short period of time (i.e., in a batch application). Under the aforementioned conditions where high transaction rates exceed the capacity of the server, other legitimate client requests do not obtain access to the server within a reasonable timeframe, effectively making the server unavailable to the rest of the client community. Conventional network monitoring tools detect denial of service attacks, but the tools detect transaction rates at levels that are higher than the transaction rates that overwhelm server applications. Further, each transaction in the client-server environment is a single entity and there is no inherent affinity or memory from one transaction to the next, thereby making it difficult to distinguish a recursive condition sent from one or a few particular clients from the general high traffic from the rest of the client community. Still further, conventional monitoring tools associate transaction rates with a single form of transaction identification (e.g., the IP address of the client machine), and therefore overlook excessive transaction rates related to other forms of identification. Moreover, known network monitoring tools are inflexible because they are limited to responding to excessive transaction rates only through a denial of access. Thus, there exists a need to overcome at least one of the preceding deficiencies and limitations of the related art.

SUMMARY OF THE INVENTION

The present invention provides a computer-implemented method of controlling access to a server application being executed by a server computing unit (a.k.a. server). The server determines a time interval between a time of the server's receipt of a first request and a time of the server's receipt of a second request. The first request and the second request are included in multiple requests for an access to the server application. The server selects an adjustment value from pre-defined adjustment values based on the time interval and based on historical time intervals. Each historical time interval is between the server's receipt times of two requests included in the multiple requests. The receipt times of the two requests are prior to the receipt times of the first request and the second request. The server adjusts an accumulator with the selected adjustment value, which results in a value of the accumulator exceeding a pre-defined threshold. The server controls the access to the server application in response to the value of the accumulator exceeding the pre-defined threshold.

A system and computer program product corresponding to the above-summarized method are also described and claimed herein.

Advantageously, the present invention provides a technique for controlling client access to a server application by sending warnings to clients, pausing a transaction, temporarily halting transactions, or permanently denying access to the server application. Further, the method and system of the present invention ensures that a single client cannot take control of the server's listener port at the exclusion of all other clients.

BRIEF DESCRIPTION OF THE DRAWINGS

FIG. 10 is an exemplary table of performance level transaction rates and amounts of time until access is halted, which are defined in the process of FIGS. 2A-2B, in accordance with embodiments of the present invention.

FIG. 11 is an exemplary table of threshold level values defined in the process of FIGS. 2A-2B, in accordance with embodiments of the present invention.

FIG. 12 is an exemplary table of control parameters defined in the process of FIGS. 2A-2B, in accordance with embodiments of the present invention.

FIG. 13A is an exemplary table of numbers of transactions and an amount of time until access is halted for each performance level, which are determined in the process of FIGS. 2A-2B, in accordance with embodiments of the present invention.

FIG. 13B is an exemplary table of time intervals between transactions, where the time intervals are determined in the process of FIGS. 2A-2B, in accordance with embodiments of the present invention.

FIG. 14A is an exemplary table of numbers of transactions sent within the amount of time for the first performance level in the table of FIG. 13A, in accordance with embodiments of the present invention.

FIG. 14B is an exemplary table of numbers of transactions sent within the amount of time for the second performance level in the table of FIG. 13A, in accordance with embodiments of the present invention.

FIG. 14C is an exemplary table of numbers of transactions sent within the amount of time for the third performance level in the table of FIG. 13A, in accordance with embodiments of the present invention.

FIG. 14D is an exemplary table of numbers of transactions sent within the amount of time for the fourth performance level in the table of FIG. 13A, in accordance with embodiments of the present invention.

FIG. 14E is an exemplary table of numbers of transactions and numbers of delays within the amount of time for the fourth performance level in the table of FIG. 13A, in accordance with embodiments of the present invention.

FIG. 16 is an exemplary table of accumulator adjustment values for each performance level, in accordance with embodiments of the present invention.

FIG. 18 is an exemplary table of the groups into which the set of counters generated in FIG. 17 are categorized in the processes of FIG. 7A and FIG. 8B, in accordance with embodiments of the present invention.

FIG. 21 is an exemplary table of accumulator adjustments as determined by the process of FIGS. 20A-20E, in accordance with embodiments of the present invention.

DETAILED DESCRIPTION OF THE INVENTION

Overview

In a client-server computing environment, the present invention monitors transactions (i.e., requests) sent from clients, where the transactions request access to an application executing on a server. The present invention collects transaction rates relative to user identifiers (user IDs) associated with the requests and transaction rates relative to network addresses (e.g., Internet Protocol (IP) addresses) of the clients. Algorithms relative to user IDs and network addresses determine whether a current transaction rate together with the collected transaction rates results in a warning to a client to slow down transactions, a delay in processing a current transaction, a temporary halting of access to the application, or a permanent denial of access to the application.

The present invention allows full and free server application access for clients that remain within defined performance limits, even allowing for relatively short time intervals of increased transaction rates, while restricting server application access for clients with excessively high transaction rates over time through an escalating formula that dynamically penalizes extreme transaction rates and dynamically rewards reductions in transaction rates.

System for Controlling Client Access to a Server Application

Figure 1:
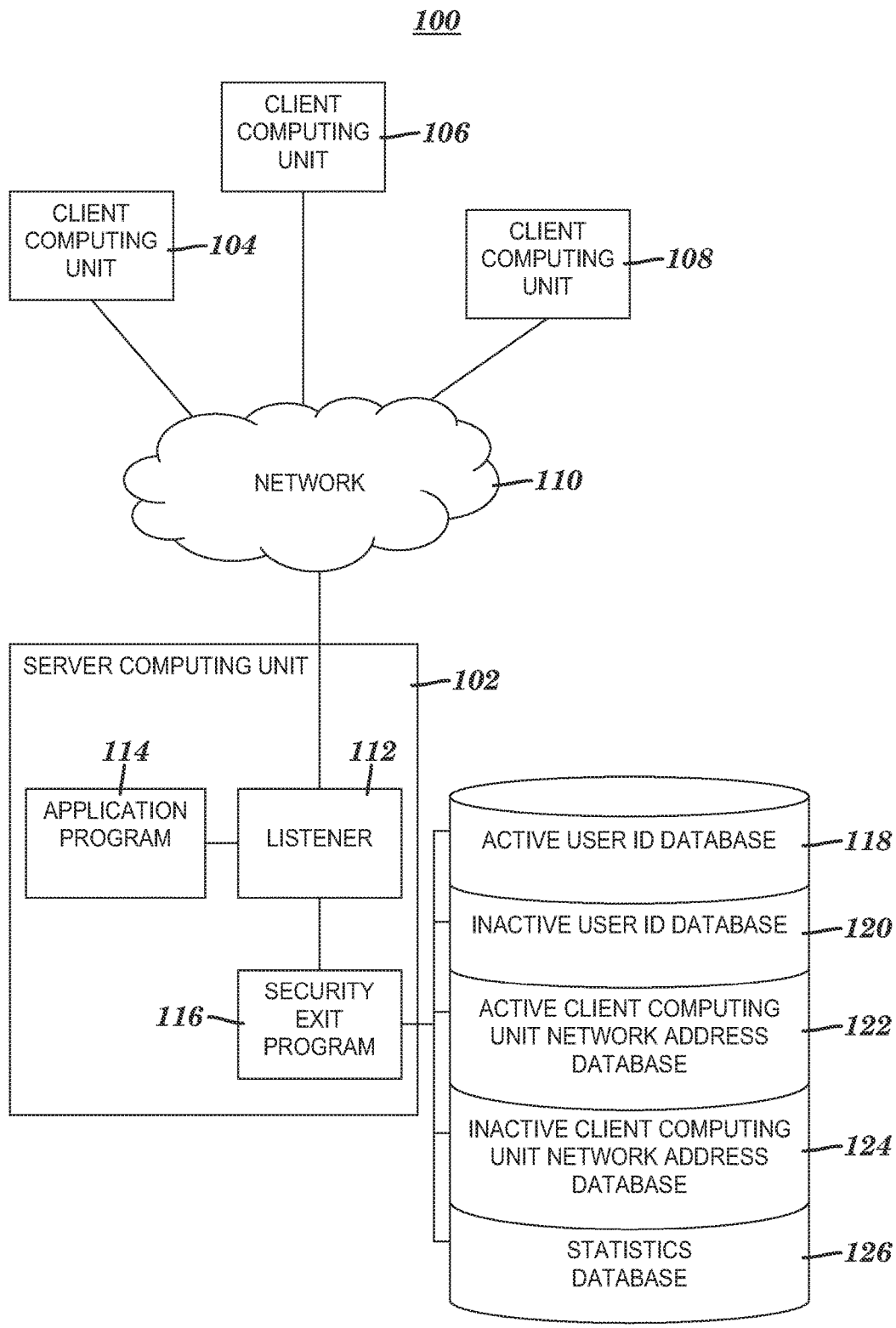
FIG. 1 is a block diagram of a system for controlling client access to a server application, in accordance with embodiments of the present invention.

FIG. 1 is a block diagram of a system for controlling client access to a server application, in accordance with embodiments of the present invention. System 100 includes a server computing unit 102 that includes a central processing unit (not shown) that processes requests (a.k.a. client requests) sent from multiple client computing units 104, 106, 108 via a network 110. An operating system (not shown) controls the flow of the processing of the requests and allows the allocation and sharing of resources of the central processing unit. Network 110 is, for example, the Internet or an intranet.

Server computing unit 102 includes a listener 112, an application program 114 (a.k.a. server application or application), and a security exit program 116. Listener 112 is installed under the operating system and monitors network 110 for client requests being sent to server computing unit 102 from multiple client computing units 104, 106, 108, where a plurality of the client requests are requests for access to application program 114. Listener 112 responds to client requests using a network protocol (e.g., Transmission Control Protocol/Internet Protocol (TCP/IP)). Security exit program 116 includes logic for determining whether to permit a connection (i.e., an access) to application program 114 to a client computing unit in response to the client computing unit's request for accessing application program 114, or whether to terminate the connection between the client computing unit and server computing unit 102.

Unless otherwise noted, the term "client" and the phrase "client computing unit" mentioned herein refer to any one of the multiple client computing units 104, 106, 108 that sends a request to access the application program 114, where the request is received by server computing unit 102 via network 110. Moreover, as used herein, the term "server" refers to server computing unit 102.

To make the determination to permit access or terminate the connection, security exit program 116 populates and utilizes data in active user ID database 118, inactive user ID database 120, active client computing unit network address database 122 (a.k.a. active network address database), inactive client computing unit network address database 124 (a.k.a. inactive network address database) and statistics database 126. The databases in system 100 contain current and accumulated, historical information about client user IDs and network (e.g., TCP/IP) addresses of clients that have previously successfully accessed application program 114 and of clients whose access to application program 114 has been denied. Database 118 is a repository of user IDs that have successfully accessed application program 114 and that have an active status. Database 120 includes user IDs that are being permanently denied access to application program 114 and that have an inactive status.

Database 122 includes network addresses (e.g., IP addresses) that have successfully accessed application program 114 and that have an active status. Database 124 includes network addresses (e.g., IP addresses) that are being permanently denied access to application program 114 and that have an inactive status.

Statistics database 126 includes dynamically customizable performance criteria which are used to determine the limits at which denial of access occurs, as well as warning, delay and temporary halt levels. Performance criteria in database 126 include:

1. Multiple configurable performance levels of monitoring criteria, each performance level consisting of a unique time period (e.g., in minutes and seconds) that a steady (i.e., unchanging) transaction rate (e.g., number of transactions per second) can be run until reaching a pre-defined temporary transaction halt threshold. As one example, four performance levels are defined that range from an extremely high transaction rate (i.e., first level) to a moderately low transaction rate (i.e., fourth level).

2. A range of transaction rates at which no warning, delay, temporary halt, or permanent access denial ever occurs.

3. A percent value of the temporary transaction halt threshold at which the warning return code begins to be sent.

4. A percent value of the temporary transaction halt threshold at which the transaction delay begins to occur.

5. A reset time interval (e.g., in minutes and seconds) that a temporary halt condition is maintained before a user ID or network address is once again permitted to access application program 114.

6. A maximum number of concurrent connections (a.k.a. maximum number of active sessions or concurrent connection limit) for each user ID and for each network address.

Execution of logic in security exit program 116 controls client access to application program 114 by collecting statistical information during each transaction from a client and performing an analysis to determine if the client is making excessive use of server computing unit 102. Since each transaction is stateless (i.e., there is no connectivity or affinity from one transaction to another), the logic of security exit program 116 makes a client access determination from the transactions from each user ID and network address based on historical data from counters that track accumulated client usage of application program 114 at defined transaction rate levels.

Security exit program 116 sets one of the following five states:

1. A user ID and network address associated with a client are permitted to access application program 114.

2. A user ID or network address associated with a client is permanently denied access to application program 114, and a connection to server computing unit 102 from the client is terminated.

3. A user ID or network address associated with a client is temporarily denied access (i.e., temporarily halted) to application program 114 for a pre-defined reset time interval.

4. A warning return code is sent to a client that sent a request for access to application 114. The warning return code warns the client to slow down its transaction rate because threshold limits that will cause a delay, a temporary halt, or a permanent denial are being approached. Access to application program 114 is still permitted in response to the warning return code being sent.

5. A delay time interval (i.e., pause time) is added before a current transaction from a client is allowed access to application program 114. The delay time interval provides a slowdown of the client's transaction rate and allows access to application program 114 by other clients.

In one embodiment, security exit program 116 is eliminated from system 100, the logic for determining whether to permit access or terminate the connection between the client and server resides in listener 112, and listener 112 populates and accesses data in databases 118, 120, 122, 124 and 126.

In one embodiment, server computing unit 102 provides a z/OS Customer Information Control System (CICS) transaction server platform that is accessed by client computing units 104, 106, 108 via a TCP/IP sockets interface. The z/OS operating system is a 64-bit mainframe operating system offered by International Business Machines Corporation located in Armonk, N.Y. CICS is a transaction server offered by International Business Machines Corporation. In one embodiment, listener 112 is a TCP/IP listener, which is associated with an IP address and port number of server computing unit 102. For example, TCP/IP listener 112 monitors the Internet 110 for TCP/IP requests directed to the listener's IP address and port number. The TCP/IP listener responds to client requests for data using the standard TCP/IP protocol.

In one embodiment, server computing unit 102 includes a CICS subsystem environment implementation of a TCP/IP sockets interface. In this embodiment, the TCP/IP listener 112 provides an exit to a user-defined security exit program 116, which examines TCP/IP information from a client including user ID logon data, and makes a determination whether the connection should be allowed to proceed to application program 114 for normal server data processing, or whether to notify listener 112 that the connection should be rejected and terminated. If the connection is rejected and terminated, listener 112 returns a reason code to the client. The reason code identifies a reason for the rejection of the connection.

In another embodiment, system 100 is implemented in a Systems Network Architecture (SNA) environment or Web Sphere® MQ environment. SNA and Web Sphere® MQ are offered by International Business Machines Corporation.

Process for Controlling Client Access to a Server Application

Figure 2A:
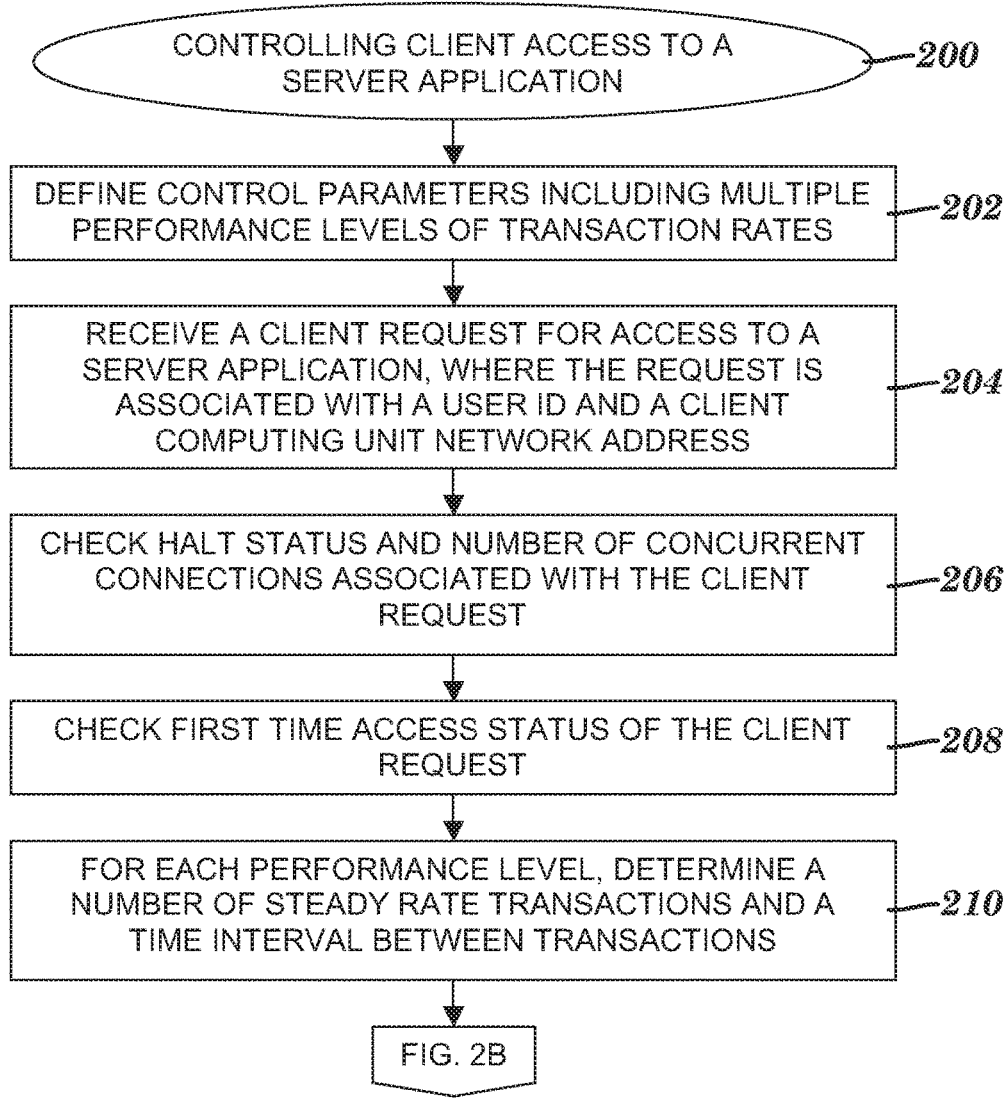
FIGS. 2A-2B depict a flow diagram of a process for controlling client access to a server application, where the process is implemented by the system of FIG. 1, in accordance with embodiments of the present invention.
Figure 2B:
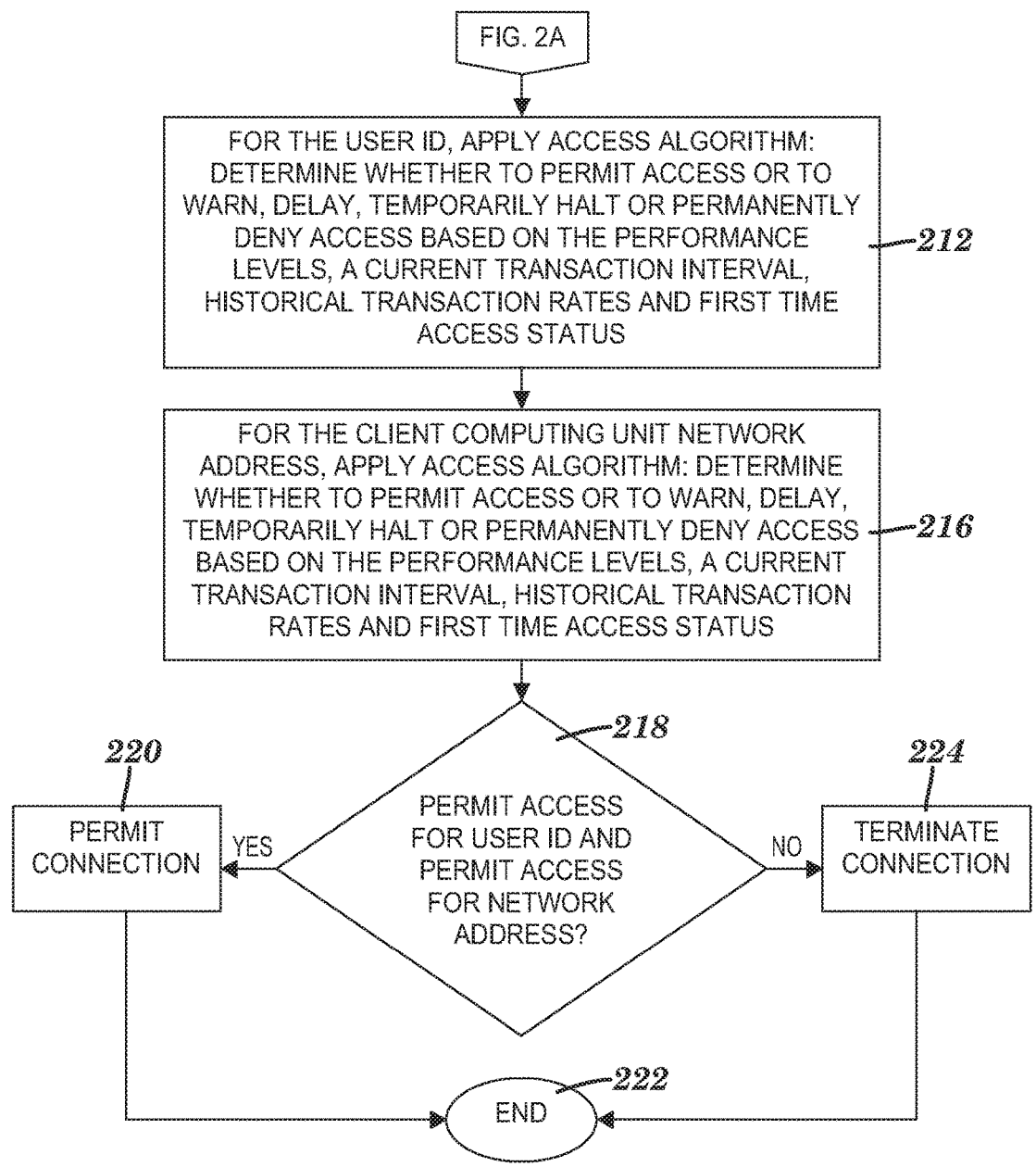

FIGS. 2A-2B depict a flow diagram of a process for controlling client access to a server application, where the process is implemented by the system of FIG. 1, in accordance with embodiments of the present invention. The process for controlling client access to a server application starts at step 200 of FIG. 2A. In step 202, a user utilizes server computing unit 102 to define control parameters that include multiple performance levels of transaction rates and to store the control parameters in statistics database 126 (see FIG. 1). Step 202 is described in more detail below relative to FIG. 3.

In step 204, server computing unit 102 (see FIG. 1) receives a request sent from a client computing unit 104, 106 or 108 (see FIG. 1), where the received request is a request for the client computing unit to access application program 114 (see FIG. 1). The request received in step 204 includes a user ID and a network address associated with the client computing unit that sent the request. In this section, the term "the client" or "the client computing unit" refers to the client computing unit that sends the request received in step 204.

As used herein, a user ID included in a request is defined as a unique identifier of a person (i.e., a user) who utilizes a client to initiate a transaction via the request. In one embodiment, a unique password is associated with each user ID. A server application has knowledge of the user IDs via a process of registering users to the server application. The network that is handling client-server transactions does not have knowledge of the user IDs. The client being utilized by a user identified by a user ID is also referred to herein as the client associated with the user ID.

As used herein, a network address is defined as an identifier (e.g., an IP address) that identifies a client remote from a server and that accesses the server via a request sent over a network. A network address is provided by a communications protocol (e.g., TCP/IP) and is recognized by the network over which the client accesses the server. The client identified by a network address is also referred to herein as the client associated with the network address.

Hereinafter, unless otherwise noted, "the user ID" refers to the user ID included in the request received in step 204, and "the network address" refers to the network address included in the request received in step 204.

In an alternate embodiment in which system 100 (see FIG. 1) is implemented in an SNA environment, the request received in step 204 is identified by a fully qualified logical unit name. In another embodiment in which system 100 (see FIG. 1) is implemented in a WebSphere® MQ environment, the request received in step 204 is identified by a remote queue name.

In step 206, security exit program 116 (see FIG. 1) checks the inactive status and halt status of the user ID and network address included in the request received in step 204, and also checks the number of concurrent connections between the network address and server computing unit 102. The checks in step 206 determine whether or not to terminate the connection between the network address and server computing unit 102 (see FIG. 1). Step 206 is described in more detail below relative to FIGS. 4A & 4B.

In step 208, security exit program 116 (see FIG. 1) checks the first time access status of the request received in step 204 and permits access to application program 114 (see FIG. 1) if the access is a first time access for both the user ID and the network address. Further, the check in step 208 determines whether or not to add the user ID to active user ID database 118 (see FIG. 1). Step 208 also determines whether or not to add the network address to active network address database 122 (see FIG. 1). Step 208 is described in more detail below relative to FIG. 5.

In step 210, security exit program 116 (see FIG. 1) determines, for each performance level, a number of transactions (a.k.a. steady rate transactions) that the client computing unit can send at a steady rate before reaching the threshold for temporarily halting transactions. Step 210 also includes security exit program 116 (see FIG. 1) determining a time interval between successive steady rate transactions for each performance level.

In an alternate embodiment, the number of steady rate transactions and the time interval between successive steady rate transactions for each performance level are predefined in step 202 instead of being determined in step 210. Furthermore, in the alternate embodiment, the number of steady rate transactions and the time interval between successive steady rate transactions are dynamically modifiable during the process of FIGS. 2A-2B.

In step 212 of FIG. 2B, security exit program 116 (see FIG. 1) applies an algorithm for determining, relative to the user ID, whether to permit the client to access application program 114 (see FIG. 1), or whether to warn the client to slow down its transaction rate, enforce a delay of the client's transactions for a pre-defined delay time interval, temporarily halt the client from accessing application program 114 (see FIG. 1) for a pre-defined reset time interval, or permanently deny the client access to the application program. The determination made in step 212 is based on the performance levels, a current transaction interval, historical transaction intervals, and a first time access status relative to the user ID. Accumulated, historical transaction rates associated with the user ID are based on the historical transaction intervals related to the user ID. Each historical transaction interval related to the user ID had been monitored as a current transaction interval in a previous execution of the process of FIGS. 2A-2B. Step 212 is described in more detail below relative to FIGS. 7A-7D.

In step 216 of FIG. 2B, security exit program 116 (see FIG. 1) applies an algorithm for determining, relative to the network address associated, whether to permit the client to access application program 114 (see FIG. 1), or whether to warn the client computing unit to slow down its transaction rate, enforce a delay of the client's transactions for a pre-defined delay time interval, temporarily halt the client from accessing application program 114 (see FIG. 1) for a pre-defined reset time interval, or permanently deny the client access to the application program. The determination made in step 216 is based on the performance levels, a current transaction interval, historical transaction intervals, and a first time access status relative to the network address. Accumulated, historical transaction rates associated with the network address are based on the historical transaction intervals related to the network address. Each historical transaction interval related to the network address had been monitored as a current transaction interval in a previous execution of the process of FIGS. 2A-2B. Step 216 is described in more detail below relative to FIGS. 8A-8D.

In inquiry step 218, if security exit program 116 (see FIG. 1) determines that permission to access application 114 (see FIG. 1) has been granted to the user ID in step 212 and to the network address in step 216, then in step 220, security exit program 116 (see FIG. 1) permits a connection between the client and application program 114 (see FIG. 1) and the process of FIGS. 2A-2B ends at step 222; otherwise, in step 224 security exit program 116 (see FIG. 1) terminates the connection between the client and server computing unit 102 (see FIG. 1) and the process of FIGS. 2A-2B ends at step 222.

As described above in the process of FIGS. 2A-2B, denial of access to application program 114 (see FIG. 1) occurs under either of two conditions: (1) excessive transactions by a user ID (see step 212) or (2) excessive transactions by a network address (see step 216). Checking both of the two aforementioned conditions is necessary because a single user may use multiple network addresses to increase access to application program 114 (see FIG. 1) to an excessive level or a single network address may be used by multiple user IDs to send an excessive number of transactions to server computing unit 102 (see FIG. 1).

Figure 3:
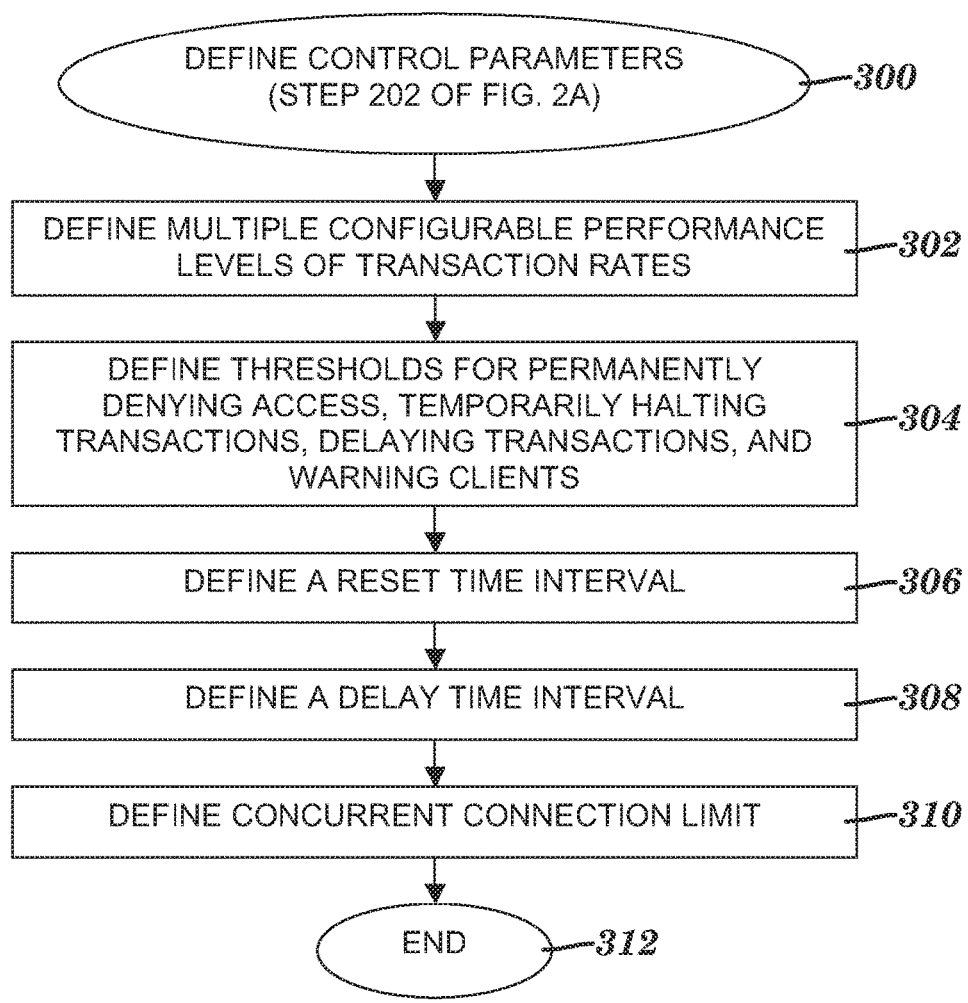
FIG. 3 is a flow diagram of a process for defining control parameters in the process of FIGS. 2A-2B, in accordance with embodiments of the present invention.

FIG. 3 is a flow diagram of a process for defining control parameters in step 202 in the process of FIGS. 2A-2B, in accordance with embodiments of the present invention. The control parameter definition process starts at step 300. In each of the following steps in FIG. 3, a user uses server computing unit 102 (see FIG. 1) to perform the step and the control parameter defined in the step is stored in statistics database 126 (see FIG. 1).

In step 302, multiple dynamically configurable performance levels of transaction rates are defined. As used herein, the multiple performance levels represent successive and mutually exclusive ranges of transaction rates, but each performance level is designated by a single corresponding transaction rate at the lower bound of one of the ranges of transaction rates. In one embodiment, the performance levels are defined in decreasing order of their corresponding transaction rates. For example, four performance levels 1 through 4 are designated by transaction rates 100, 50, 20 and 10 transactions per second, respectively. In this example, performance level 1 includes transaction rates of 100 transactions per second and higher; performance level 2 includes transaction rates of 50 through 99 transactions per second; performance level 3 includes transaction rates of 20 through 49 transactions per second; and performance level 4 includes transaction rates of 10 through 19 transactions per second.

For each of the performance levels defined in step 302, a corresponding time interval until a halt (a.k.a. halt time interval) is also defined in step 302. A halt time interval is the maximum amount of time that the transaction rate that designates the corresponding performance level is allowed to continue at a steady rate before a predefined temporary transaction halt threshold is reached. The predefined temporary transaction halt threshold is stored in statistics database 126 (see FIG. 1).

In step 304, four threshold values are defined. From lowest to highest, the defined threshold values are: (1) warning threshold, (2) transaction delay threshold, (3) temporary halt threshold, and (4) permanent access denial threshold. The four threshold values defined in step 304 are used in comparison to a value of an accumulator (a.k.a. accumulator value) that is dynamically weighted (i.e., updated or adjusted) to indicate both a current transaction interval and accumulated, historical transaction intervals. The present invention uses two accumulators: (1) a user ID accumulator that is updated according to transaction intervals associated with the user ID and (2) a network address accumulator that is updated according to transaction intervals associated with the network address. The values of the two accumulators are stored in a database coupled to server computing unit 102 (see FIG. 1) (e.g., database 126 of FIG. 1). The four threshold values are dynamically modifiable during the process of FIGS. 2A-2B. The usage of the four threshold values is described in detail below relative to FIGS. 7A-7D and FIGS. 8A-8D.

In step 306, a reset time interval is defined. The reset time interval is the amount of time that a particular user ID or network address is temporarily halted from accessing application program 114 (see FIG. 1) after security exit program 116 (see FIG. 1) determines that an accumulator exceeds the temporary halt threshold. As used herein, an accumulator that exceeds a threshold is defined as a value that exceeds the threshold, wherein the value is the value of the accumulator. The reset time interval is dynamically modifiable during the process of FIGS. 2A-2B.

In step 308, a delay time interval is defined. The delay time interval is the amount of time that processing of a transaction from a particular user ID or network address is paused after security exit program 116 (see FIG. 1) determines that an accumulator exceeds the transaction delay threshold. The delay time interval is dynamically modifiable during the process of FIGS. 2A-2B.

In step 310, a concurrent connection limit is defined for each user ID and for each network address. The concurrent connection limit is the maximum number of concurrent connections to server computing unit 102 (see FIG. 1) that are allowed to be used by requests having a particular user ID or a particular network address. The control parameter definition process of FIG. 3 ends at step 312. The concurrent connection limit is dynamically modifiable during the process of FIGS. 2A-2B.

Figure 4A:
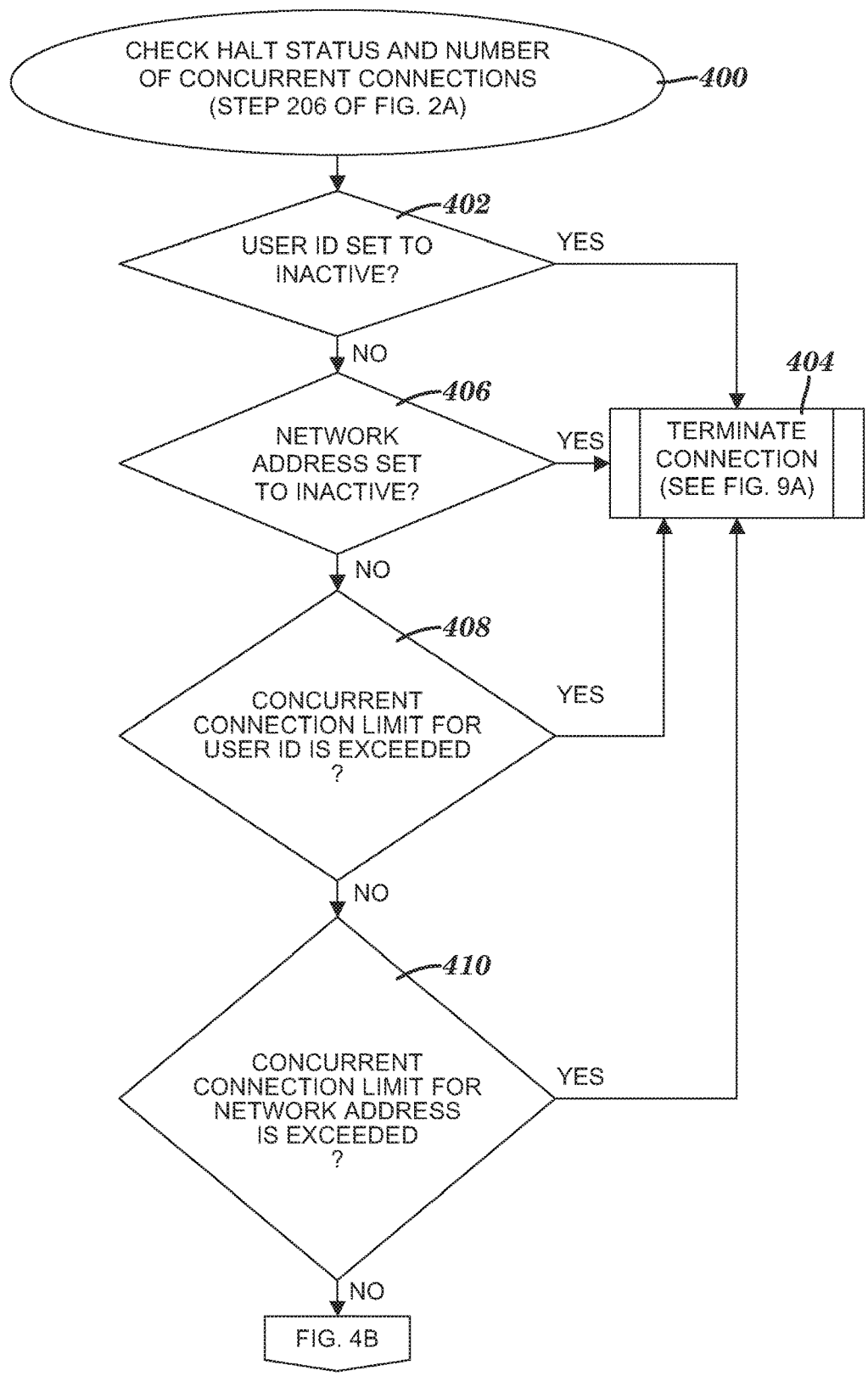
FIGS. 4A-4B depict a flow diagram of a process for checking a halt status and a number of concurrent connections in the process of FIGS. 2A-2B, in accordance with embodiments of the present invention.
Figure 4B:
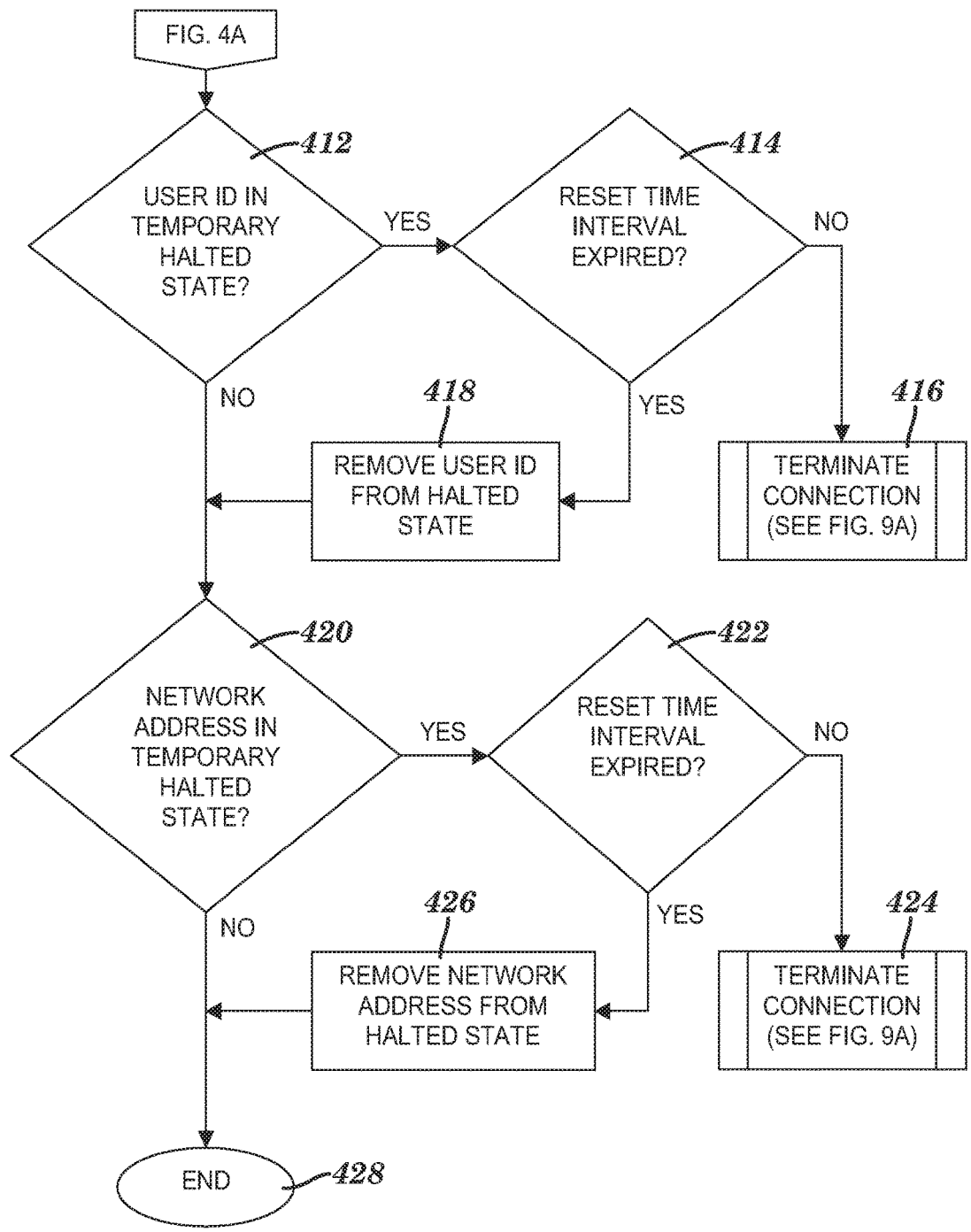

FIGS. 4A-4B depict a flow diagram of a process for checking a halt status and a number of concurrent connections in step 206 of FIG. 2A, in accordance with embodiments of the present invention. The halt status and concurrent connection check process begins at step 400 of FIG. 4A. In inquiry step 402, security exit program 116 (see FIG. 1) checks inactive user ID database 120 (see FIG. 1) to determine whether the user ID associated with the client request is set to an inactive status. If the user ID is set to an inactive status, the connection between the client computing unit (e.g., client computing unit 104 of FIG. 1) and server computing unit 102 (see FIG. 1) is terminated in step 404; otherwise the process of FIG. 4A continues with inquiry step 406.

In inquiry step 406, security exit program 116 (see FIG. 1) checks inactive network address database 124 (see FIG. 1) to determine whether the network address associated with the client request is set to an inactive status. If the network address is set to an inactive status, the connection between the client computing unit and server computing unit 102 (see FIG. 1) is terminated in step 404; otherwise the process of FIG. 4A continues with inquiry step 408.

In inquiry step 408, security exit program 116 (see FIG. 1) obtains from statistics database 126 (see FIG. 1) the limit for concurrent connections for the user ID (i.e., the user ID concurrent connection limit). Security exit program 116 (see FIG. 1) determines whether the number of concurrent connections associated with the user ID exceeds the user ID concurrent connection limit. If inquiry step 408 determines that the user ID concurrent connection limit is exceeded, then the connection between the client computing unit and server computing unit 102 (see FIG. 1) is terminated in step 404; otherwise the process of FIG. 4A continues with inquiry step 410.

In inquiry step 410, security exit program 116 (see FIG. 1) obtains from statistics database 126 (see FIG. 1) the limit for concurrent connections for the network address (i.e., the network address concurrent connection limit). Security exit program 116 (see FIG. 1) determines whether the number of concurrent connections associated with the network address exceeds the network address concurrent connection limit. If inquiry step 410 determines that the network address concurrent connection limit is exceeded, then the connection between the client computing unit and server computing unit 102 (see FIG. 1) is terminated in step 404; otherwise the process continues in FIG. 4B.

If security exit program 116 (see FIG. 1) determines in inquiry step 412 of FIG. 4B that the user ID for the client request is in a temporary halted state (i.e., the user ID's halt status is a temporary halt state), inquiry step 414 determines whether the reset time interval for the user ID has expired (i.e., the reset time interval stored in statistics database 126 of FIG. 1 is exceeded by the time interval between the current time and a temporary halt time stored in active user ID database 118 of FIG. 1). The temporary halt time for the user ID is described below relative to FIG. 7C. If step 414 determines that the reset time interval has not expired, then in step 416 the connection between the client computing unit and server computing unit 102 (see FIG. 1) is terminated; otherwise, in step 418, security exit program 116 (see FIG. 1) removes the user ID from the temporary halted state.

Inquiry step 420 follows step 418 and also follows a determination in step 412 that the user ID is not in a temporary halted state. If security exit program 116 (see FIG. 1) determines in inquiry step 420 that the network address for the client request is in a temporary halted state (i.e., the network address's halt status is a temporary halted state), inquiry step 422 determines whether the reset time interval for the network address has expired (i.e., the reset time interval stored in statistics database 126 of FIG. 1 is exceeded by the time interval between the current time and a temporary halt time stored in active network address database 122 of FIG. 1). The temporary halt time for the network address is described below relative to FIG. 8C. If step 422 determines that the reset time interval has not expired, then in step 424 the connection between the client computing unit and server computing unit 102 (see FIG. 1) is terminated; otherwise, in step 426, security exit program 116 (see FIG. 1) removes the network address from the temporary halted state. Following step 426 and also following a determination in step 420 that the network address is not in a temporary halted state, step 428 ends the process of FIGS. 4A-4B.

Figure 5:
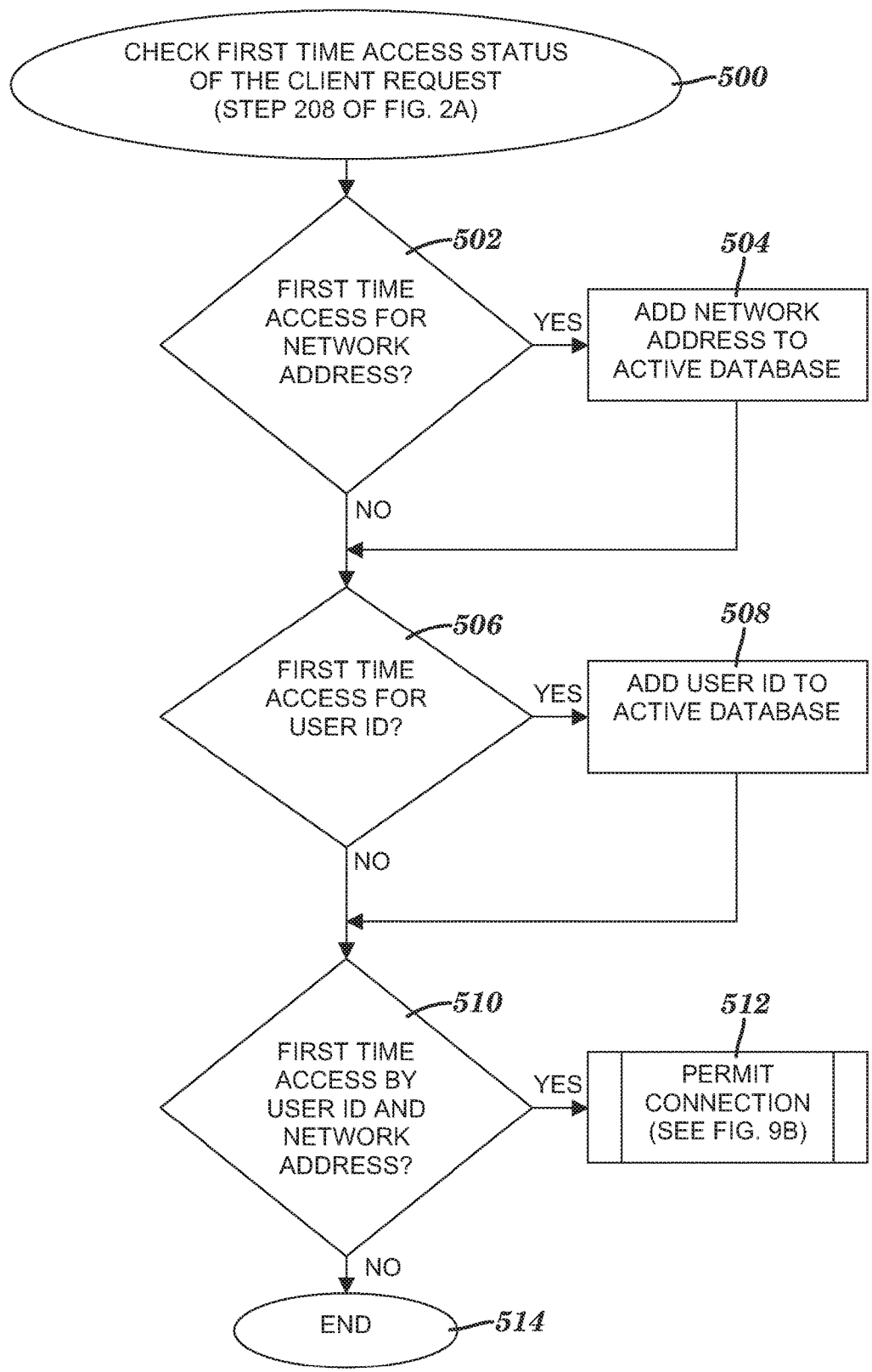
FIG. 5 is a flow diagram of a process for checking a first time access status of the client request, where the process is included in the process of FIGS. 2A-2B, in accordance with embodiments of the present invention.

FIG. 5 is a flow diagram of a process for checking a first time access status of the client request, where the process is included in step 208 of FIG. 2A, in accordance with embodiments of the present invention. The first time access status checking process begins at step 500. Each of the subsequent steps in the process of FIG. 5 is performed by security exit program 116 (see FIG. 1). If inquiry step 502 determines that the request received in step 204 (see FIG. 2A) is the first time the network address is attempting to access application program 114 (see FIG. 1), then in step 504, security exit program 116 (see FIG. 1) adds the network address to active network address database 122 (see FIG. 1); otherwise, the first time access status checking process continues with inquiry step 506.

If inquiry step 506 determines that the request received in step 204 (see FIG. 2A) is the first time the user ID is attempting to access application program 114 (see FIG. 1), then in step 508, security exit program 116 (see FIG. 1) adds the user ID to active user ID database 118 (see FIG. 1); otherwise, the first time access status checking process continues with inquiry step 510.

If inquiry step 510 determines that both the user ID and the network address associated with the request received in step 204 (see FIG. 2A) are attempting to access application program 114 (see FIG. 1) for the first time (i.e., the Yes branches are taken in response to step 502 and step 506), then in step 512, security exit program 116 (see FIG. 1) permits the connection between the client computing unit and application program 114 (see FIG. 1); otherwise, the process of FIG. 5 ends at step 514.

Figure 6:
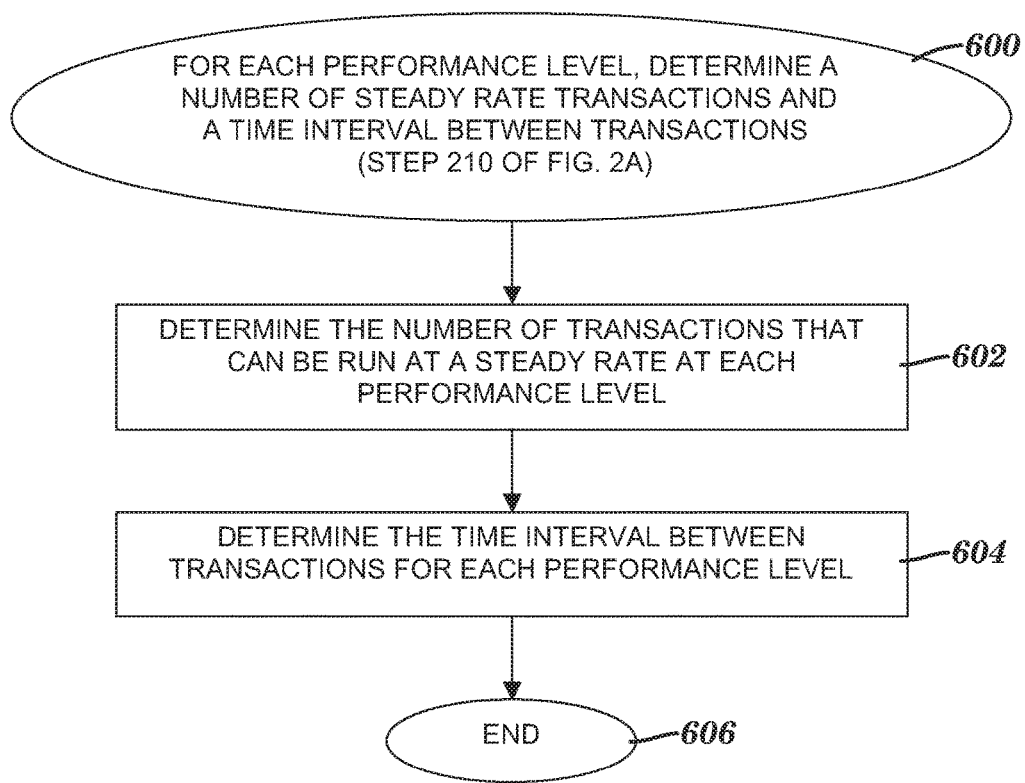
FIG. 6 is a flow diagram of a process for determining a number of steady rate transactions and a time interval between transactions for each performance level, where the process is included in the process of FIGS. 2A-2B, in accordance with embodiments of the present invention.

FIG. 6 is a flow diagram of a process for determining a number of steady rate transactions and a time interval between transactions for each performance level, where the process is included in step 210 of FIG. 2A, in accordance with embodiments of the present invention. The process of determining the aforementioned number of steady rate transactions and time intervals begins at step 600. In step 602, security exit program 116 (see FIG. 1) determines a number of transactions that can be run at a steady rate at each of the performance levels defined in step 202 (see FIG. 2A). In step 604, security exit program 116 (see FIG. 1) determines a time interval between transactions for each of the performance levels defined in step 202 (see FIG. 2A), where the transactions are being run at a steady rate. The process of FIG. 6 ends at step 606.

FIGS. 7A-7D depict a flow diagram of a user ID access algorithm application process included in step 212 of FIG. 2B, in accordance with embodiments of the present invention. The user ID access algorithm application process begins at step 700 of FIG. 7A. In step 702, security exit program 116 (see FIG. 1) determines the current transaction interval (a.k.a. time interval of the current client access) for the user ID. That is, step 702 determines the time interval between the time of the receipt of the client request in step 204 (see FIG. 2A) and the time of the most recent previous request from the user ID to access application program 114 (see FIG. 1). The time of the most recent previous request from the user ID is obtained by the security exit program from active user ID database 118 (see FIG. 1).

In step 704, security exit program 116 (see FIG. 1) determines the performance level associated with the current transaction interval determined in step 702. The performance level determined in step 704 is obtained by the security exit program from statistics database 126 (see FIG. 1).

In step 706, security exit program 116 (see FIG. 1) updates one user ID performance level counter of multiple user ID predefined performance level counters (e.g., increments the user ID performance level counter by 1), where the updated user ID performance level counter is associated with the performance level determined in step 704. The predefined user ID performance level counters are associated with the performance levels defined in step 202 (see FIG. 2A) in a one-to-one correspondence. Each of the predefined user ID performance level counters keeps a running count of the number of client requests received from the user ID, where the current transaction interval for each of the counted client requests is associated with the performance level corresponding to the user ID performance level counter.

In step 708, security exit program 116 (see FIG. 1) determines accumulator adjustment values that are associated with the performance levels defined in step 202 (see FIG. 2A) in a one-to-one correspondence. The determination of each of the accumulator adjustment values in step 708 is based on the number of transactions required for an accumulator associated with the user ID (a.k.a. user ID accumulator) to reach the temporary transaction halt threshold stored in statistics database 126 (see FIG. 1) in the corresponding halt time interval defined in step 302 (see FIG. 3). As used herein, an accumulator that reaches a threshold is defined as a value that reaches the threshold, wherein the value is the value of the accumulator. For example, if the temporary transaction halt threshold is 100,000, the transaction rate that defines performance level 1 is 100 transactions per second, and the halt time interval corresponding to performance level 1 is 20 seconds, then 2000 transactions are required for the accumulator to increase from 0 to the temporary transaction halt threshold of 100,000. In this example, the accumulator value needs to increase by 50 for each of the 2000 transactions in order to reach 100,000 (i.e., 100,000/2000=50), and therefore the accumulator adjustment value for performance level 1 is 50.

In step 710, security exit program 116 (see FIG. 1) generates a set of counters that includes the predefined user ID performance level counters and optionally includes one or more of the possible combinations of the predefined user ID performance level counters. In one embodiment, if n user ID performance level counters are predefined, then step 710 generates a set of n+nC2 counters, where nC2 is the number of combinations of n taken 2 at a time. That is, the generated set of counters includes the predefined user ID performance level counters and counters of all possible combinations of exactly two of the predefined user ID performance level counters. As one example, a counter of a combination of user ID performance level counter 1 and user ID performance level counter 2 is defined as user ID performance level counter 1+user ID performance level counter 2.

In step 712, security exit program 116 (see FIG. 1) forms multiple groups and categorizes the counters in the set of counters generated in step 710 into the multiple groups, so that each counter is included in exactly one group. The groups formed in step 712 indicate different transaction rate levels reflected by the accumulated, historical transaction intervals associated with the user ID. In one embodiment, the groups are ordered from the highest frequency of client requests from the user ID to the lowest frequency of client requests from the user ID. In one embodiment, the number of groups formed in step 712 equals the number of performance levels defined in step 302 (see FIG. 3) and the number of accumulator adjustment values determined in step 708.

In step 714, security exit program 116 (see FIG. 1) determines a counter in the set of counters generated in step 710 that has a maximum value (i.e., determines the maximum counter). In one embodiment, the maximum counter is determined by checking the counters in the order generated in step 712, from highest to lowest frequency of client requests, initializing the maximum counter as the first counter checked and updating the maximum counter with a another checked counter only if the checked counter exceeds the current value of the maximum counter.

In step 716, security exit program 116 (see FIG. 1) determines the group formed in step 712 that includes the maximum counter determined in step 714. The user ID access algorithm application process continues in FIG. 7B.

Figure 7A:
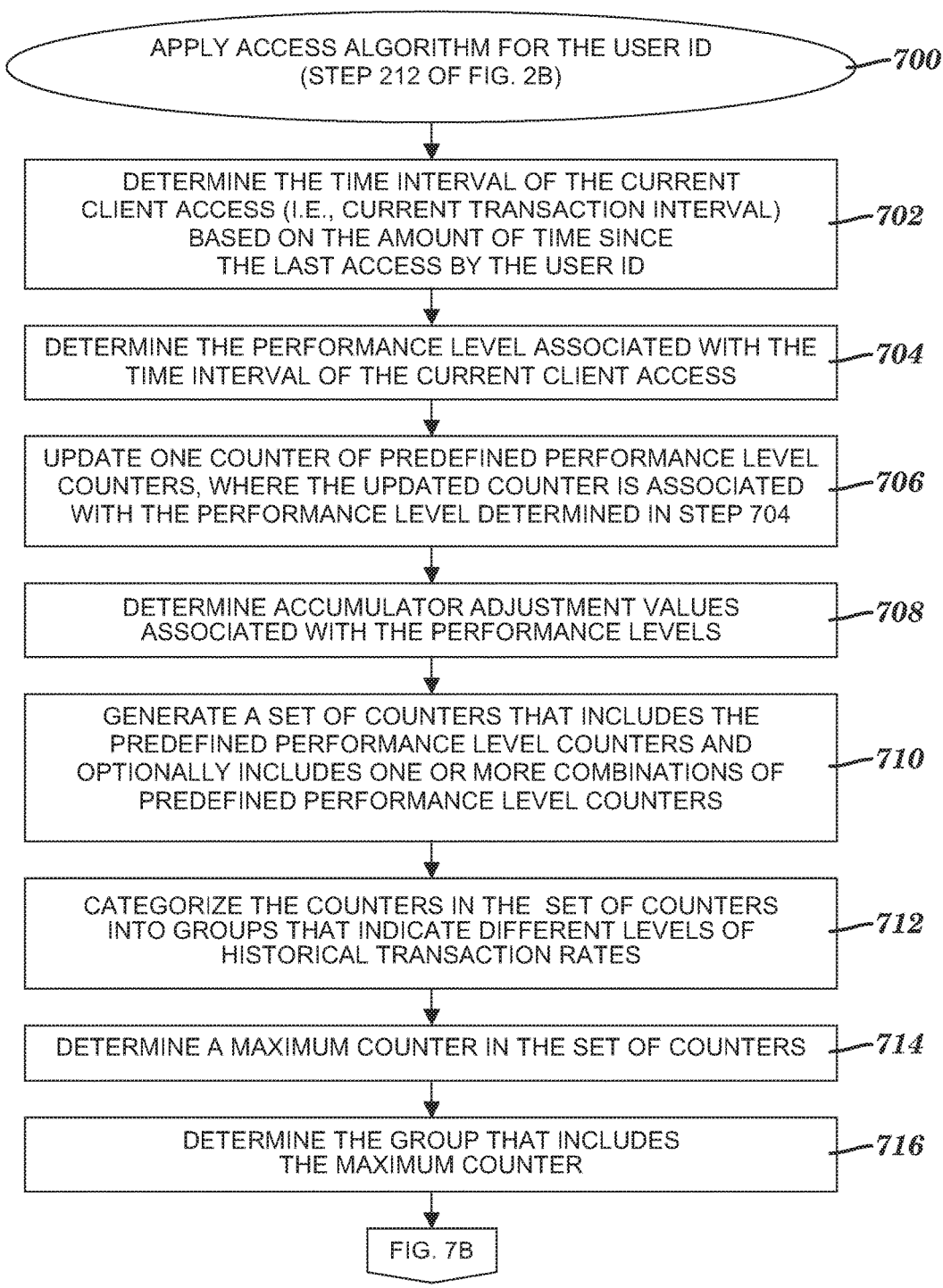
FIGS. 7A-7D depict a flow diagram of a user ID access algorithm application process included in the process of FIGS. 2A-2B, in accordance with embodiments of the present invention.
Figure 7B:
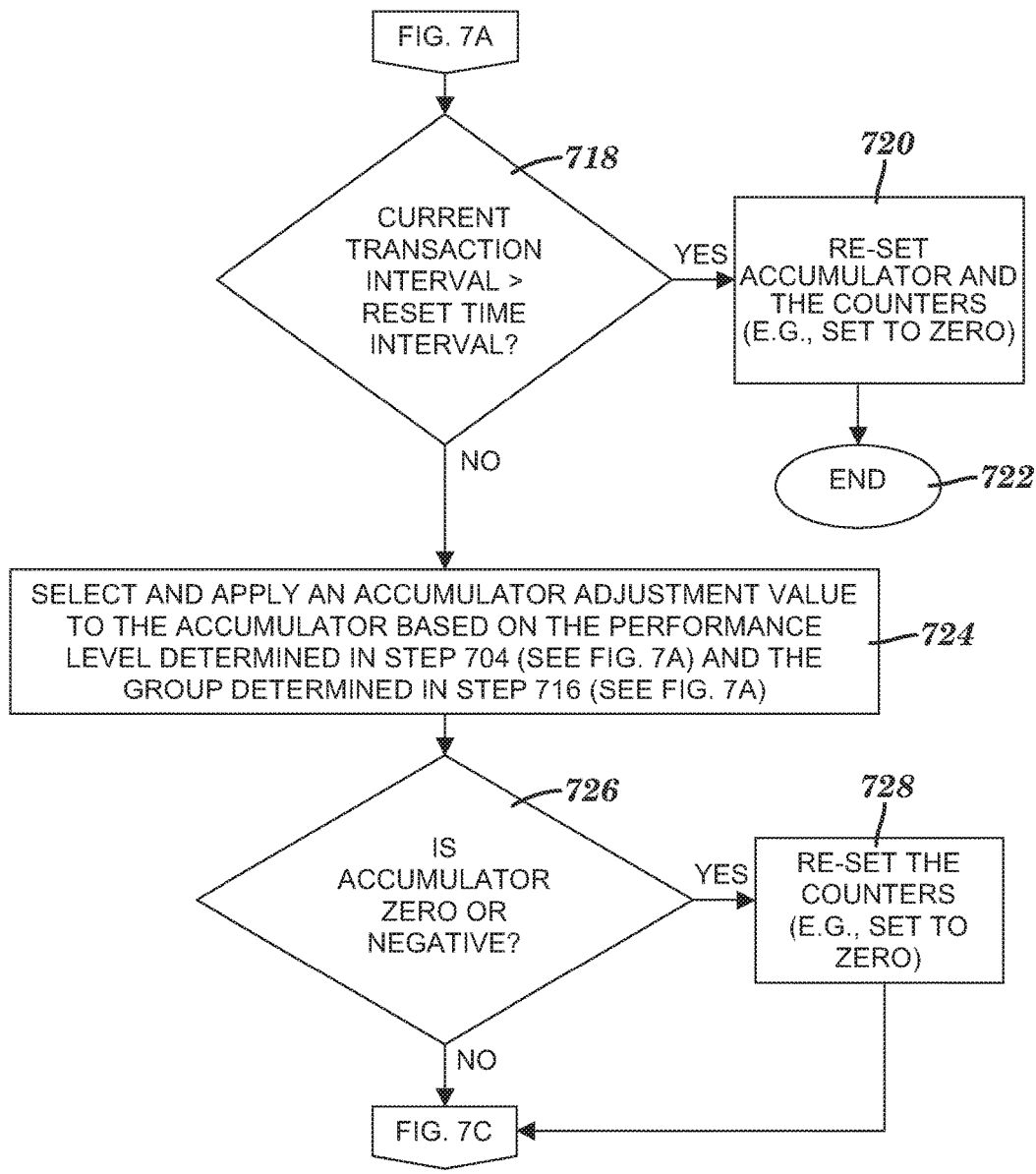

In step 718 of FIG. 7B, security exit program 116 (see FIG. 1) in inquiry step 718 determines whether the current transaction interval determined in step 702 (see FIG. 7A) is greater than the reset time interval defined in step 306 (see FIG. 3). If step 718 determines that the current transaction interval is greater than the reset time interval, then in step 720, security exit program 116 (see FIG. 1) re-sets (i.e., re-initializes) the user ID accumulator and the counters in the set of counters generated in step 710. As used herein, re-setting an accumulator is defined as re-setting the value of the accumulator. For example, step 720 re-sets the user ID accumulator and the counters in the set of counters to zero. In another example, step 720 re-sets the user ID accumulator to a predefined percentage of the user ID accumulator's current value. Following step 720, the user ID access algorithm application process ends at step 722.

If step 718 determines that the current transaction interval is not greater than the reset time interval, then in step 724 security exit program 116 (see FIG. 1) selects and applies an accumulator adjustment value to the user ID accumulator (i.e., either adds the accumulator adjustment value to or subtracts the accumulator adjustment value from the user ID accumulator). As used herein, adding an accumulator adjustment value to an accumulator is defined as adding the accumulator adjustment value to the value of the accumulator and subtracting an accumulator adjustment value from an accumulator is defined as subtracting the accumulator adjustment value from the value of the accumulator. The result of adding an accumulator adjustment value to or subtracting an accumulator adjustment value from an accumulator is an adjusted value of the accumulator.

The selection and the type of application (i.e., adding or subtracting) of the accumulator adjustment value is based on the performance level determined in step 704 (see FIG. 7A) and the group determined in step 716 (see FIG. 7A). Each combination of a performance level determined in step 704 (see FIG. 7A) and a group determined in step 716 (see FIG. 7A) is associated with a particular accumulator adjustment value and a particular arithmetic operation to perform on the user ID accumulator with the accumulator adjustment value. For example, a predefined table (see, e.g., FIG. 21) indicates that a current transaction interval associated with performance level 1 and a maximum counter included in group 2 indicates that the accumulator adjustment value of 33 is added to user ID accumulator in step 724.

The adding of a selected accumulator adjustment value to the user ID accumulator in step 724 indicates a penalty imposed for (1) a failure of the current transaction interval for the user ID to indicate an improvement over the historical pattern of transaction intervals for the user ID and/or (2) a history of high transaction rates for the user ID and a current transaction interval for the user ID that reflects a high transaction rate. An improvement over the historical pattern of transaction intervals is indicated, for example, by a current transaction interval that is associated with a low transaction rate while the historical pattern of transaction intervals is associated with a high transaction rate.

As used herein, a transaction rate is high or low according to predefined categories of performance levels determined in step 704 (see FIG. 7A) and an historical pattern of transaction intervals is associated with a transaction rate that is high or low according to predefined categories of the groups formed in step 712 (see FIG. 7A). For example, if four performance levels (i.e., levels 1-4) are defined in step 302 (see FIG. 3) and four groups (i.e., groups 1-4) are formed in step 712 (see FIG. 7A), then a transaction rate is considered high if the current transaction interval is associated with level 1 or level 2, and an historical pattern of transaction intervals is associated with a high transaction rate if the historical pattern of transaction intervals is associated with group 1 or group 2. Furthermore, in the aforementioned example, a transaction rate is considered low if the current transaction interval is associated with level 3 or level 4 and an historical pattern of transaction intervals is associated with a low transaction rate if the historical pattern of transaction intervals is associated with group 3 or group 4.

The subtracting of a selected accumulator adjustment value from the user ID accumulator in step 724 indicates a reward given for a current transaction interval for the user ID that indicates an improvement over the historical pattern of transaction intervals for the user ID. In one embodiment, the selected accumulator adjustment value is subtracted in step 724 (i.e., a reward is given) only if the current transaction interval indicates an improvement over the historical pattern of transaction intervals and also is associated with a low transaction rate.

Conversely, a current transaction interval associated with a high transaction rate that is still an improvement over the historical transaction intervals results in an adding of a selected accumulator adjustment value to the user ID accumulator to facilitate proceeding to a low transaction rate. For example, see the accumulator adjustment in FIG. 21 corresponding to a current transaction interval level of 2 and a group of 1.

In step 726, security exit program 116 (see FIG. 1) determines whether or not the value of the user ID accumulator is zero or a negative value. If step 726 determines that the value of the user ID accumulator is zero or a negative value, then in step 728 security exit program 116 (see FIG. 1) re-sets (i.e., re-initializes) the counters in the set of counters generated in step 710 (see FIG. 7A). For example, step 728 re-sets the counters in the set of counters to zero. Following step 728 and following the No branch of step 726, the user ID access algorithm application process continues in FIG. 7C.

Figure 7C:
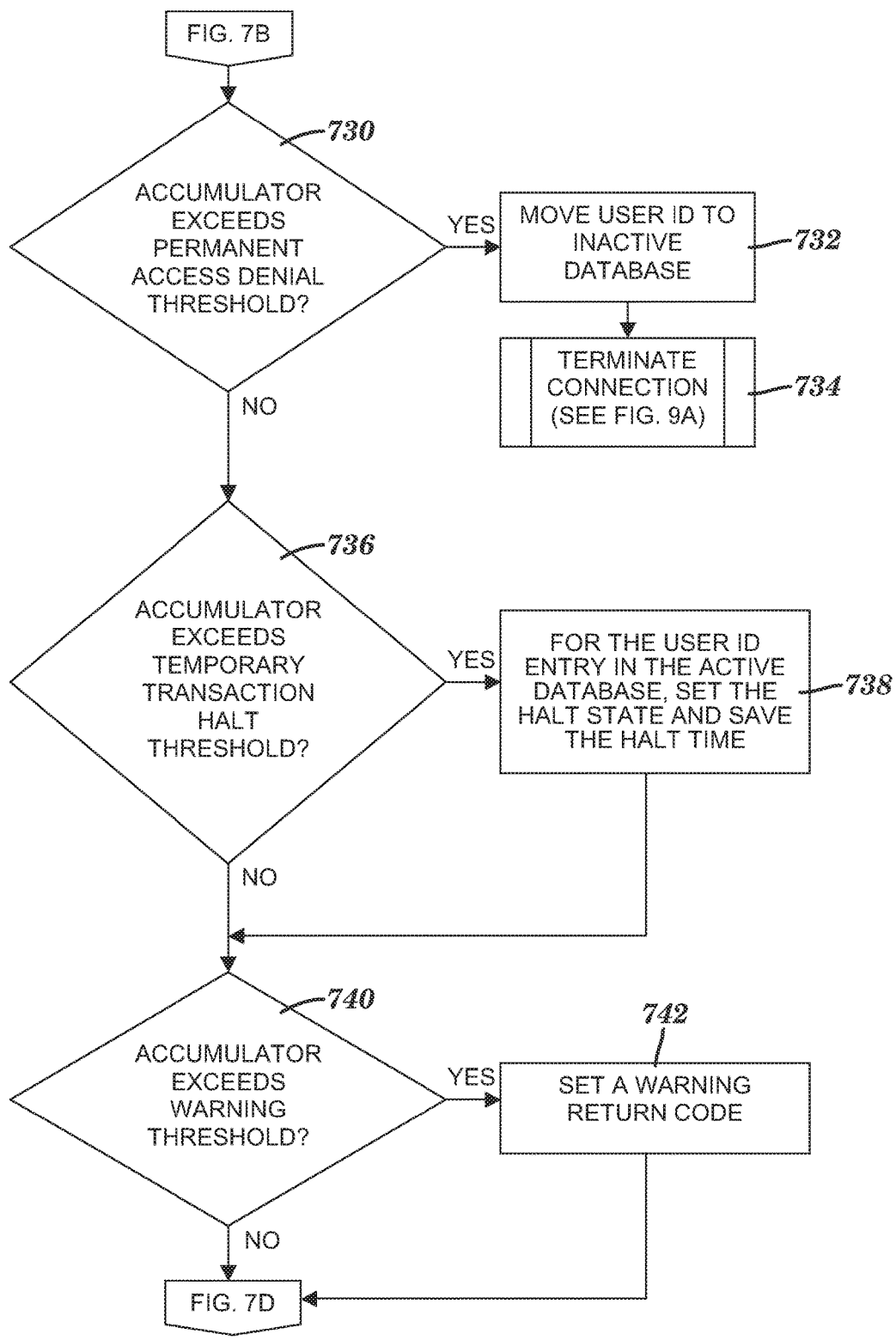

In step 730 of FIG. 7C, security exit program 116 (see FIG. 1) determines whether or not the user ID accumulator exceeds the permanent access denial threshold defined in step 304 (see FIG. 3) and stored in statistics database 126 (see FIG. 1). If step 730 determines that the user ID accumulator exceeds the permanent access denial threshold, then in step 732 security exit program 116 (see FIG. 1) removes the user ID from active user ID database 118 (see FIG. 1) and places the user ID into inactive user ID database 120 (see FIG. 1). In step 734, security exit program 116 (see FIG. 1) terminates the connection between the client computing unit and server computing unit 102 (see FIG. 1), as described below relative to FIG. 9A. After placing the user ID into inactive user ID database 120 (see FIG. 1), subsequent attempts by the user ID to access application program 114 (see FIG. 1) are denied by the check in step 402 (see FIG. 4A). Thus, steps 730, 732 and 734 detect runaway clients and set such clients in an inactive state.

If step 730 determines that the user ID accumulator does not exceed the permanent access denial threshold, then in step 736, security exit program 116 (see FIG. 1) determines whether or not the user ID accumulator exceeds the temporary halt threshold defined in step 304 (see FIG. 3) and stored in statistics database 126 (see FIG. 1). If step 736 determines that the user ID accumulator exceeds the temporary transaction halt threshold, then in step 738, security exit program 116 (see FIG. 1) places the user ID in a temporary halted state (i.e., sets a halt state indicator associated with the entry for the user ID in active user ID database 118 of FIG. 1). The user ID is in the temporary halted state for a cool down period that is at least as long as the reset time interval defined in step 306 (see FIG. 3). In step 738, security exit program 116 (see FIG. 1) also obtains and saves the current time in active user ID database 118 (see FIG. 1) as the time of temporarily halting the user ID (a.k.a. user ID temporary halt time). The user ID temporary halt time saved in step 738 is associated with the entry for the user ID in active user ID database 118 (see FIG. 1) and is used to determine if the reset time interval is expired in step 414 (see FIG. 4B).

Inquiry step 740 follows both step 738 and the No branch of inquiry step 736. In inquiry step 740, security exit program 116 (see FIG. 1) determines whether or not the user ID accumulator exceeds the warning threshold defined in step 304 (see FIG. 3) and stored in statistics database 126 (see FIG. 1). If step 740 determines that the user ID accumulator exceeds the warning threshold, then in step 742, security exit program 116 (see FIG. 1) sets a warning return code that is sent from server computing unit 102 (see FIG. 1) to the client computing unit. The warning return code indicates an excessive usage of application program 114 (see FIG. 1) and warns the client computing unit to slow down the user ID's requests for access to application program 114 (see FIG. 1).

Figure 7D:
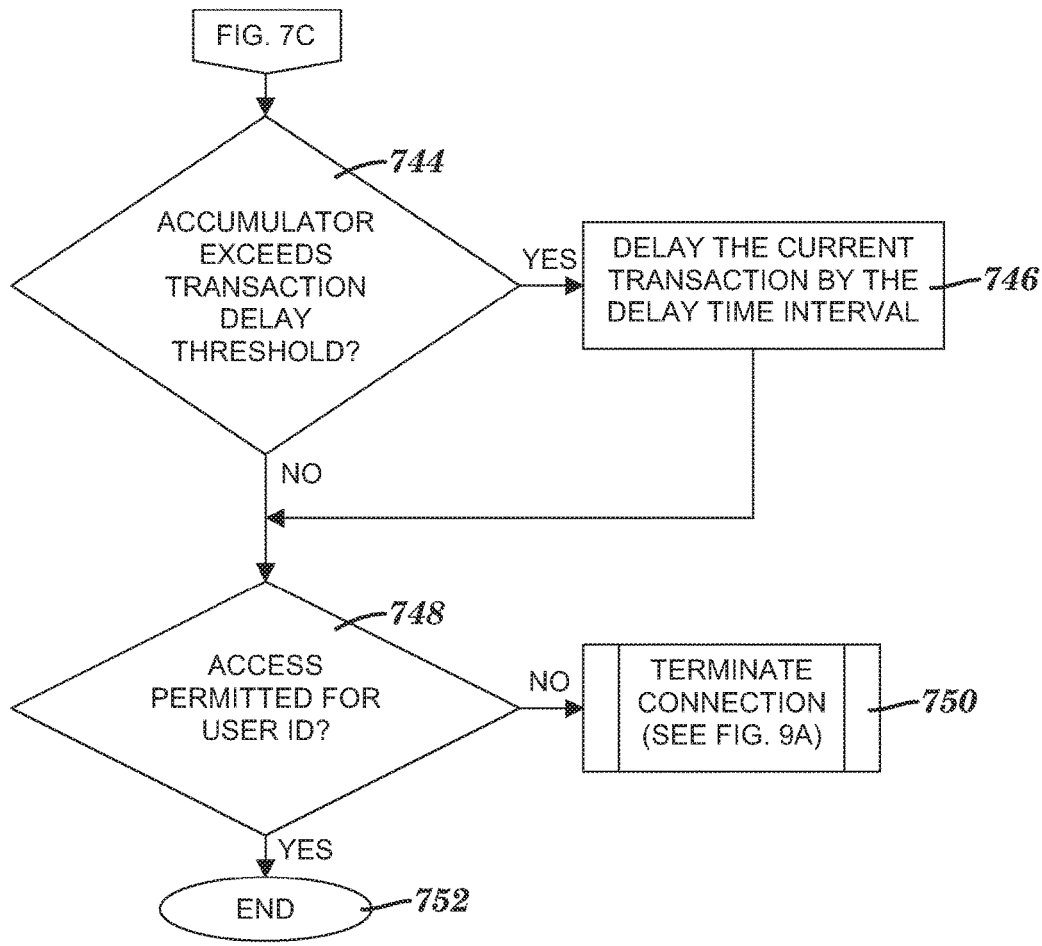

Inquiry step 744 in FIG. 7D follows step 742 and the No branch of inquiry step 740 of FIG. 7C. In inquiry step 744 of FIG. 7D, security exit program 116 (see FIG. 1) determines whether or not the user ID accumulator exceeds the transaction delay threshold defined in step 304 (see FIG. 3) and stored in statistics database 126 (see FIG. 1). If step 744 determines that the user ID accumulator exceeds the transaction delay threshold, then in step 746, security exit program 116 (see FIG. 1) delays the current transaction by the delay time interval defined in step 308 (see FIG. 3). That is, the security exit program delays a response to the client request received in step 204 (see FIG. 2A) until the delay time interval expires. For single-threaded clients, the delay provided by step 746 creates a governor effect by causing longer response times between transactions from the user ID, which result in a decrease in the value of the user ID accumulator. The resulting decrease in the value of the user ID accumulator results in a removal of the delay. Multi-threaded clients circumvent the aforementioned governor effect, but are stopped by either exceeding the concurrent connection limit checked in steps 408 and 410 (see FIG. 4A) or by being in the temporary halted state checked in steps 412 and 420 (see FIG. 4B).

Inquiry step 748 follows both step 746 and the No branch of inquiry step 744. In inquiry step 748, security exit program 116 (see FIG. 1) determines whether or not access to application program 114 (see FIG. 1) is permitted for the user ID. If step 748 determines that access to the application program is not permitted for the user ID, then in step 750, security exit program 116 (see FIG. 1) terminates the connection between the client computing unit and server computing unit 102 (see FIG. 1); otherwise the process of FIGS. 7A-7D ends at step 752.

FIGS. 8A-8D depict a flow diagram of a network address access algorithm application process included in step 216 of FIG. 2B, in accordance with embodiments of the present invention. The network address access algorithm application process begins at step 800 of FIG. 8A. In inquiry step 802, security exit program 116 (see FIG. 1) determines whether or not the network address is attempting a first time access of application program 114 (see FIG. 1) (i.e., attempting to access application program 114 of FIG. 1 for the first time). If step 802 determines that the network address is attempting a first time access, then in step 804, security exit program 116 (see FIG. 1) permits the connection between the client computing unit and application program 114 (see FIG. 1); otherwise, the process of FIG. 8A continues with step 806.

In step 806, security exit program 116 (see FIG. 1) determines the current transaction interval (a.k.a. time interval of the current client access) for the network address. That is, step 806 determines the time interval between the time of the receipt of the client request in step 204 (see FIG. 2A) and the time of the most recent previous request from the network address to access application program 114 (see FIG. 1). The time of the most recent previous request from the network address is obtained by the security exit program from active network address database 122 (see FIG. 1).

In step 808, security exit program 116 (see FIG. 1) determines the performance level associated with the current transaction interval determined in step 806. The performance level determined in step 808 is obtained by the security exit program from statistics database 126 (see FIG. 1).

In step 810, security exit program 116 (see FIG. 1) updates one network address performance level counter of multiple network address predefined performance level counters (e.g., increments the performance level counter by 1), where the updated network address performance level counter is associated with the performance level determined in step 808. The predefined network address performance level counters are associated with the performance levels defined in step 202 (see FIG. 2A) in a one-to-one correspondence. Each of the predefined network address performance level counters keeps a running count of the number of client requests received from the network address, where the current transaction interval for each of the counted client requests is associated with the performance level corresponding to the network address performance level counter.

In step 812, security exit program 116 (see FIG. 1) determines accumulator adjustment values that are associated with the performance levels defined in step 202 (see FIG. 2A) in a one-to-one correspondence. In one embodiment, the determination of each of the accumulator adjustment values in step 812 is based on the number of transactions required for an accumulator associated with the network address (a.k.a. network address accumulator) to reach the temporary transaction halt threshold stored in statistics database 126 (see FIG. 1) in the corresponding halt time interval defined in step 302 (see FIG. 3). For example, if the temporary transaction halt threshold is 100,000, the transaction rate that defines performance level 1 is 100 transactions per second, and the halt time interval corresponding to performance level 1 is 20 seconds, then 2000 transactions are required for the value of the accumulator to increase from 0 to the temporary transaction halt threshold of 100,000. In this example, the value of the accumulator needs to increase by 50 for each of the 2000 transactions in order to reach 100,000 (i.e., 100,000/2000=50), and therefore the accumulator adjustment value for performance level 1 is 50.

In another embodiment, step 812 determines the accumulator adjustment values by copying the accumulator adjustment values determined in step 708 (see FIG. 7A).

In step 814, security exit program 116 (see FIG. 1) generates a set of counters that includes the predefined network address performance level counters and optionally includes one or more of the possible combinations of the predefined network address performance level counters. In one embodiment, if n network address performance level counters are predefined, then step 814 generates a set of n+nC2 counters, where the generated set of counters includes the predefined network address performance level counters and counters of all possible combinations of exactly two of the predefined network address performance level counters. For example, a counter of a combination of network address performance level counter 1 and network address performance level counter 2 is defined as the sum of network address performance level counter 1 and network address performance level counter 2.

Figure 8A:
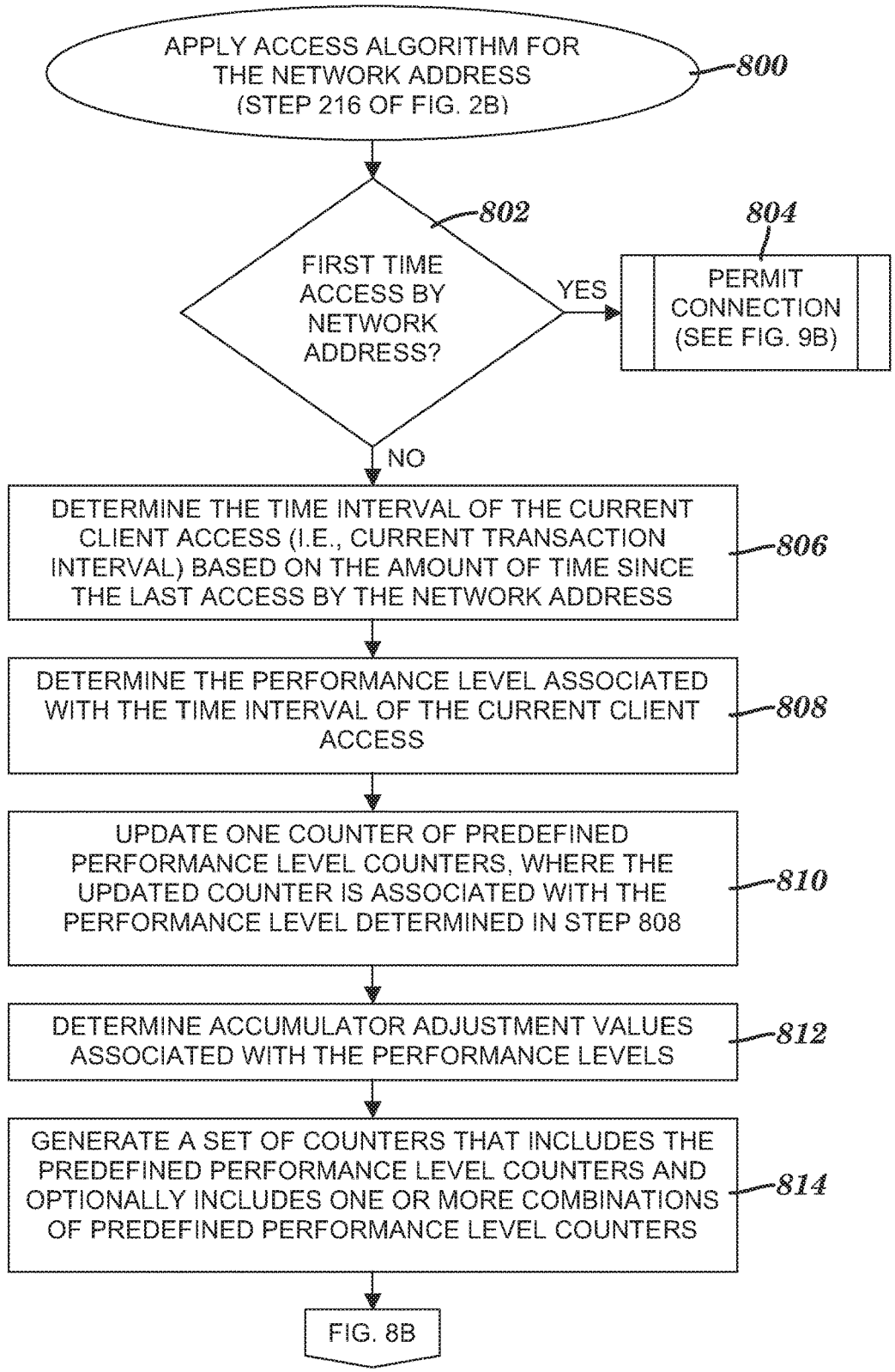
FIGS. 8A-8D depict a flow diagram of a network address access algorithm application process included in the process of FIGS. 2A-2B, in accordance with embodiments of the present invention.
Figure 8B:
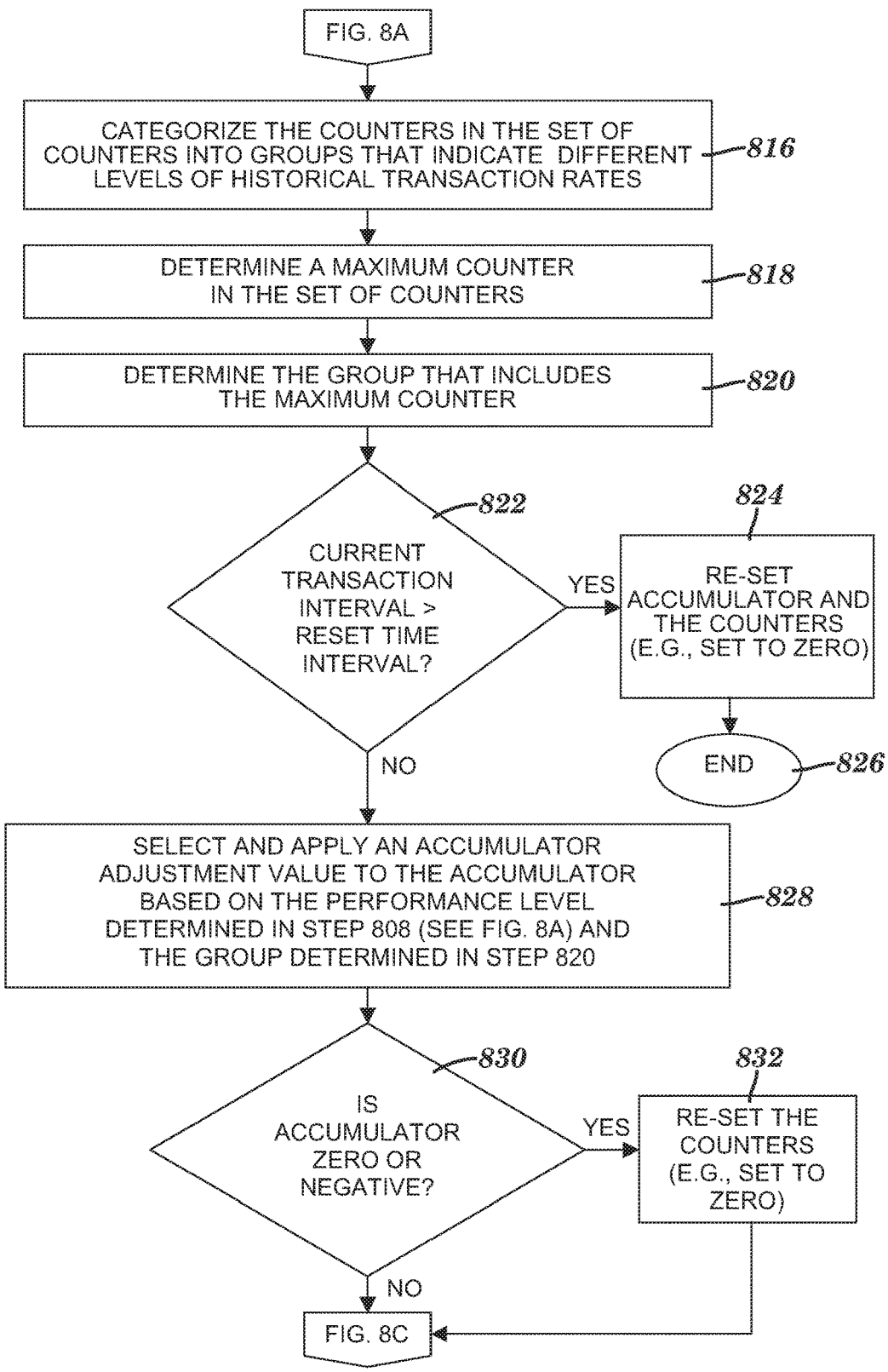

In step 816 of FIG. 8B, security exit program 116 (see FIG. 1) forms multiple groups and categorizes the counters in the set of counters generated in step 814 (see FIG. 8A) into the multiple groups, so that each counter is included in exactly one group. The groups formed in step 816 indicate different transaction rate levels reflected by the accumulated, historical transaction intervals associated with the network address. In one embodiment, the groups are ordered from the highest frequency of client requests from the network address to the lowest frequency of client requests from the network address. In one embodiment, the number of groups formed in step 816 equals the number of performance levels defined in step 302 (see FIG. 3) and the number of accumulator adjustment values determined in step 812 (see FIG. 8A).

In step 818, security exit program 116 (see FIG. 1) determines a counter in the set of counters generated in step 814 (see FIG. 8A) that has a maximum value (i.e., determines the maximum counter). In one embodiment, the maximum counter is determined by checking the counters in the order generated in step 816, from highest to lowest frequency of client requests, initializing the maximum counter as the first counter checked and updating the maximum counter with a another checked counter only if the checked counter exceeds the current value of the maximum counter.

In step 820, security exit program 116 (see FIG. 1) determines the group formed in step 816 that includes the maximum counter determined in step 818.

In inquiry step 822, security exit program 116 (see FIG. 1) determines whether or not the current transaction interval determined in step 806 (see FIG. 8A) is greater than the reset time interval defined in step 306 (see FIG. 3). If step 822 determines that the current transaction interval is greater than the reset time interval, then in step 824, security exit program 116 (see FIG. 1) re-sets (i.e., re-initializes) the network address accumulator and the counters in the set of counters generated in step 814. For example, step 824 re-sets the network address accumulator and the counters in the set of counters to zero. In another example, step 824 re-sets the network address accumulator to a predefined percentage of the network address accumulator's current value. Following step 824, the network address access algorithm application process ends at step 826.

If step 822 determines that the current transaction interval is not greater than the reset time interval, then in step 828 security exit program 116 (see FIG. 1) selects and applies an accumulator adjustment value to the network address accumulator (i.e., either adds the accumulator adjustment value to or subtracts the accumulator adjustment value from the network address accumulator). The selection and the type of application (i.e., adding or subtracting) of the accumulator adjustment value is based on the performance level determined in step 808 (see FIG. 8A) and the group determined in step 820. Each combination of a performance level determined in step 808 (see FIG. 8A) and a group determined in step 820 is associated with a particular accumulator adjustment value and a particular arithmetic operation to perform on the network address accumulator with the accumulator adjustment value.

The adding of a selected accumulator adjustment value to the network address accumulator in step 828 indicates a penalty analogous to the penalty described above relative to step 724 (see FIG. 7B).

The subtracting of a selected accumulator adjustment value from the network address accumulator in step 828 indicates a reward analogous to the reward described above relative to step 724 (see FIG. 7B).

In step 830, security exit program 116 (see FIG. 1) determines whether or not the value of the network address accumulator is zero or a negative value. If step 830 determines that the value of the network address accumulator is zero or a negative value, then in step 832 security exit program 116 (see FIG. 1) re-sets (i.e., re-initializes) the counters in the set of counters generated in step 814 (see FIG. 8A). For example, step 832 re-sets the counters in the set of counters to zero. Following step 832 and following the No branch of step 830, the network address access algorithm application process continues in step 834 of FIG. 8C.

Figure 8C:
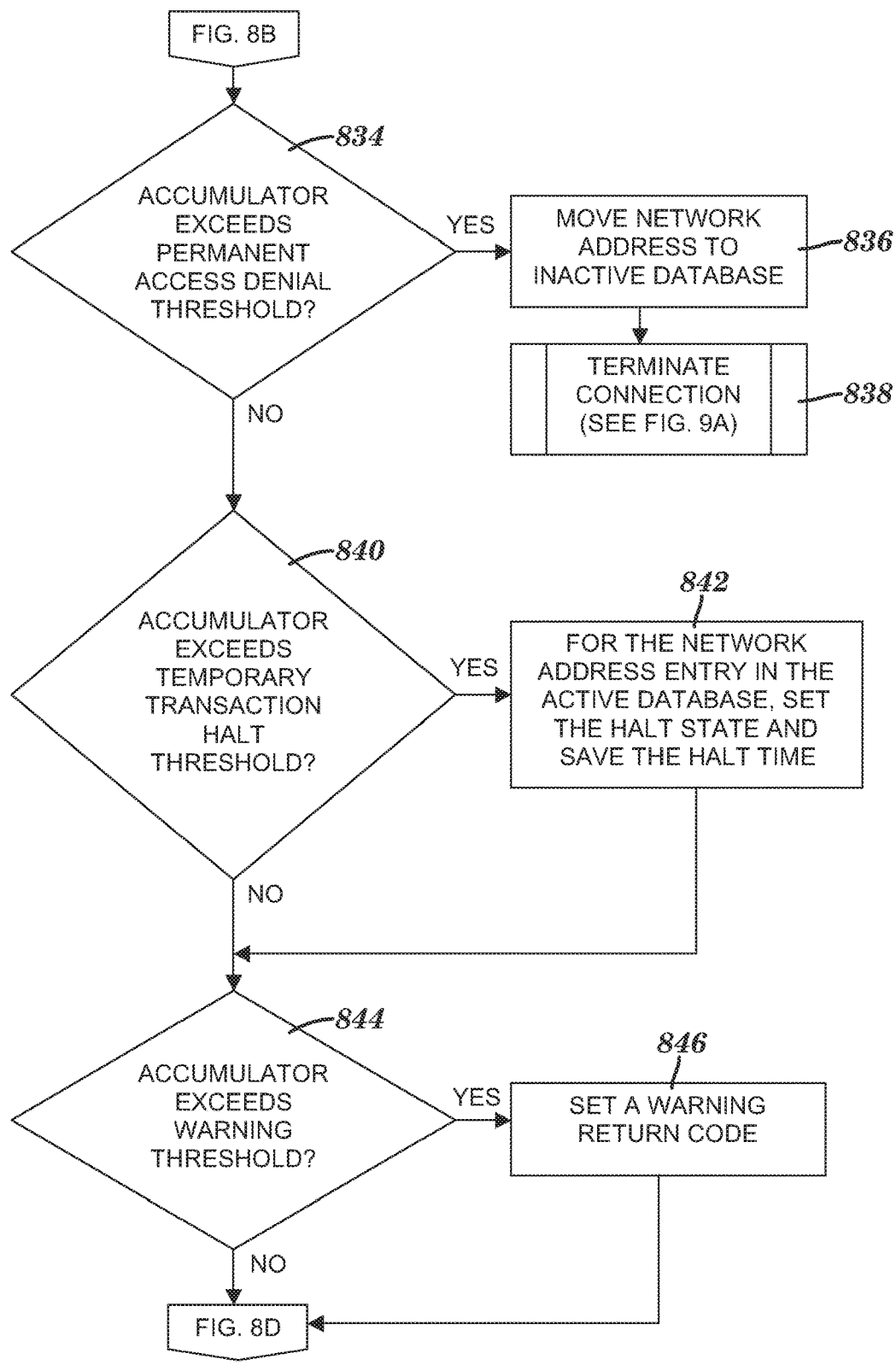

In step 834 of FIG. 8C, security exit program 116 (see FIG. 1) determines whether or not the network address accumulator exceeds the permanent access denial threshold defined in step 304 (see FIG. 3) and stored in statistics database 126 (see FIG. 1). If step 834 determines that the network address accumulator exceeds the permanent access denial threshold, then in step 836 security exit program 116 (see FIG. 1) removes the network address from active network address database 122 (see FIG. 1) and places the network address into inactive network address database 124 (see FIG. 1) (i.e., moves the network address from the active database 122 of FIG. 1 to the inactive database 124 of FIG. 1). In step 838, security exit program 116 (see FIG. 1) terminates the connection between the client computing unit and server computing unit 102 (see FIG. 1), as described below relative to FIG. 9A. After placing the network address into inactive network address database 124 (see FIG. 1), subsequent attempts by the network address to access application program 114 (see FIG. 1) are denied by the check in step 406 (see FIG. 4A). Thus, steps 834, 836 and 838 detect runaway clients and set such clients in an inactive state.

If step 834 determines that the network address accumulator does not exceed the permanent access denial threshold, then in inquiry step 840, security exit program 116 (see FIG. 1) determines whether or not the network address accumulator exceeds the temporary halt threshold defined in step 304 (see FIG. 3) and stored in statistics database 126 (see FIG. 1). If step 840 determines that the network address accumulator exceeds the temporary transaction halt threshold, then in step 842, security exit program 116 (see FIG. 1) places the network address in a temporary halted state (i.e., sets a halt state indicator associated with the entry for the network address in active network address database 122 of FIG. 1). The network address is in the temporary halted state for at least a cool down period that is equal to the reset time interval defined in step 306 (see FIG. 3). In step 842, security exit program 116 (see FIG. 1) also obtains and saves the current time in active network address database 122 (see FIG. 1) as the time of temporarily halting the network address (a.k.a. network address temporary halt time). The network address temporary halt time saved in step 842 is associated with the entry for the network address in active network address database 122 (see FIG. 1) and is used to determine if the reset time interval is expired in step 422 (see FIG. 4B).

Inquiry step 844 follows both step 842 and the No branch of inquiry step 840. In inquiry step 844, security exit program 116 (see FIG. 1) determines whether or not the network address accumulator exceeds the warning threshold defined in step 304 (see FIG. 3) and stored in statistics database 126 (see FIG. 1). If step 844 determines that the network address accumulator exceeds the warning threshold, then in step 846, security exit program 116 (see FIG. 1) sets a warning return code that is sent from server computing unit 102 (see FIG. 1) to the client computing unit. The warning return code indicates an excessive usage of application program 114 (see FIG. 1) and warns the client computing unit to slow down the network address's requests for access to application program 114 (see FIG. 1). Following step 846 and following the No branch of inquiry step 844, the network address access algorithm application process continues in step 848 of FIG. 8D.

Figure 8D:
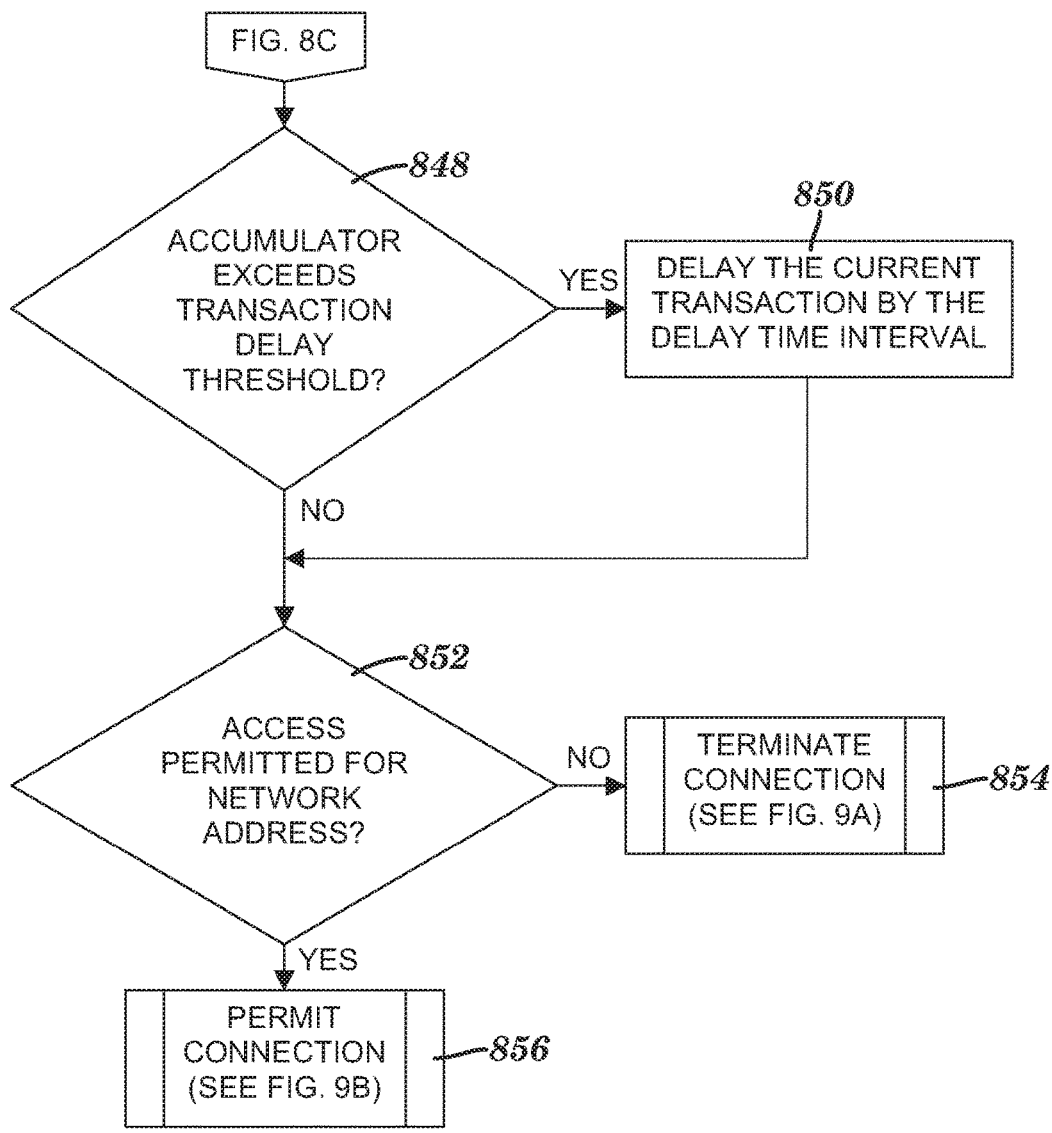

In inquiry step 848 of FIG. 8D, security exit program 116 (see FIG. 1) determines whether or not the network address accumulator exceeds the transaction delay threshold defined in step 304 (see FIG. 3) and stored in statistics database 126 (see FIG. 1). If step 848 determines that the network address accumulator exceeds the transaction delay threshold, then in step 850, security exit program 116 (see FIG. 1) delays the current transaction by the delay time interval defined in step 308 (see FIG. 3). That is, the security exit program delays a response to the client request received in step 204 (see FIG. 2A) until the delay time interval expires. For single-threaded clients, the delay provided by step 850 creates a governor effect by causing longer response times between transactions from the network address, which result in a decrease in the value of the network address accumulator. The resulting decrease in the value of the network address accumulator results in a removal of the delay. Multi-threaded clients circumvent the aforementioned governor effect, but are stopped by either exceeding the concurrent connection limit checked in steps 408 and 410 (see FIG. 4A) or by being in the temporary halted state checked in steps 412 and 420 (see FIG. 4B).

Inquiry step 852 follows both step 850 and the No branch of inquiry step 848. In inquiry step 852, security exit program 116 (see FIG. 1) determines whether or not access to application program 114 (see FIG. 1) is permitted for the network address. If step 852 determines that access to the application program is not permitted for the network address, then in step 854, security exit program 116 (see FIG. 1) terminates the connection between the client computing unit and server computing unit 102 (see FIG. 1); otherwise, security exit program 116 (see FIG. 1) permits the connection between the client computing unit and application program 114 (see FIG. 1) (i.e., permits access between the client computing unit and the application program). Permitting the connection in step 856 is described below relative to FIG. 9B. The connection is permitted in step 856 in response to the security exit program determining that (1) access is permitted for the user ID in step 748 (see FIG. 7D) and (2) access is permitted for the network address in step 852.

Figure 9A:
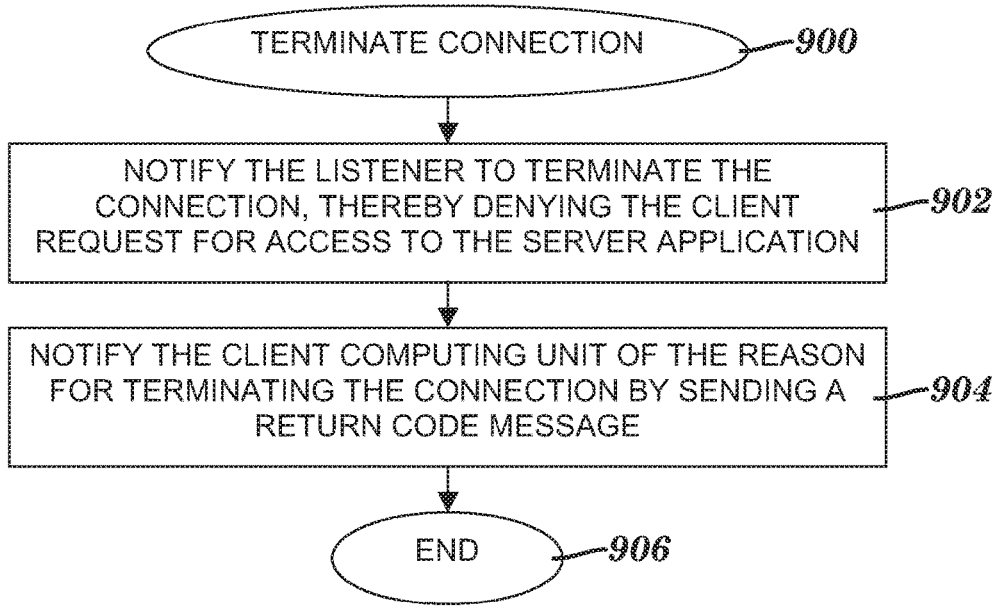
FIG. 9A is a flow diagram of a connection termination process included in the processes of FIGS. 4A & 4B, FIGS. 7C & 7D, FIGS. 8C & 8D and FIG. 9B, in accordance with embodiments of the present invention.

FIG. 9A is a flow diagram of a connection termination process included in the processes of FIGS. 4A & 4B, FIGS. 7C & 7D, FIGS. 8C & 8D and FIG. 9B, in accordance with embodiments of the present invention. The connection termination process begins at step 900. In step 902, security exit program 116 (see FIG. 1) notifies listener 112 to terminate the connection between the client computing unit (e.g., client computing unit 104 of FIG. 1) and server computing unit 102 (see FIG. 1), thereby denying the client request for access to application program 114 (see FIG. 1). In step 904, listener 112 (see FIG. 1) sends a return code message to the client computing unit. The return code message sent in step 904 notifies the client computing unit of the reason for terminating the connection between the client computing unit and server computing unit 102 (see FIG. 1). For example, the return code is a halt return code to indicate that the halt state has been set and the reset time interval has not expired. The connection termination process ends at step 906.

Figure 9B:
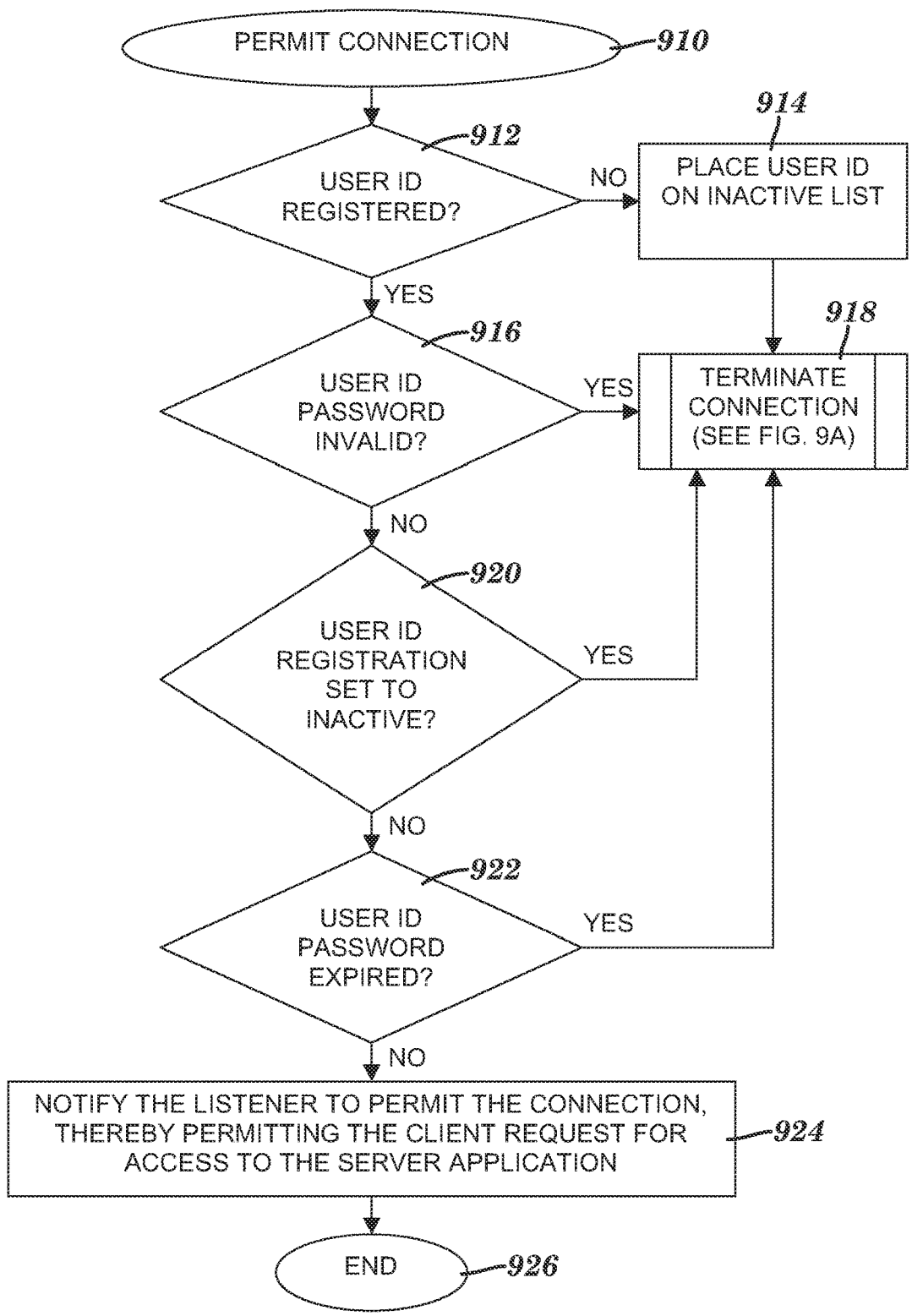
FIG. 9B is a flow diagram of a connection permit process included in the processes of FIG. 5, FIG. 8A, and FIG. 8D, in accordance with embodiments of the present invention.

FIG. 9B is a flow diagram of a connection permit process included in the processes of FIG. 5, FIG. 8A, and FIG. 8D, in accordance with embodiments of the present invention. The connection permit process starts at step 910. In inquiry step 912, security exit program 116 (see FIG. 1) determines whether or not the user ID is registered to application program 114 (see FIG. 1). If inquiry step 912 determines that the user ID is not registered then in step 914, security exit program 116 (see FIG. 1) places the user ID in the inactive user ID database 120 (see FIG. 1). In step 918, which follows step 914, security exit program 116 (see FIG. 1)

terminates the connection between the client computing unit and server computing unit 102 (see FIG. 1), as described above relative to FIG. 9A.

Returning to inquiry step 912, if security exit program 116 (see FIG. 1) determines that the user ID is registered, then in inquiry step 916, the security exit program determines whether or not the password (a.k.a. user ID password) associated with the user ID is invalid. If inquiry step 916 determines that the user ID password is invalid, then the connection between the client computing unit and server computing unit 102 (see FIG. 1) is terminated in step 918, which is described above.

If inquiry step 916 determines that the user ID password is valid (i.e., the No branch of step 916), then in inquiry step 920 security exit program 116 (see FIG. 1) determines whether or not the user ID registration is set to an inactive state. If step 920 determines that the user ID registration is set to an inactive state, then the aforementioned connection is terminated in step 918, as described above.

If step 920 determines that the user ID registration is not set to an inactive state, then in inquiry step 922, security exit program 116 (see FIG. 1) determines whether or not the user ID password is expired. If the user ID password is expired, then the aforementioned connection is terminated in step 918, as described above.

If inquiry step 922 determines that the user ID password is not expired, then in step 924, security exit program 116 (see FIG. 1) notifies listener 112 (see FIG. 1) to permit the aforementioned connection, thereby permitting the client request for access to application program 114 (see FIG. 1) by the client computing unit. The connection permit process ends at step 926.

EXAMPLES

Examples of controlling client access to a server application are shown in this section in FIGS. 10-21. The examples in this section relative to FIGS. 10-14E illustrate the logic related to a user ID associated with a client request for access to application program 114 (see FIG. 1) without illustrating the analogous logic related to a network address associated with the client request. As described above, a logical OR is applied to deny client access to the application program—if either the user ID fails to meet the performance criteria checked in the access algorithm of FIGS. 7A-7D or if the network address fails to meet the performance criteria checked in the access algorithm of FIGS. 8A-8D, then the connection between the client computing unit and the server computing unit is terminated and access to the application program is denied. In this section, any reference to a client or a client computing unit refers to client computing unit 104, 106 or 108 of FIG. 1.

Table 1000 in FIG. 10 is an exemplary table of control parameters defined in step 202 of FIG. 2A and step 302 of FIG. 3. Table 1000 includes four performance levels numbered 1 through 4, along with transaction rates and halt time intervals corresponding to each performance level. For instance, as shown in the third data row of table 1000, performance level 3 is associated with a transaction rate of 20 transactions per second and a halt time interval of 5 minutes.

Table 1100 in FIG. 11 is an exemplary table of threshold level values defined in step 202 of FIG. 2A and step 304 of FIG. 3. In this example, the temporary transaction halt threshold is 100,000. For instance, as shown in the second data row of table 1100, the delay threshold (a.k.a. transaction delay threshold) is 90% of the temporary transaction halt threshold, which equals 0.90×100,000 or 90,000. The actions of warning, delaying and moving a user ID to inactive database 120 (see FIG. 1) as the user ID accumulator exceeds the warning, delay and permanent access denial thresholds, respectively, are described above relative to the process of FIGS. 7A-7D. In this example, if the user ID accumulator exceeds 90,000 (i.e., the delay threshold) in step 744 (see FIG. 7D), then the current transaction is delayed in step 746 (see FIG. 7D).

Table 1200 in FIG. 12 is an exemplary table of control parameters defined in step 202 of FIG. 2A and steps 306, 308 and 310 of FIG. 3. In this example, the reset time interval is one minute, the delay time interval is one second, and the concurrent connection limit per user ID or per network address is 10 concurrent connections for a user ID. For example, using the delay threshold in FIG. 11 and the delay time interval in FIG. 12, if the value of the user ID accumulator exceeds 90,000 in step 744 (see FIG. 7D), then the current transaction is delayed by one second (i.e., the delay time interval) in step 746 (see FIG. 7D).

Table 1300 in FIG. 13A is an exemplary table that includes, for each performance level of FIG. 10, a number of transactions that can be sent at a steady rate by a user ID before the user ID accumulator reaches the temporary transaction halt threshold. The numbers of transactions in table 1300 are determined in step 210 (see FIG. 2A) using each performance level's transaction rate and halt time interval shown in FIG. 10. Table 1300 also includes the halt time interval associated with each performance level. For example, at performance level 1 in table 1300, which has a transaction rate of 100 transactions/second and a halt time interval of 20 seconds (see FIG. 10), a user ID sends 2000 transactions (i.e., 100 transactions/second×20 seconds) at a steady rate of 100 transactions/second before the user ID's transactions are temporarily halted.

Table 1350 in FIG. 13B is an exemplary table that includes a time interval between successive transactions at each performance level in FIG. 13A. The time intervals in table 1350 are determined in step 210 (see FIG. 2A). For instance, at performance level 1 of table 1350, the time interval between successive transactions of the 2000 transactions listed in table 1300 (see FIG. 13A) is 10 milliseconds (i.e., 20 seconds/2000 transactions=0.01 seconds or 10 milliseconds between successive transactions). The time intervals in table 1350 define performance levels for time intervals between any successive transactions being monitored by security exit program 116 (see FIG. 1). In the example shown in table 1350, a time interval between monitored successive transactions that is (1) less than or equal to 10 milliseconds is considered to be included in performance level 1; (2) greater than 10 milliseconds and less than or equal to 20 milliseconds is considered to be included in performance level 2; (3) greater than 20 milliseconds and less than or equal to 50 milliseconds is considered to be included in performance level 3; and (4) greater than 50 milliseconds and less than or equal to 100 milliseconds is considered to be included in performance level 4. One example of the aforementioned time interval between successive transactions is the current transaction interval determined in step 702 (see FIG. 7A).

Each performance level of table 1350 is associated with a performance level counter. A performance level counter is updated based on identifying the performance level associated with a time interval between successive transactions. For example, if the time interval between successive transactions from a user ID is 49 milliseconds, then the time interval is associated with performance level 3, and the performance level 3 counter is incremented by one.

FIG. 14A is an exemplary table 1400 that includes, for each performance level, a number of transactions that can be sent within the halt time interval of performance level 1 (i.e., 20 seconds) (see table 1300 of FIG. 13A). As table 1400 illustrates, the numbers of transactions decrease from performance level 1 to performance level 4, as long as the transactions occur within the halt time interval of performance level 1.

FIG. 14B is an exemplary table 1420 that includes, for each performance level, a number of transactions that can be sent within the halt time interval of performance level 2 (i.e., 1 minute or 60 seconds) (see table 1300 of FIG. 13A). In table 1420, the number of transactions associated with performance level 1 is limited to 2000—the same number of transactions associated with performance level 1 in table 1300 (see FIG. 13A). The performance level 1 number of transactions in table 1420 is limited to 2000 because after 20 seconds of the entire 60 second interval passes, transactions arriving at the transaction rate of performance level 1 are temporarily halted. Therefore, the maximum number of transactions over 60 seconds in table 1420 is associated with performance level 2, thereby illustrating that a slower transaction rate (i.e., 50 transactions/second for performance level 2, which is slower than the 100 transactions/second for performance level 1) is rewarded with the highest number of transactions (i.e., 3000) in a 60 second time interval.

FIG. 14C is an exemplary table 1440 that includes, for each performance level, a number of transactions that can be sent within the halt time interval of performance level 3 (i.e., 5 minutes or 300 seconds) (see table 1300 of FIG. 13A). In table 1440, the numbers of transactions associated with performance levels 1 and 2 are limited to 2000 and 3000, respectively. The aforementioned 2000 transaction limit for performance level 1 is described above relative to FIG. 14B. Further, after 60 seconds of the entire 300 second interval passes, transactions arriving at the transaction rate of performance level 2 are temporarily halted. Therefore, the maximum number of transactions over 300 seconds in table 1440 is associated with performance level 3, thereby illustrating that compared to the transaction rates of performance levels 1 and 2, a slower transaction rate (i.e., 20 transactions/second for performance level 3) is rewarded with the highest number of transactions (i.e., 6000) in the 300 second time interval.

FIG. 14D is an exemplary table 1460 that includes, for each performance level, a number of transactions that can be sent within the halt time interval of performance level 4 (i.e., 20 minutes or 1200 seconds) (see table 1300 of FIG. 13A). In table 1460, the numbers of transactions associated with performance levels 1, 2 and 3 are limited to 2000, 3000 and 6000, respectively. The aforementioned 2000 and 3000 limits are described above relative to FIG. 14B and FIG. 14C, respectively. Further, after 5 minutes of the entire 20 minute interval passes, transactions arriving at the transaction rate of performance level 3 are temporarily halted. Therefore, the maximum number of transactions over 20 minutes in table 1460 is associated with performance level 4, thereby illustrating that compared to the transaction rates of performance levels 1, 2 and 3, a slower transaction rate (i.e., 10 transactions/second for performance level 4) is rewarded with the highest number of transactions (i.e., 12000) in the 20 minute time interval.

FIGS. 14A-14D compare transaction numbers for performance levels in an environment in which a reset time interval is at least 20 minutes. By adjusting the reset time interval, throughput will increase. For example, table 1480 in FIG. 14E includes, for each performance level, numbers of transactions in a 20 minute time interval with a reset time interval of only one minute. In the scenario illustrated by table 1480, no delay time interval is set. Compared to FIG. 14D, table 1480 illustrates a significant increase in transaction throughput for performance levels 1, 2 and 3. For instance, for performance level 1, 30,000 transactions occur in the 20 minute interval, with 15 one-minute delays (i.e., delays over the reset time interval) caused by temporary transaction halts.

To take advantage of the higher throughputs illustrated in table 1480, client computing units are configured to tolerate the reset time interval. That is, each client computing unit accepts the reset time interval without interpreting a halt return code as a server down condition. Thus, a substantially high transaction throughput is achieved while the server computing unit is protected from a runaway client.

Figure 15A:
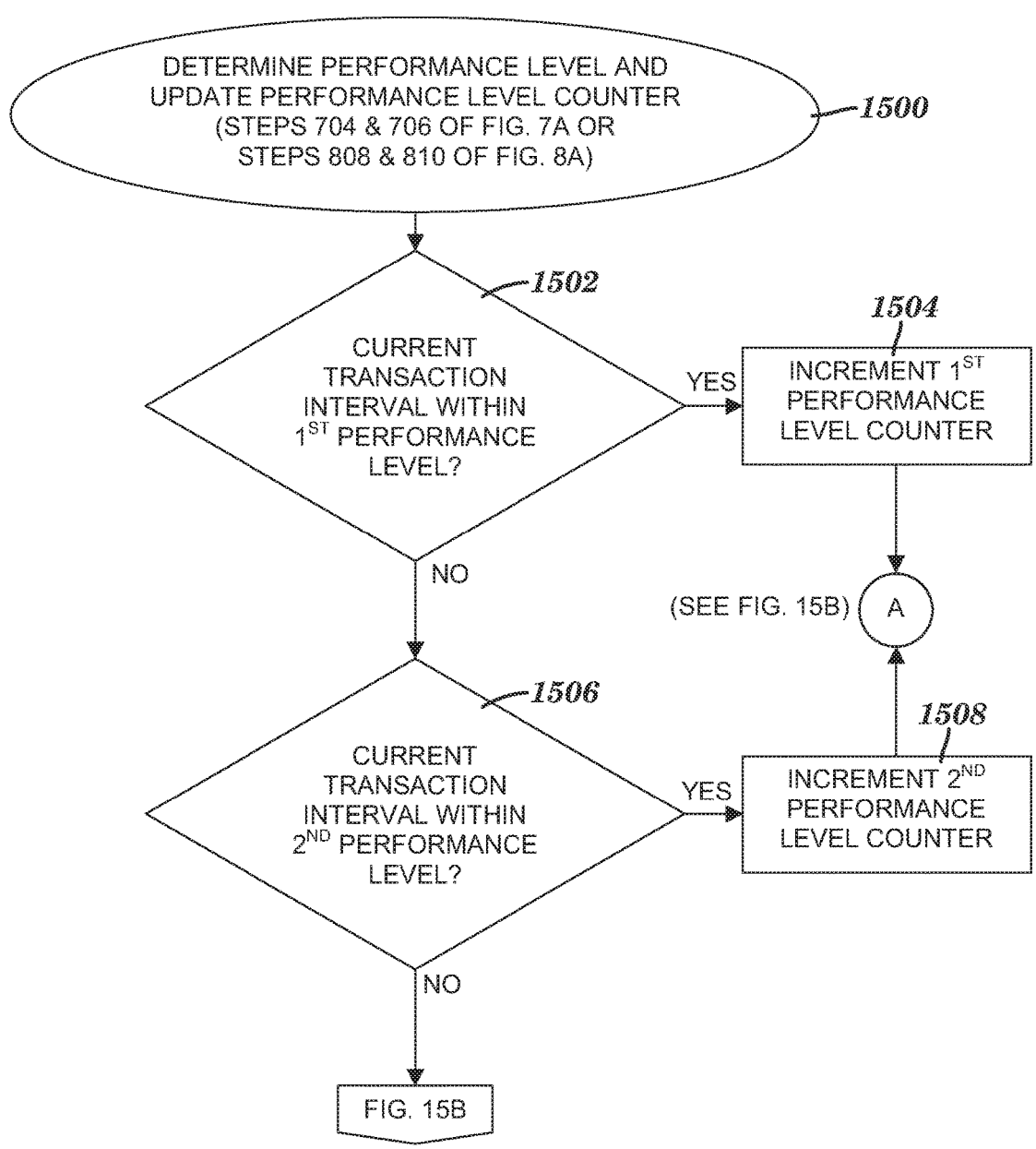
FIGS. 15A-15B depict a flow diagram of an exemplary performance level determination and performance level counter update included in the processes of FIG. 7A and FIG. 8A, in accordance with embodiments of the present invention.
Figure 15B:
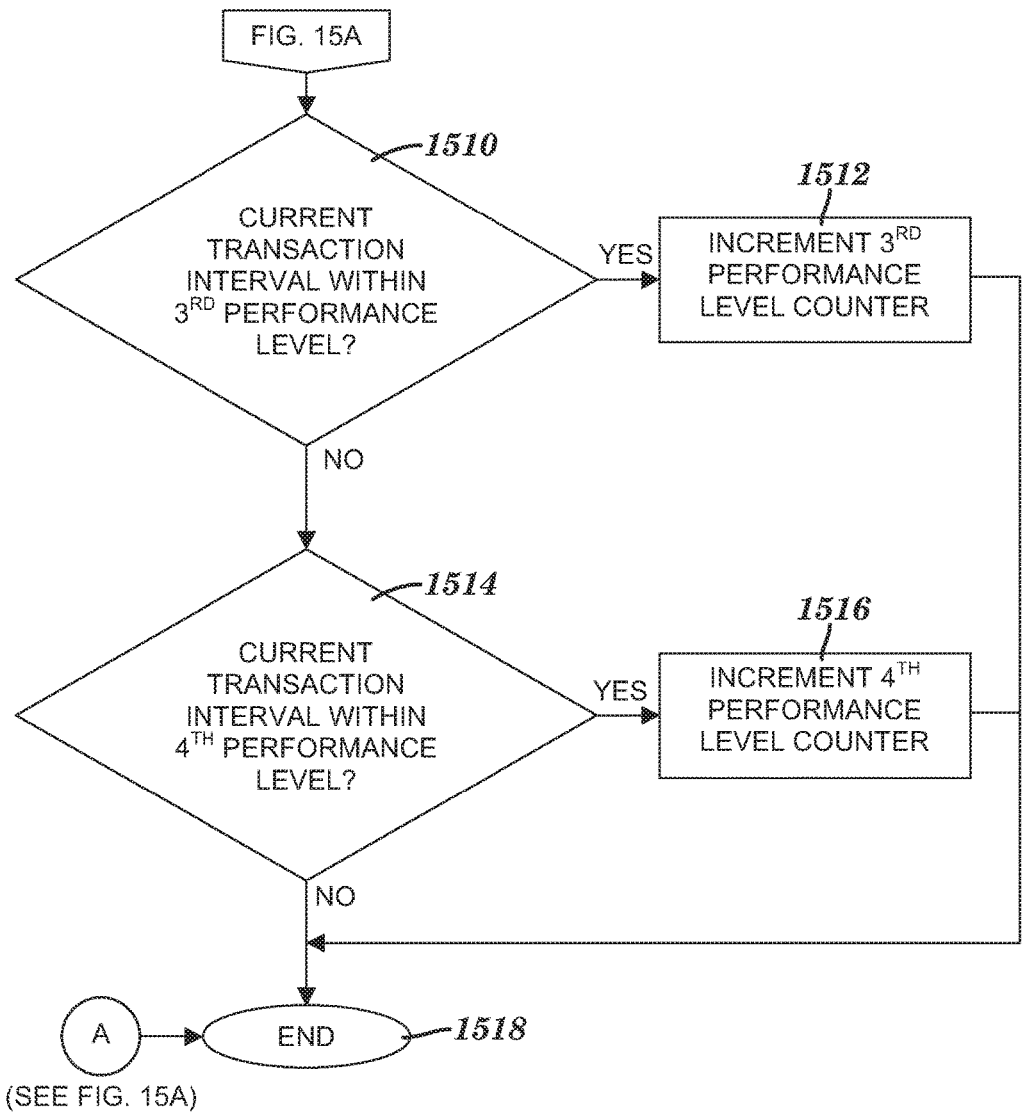

FIGS. 15A-15B depict a flow diagram of a process for determining a performance level of the four exemplary performance levels in table 1350 (see FIG. 13B) and for updating a performance level counter associated with the determined performance level. The performance level determination and performance level counter update in the process of FIGS. 15A-15B are included in steps 704 and 706 of FIG. 7A and steps 808 and 810 of FIG. 8A, in accordance with embodiments of the present invention.

The process of FIGS. 15A-15B begins at step 1500. If security exit program 116 (see FIG. 1) in inquiry step 1502 determines that a current transaction interval is included within the first performance level of table 1350 (see FIG. 13B) (i.e., current transaction interval is less than or equal to 10 milliseconds), then a first performance level counter is incremented (e.g., incremented by one) in step 1504; otherwise, the process of FIGS. 15A-15B continues with inquiry step 1506.

If security exit program 116 (see FIG. 1) in inquiry step 1506 determines that the current transaction interval is included within the second performance level of table 1350 (see FIG. 13B) (i.e., current transaction interval is greater than 10 milliseconds and less than or equal to 20 milliseconds), then a second performance level counter is incremented (e.g., incremented by one) in step 1508; otherwise, the process of FIGS. 15A-15B continues with inquiry step 1510 in FIG. 15B.

If security exit program 116 (see FIG. 1) in inquiry step 1510 of FIG. 15B determines that the current transaction interval is included within the third performance level of table 1350 (see FIG. 13B) (i.e., current transaction interval is greater than 20 milliseconds and less than or equal to 50 milliseconds), then a third performance level counter is incremented (e.g., incremented by one) in step 1512; otherwise, the process of FIGS. 15A-15B continues with inquiry step 1514.

If security exit program 116 (see FIG. 1) in inquiry step 1514 determines that the current transaction interval is included within the fourth performance level of table 1350 (see FIG. 13B) (i.e., current transaction interval is greater than 50 milliseconds and less than or equal to 100 milliseconds), then a fourth performance level counter is incremented (e.g., incremented by one) in step 1516; otherwise, the process of FIGS. 15A-15B ends at step 1518. The process of FIGS. 15A-15B also ends at step 1518 following step 1504, step 1508 or step 1512.

FIG. 16 is an exemplary table 1600 of accumulator adjustment values for the four performance levels of table 1000 (see FIG. 10). The accumulator adjustment values are added to or subtracted from the user ID accumulator (see step 724 of FIG. 7B) or the network address accumulator (see step 828 of FIG. 8B). In one embodiment, any transaction that is received having a current transaction interval less than an estimated rate based on a historical transaction interval pattern results in the accumulator adjustment value being subtracted instead of added to the accumulator.

Again, the accumulator adjustment value determined for a performance level is the value that can be added to the user ID accumulator or network address accumulator in response to each transaction being sent at a steady transaction rate shown in table 1000 (see FIG. 10) over the corresponding halt time interval shown in table 1000 (see FIG. 10), so that the temporary transaction halt threshold is reached at the end of the halt time interval. For example, if 2000 transactions are sent in 20 seconds (i.e., sent at the performance level 1 transaction rate in FIG. 10), then the accumulator reaches the temporary transaction halt threshold of 100,000 after 50 is added to the accumulator in response to each of the 2000 transactions (i.e., 2000×50=100,000).

Up to this point in this section, the sample scenarios (e.g., the scenarios relative to FIGS. 14A-14E) are based on sending client requests at a steady transaction rate. More typically, however, the transaction rate will vary and may vary substantially. For example, large bursts of transactions in a relatively small time interval are followed by relatively long periods of inactivity during which the client computing unit processes the results of the transactions. Such varying transaction rates makes it difficult to attempt to detect extremely high usage of an application program while sorting out legitimate, varying client requests from a runaway client that has, for instance, a program error causing a program loop situation or from a powerful client that can process transactions at a faster rate than the server can handle (considering that the server is processing requests from multiple clients). For example, a client computing unit that sends a substantially large number of requests in a relatively short period of time (i.e., transactions at performance level 1) and then substantially slows down the transaction rate or stops is no longer a threat to the server computing unit, yet has accumulated a substantially high count of performance level 1 transactions along with substantially low counts for the other performance levels. Simply using the highest count of the four performance levels in table 1000 (see FIG. 10) will mistakenly identify such a client computing unit as a high usage threat to the server computing unit, while failing to recognize that the client computing unit that has substantially slowed its transaction rate following the large number of requests in the relatively short period of time.

To detect such a condition in which the client slows down substantially following a large number of requests in a relatively short period of time, the present invention generates a set of counters that includes the performance level counters and one or more counters whose values combine two or more of the performance level counters. For example, step 710 (see FIG. 7A) or step 814 (see FIG. 8A) generates a set of 10 counters using four counters that count current transaction intervals included in the four performance levels of FIG. 13B and six other counters whose values are the six combinations of the four performance level counters taken two at a time. That is, the four counters associated with performance levels 1 through 4 are performance level 1 counter (a.k.a. first performance level counter), performance level 2 counter (a.k.a. second performance level counter), performance level 3 counter (a.k.a. third performance level counter) and performance level 4 counter (a.k.a. fourth performance level counter), respectively. Furthermore, the six other counters include: (1) performance level 1 counter+performance level 2 counter; (2) performance level 1 counter+performance level 3 counter; (3) performance level 1 counter+performance level 4 counter; (4) performance level 2 counter+performance level 3 counter; (5) performance level 2 counter+performance level 4 counter; and (6) performance level 3 counter+performance level 4 counter.

Using such a set of counters that includes the performance level counters and combinations thereof facilitates development of a measure of a user ID's or a network address's overall usage of application program 114 (see FIG. 1) with emphasis placed on the most recent transaction activity.

Figure 17:
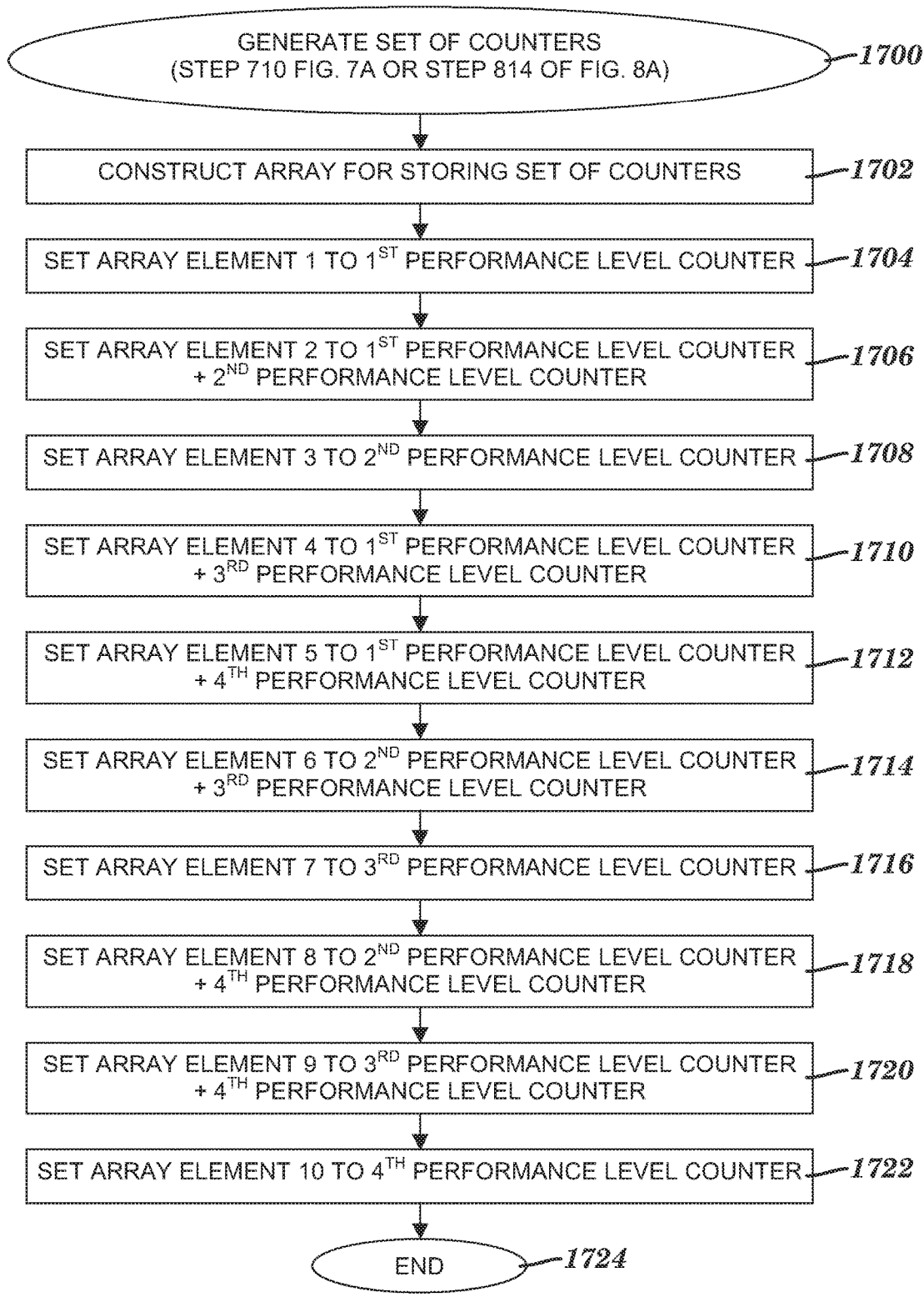
FIG. 17 is a flow diagram of a process for generating an exemplary set of counters, where the process is included in the processes of FIG. 7A and FIG. 8A, in accordance with embodiments of the present invention.

FIG. 17 is a flow diagram of a process for generating the above-described exemplary set of ten counters. Again, the ten counters include counters associated with, in a one-to-one correspondence, the four performance levels of table 1000 (see FIG. 10) and six combinations of the four performance levels taken two at a time. The process of FIG. 17 is included in step 710 of FIG. 7A and step 814 of FIG. 8A. The ten counters in the set are re-calculated for each transaction. The generation of the set of counters starts at step 1700. In step 1702, security exit program 116 (see FIG. 1) constructs a 10-element array for storing the set of ten counters.

In step 1704, security exit program 116 (see FIG. 1) sets array element 1 to the first performance level counter. In step 1706, security exit program 116 (see FIG. 1) sets array element 2 to a counter whose value is the sum of the first performance level counter and the second performance level counter.

In step 1708, security exit program 116 (see FIG. 1) sets array element 3 to the second performance level counter. In step 1710, security exit program 116 (see FIG. 1) sets array element 4 to a counter whose value is the sum of the first performance level counter and the third performance level counter.

In step 1712, security exit program 116 (see FIG. 1) sets array element 5 to a counter whose value is the sum of the first performance level counter and the fourth performance level counter. In step 1714, security exit program 116 (see FIG. 1) sets array element 6 to a counter whose value is the sum of the second performance level counter and the third performance level counter.

In step 1716, security exit program 116 (see FIG. 1) sets array element 7 to the third performance level counter. In step 1718, security exit program 116 (see FIG. 1) sets array element 8 to a counter whose value is the sum of the second performance level counter and the fourth performance level counter.

In step 1720, security exit program 116 (see FIG. 1) sets array element 9 to a counter whose value is the sum of the third performance level counter and the fourth performance level counter. In step 1722, security exit program 116 (see FIG. 1) sets array element 10 to the fourth performance level counter. The generation of the set of counters ends at step 1724.

FIG. 18 is a table 1800 of exemplary groups into which the set of ten counters generated in FIG. 17 are categorized in step 712 of FIG. 7A and step 816 of FIG. 8B, in accordance with embodiments of the present invention. Table 1800 also includes the source(s) of count information for each element of the array constructed in step 1702 (see FIG. 17). Using predetermined criteria, the groups in table 1800 characterize transaction rates that are in one performance level or mixtures of transaction rates that vary between two performance levels.

After filling in values for the 10 counters set up in the process of FIG. 17, security exit program 116 (see FIG. 1) scans to find the array element with the maximum value in step 714 (see FIG. 7A) and in step 818 (see FIG. 8B). For example, if array element 1 is the maximum counter value, then the user ID or network address is sending transactions at a highest rate (i.e., at the performance level 1 transaction rate of 100 transactions per second or higher), without any slowdowns to lower transaction rates. If the maximum counter value is array element 2, then the user ID or network address is applying only a slightly lower overall transaction rate than the rate associated with array element 1. Array element 1 and array element 2 are grouped into group 1 in table 1800, where group 1 indicates the highest transaction rates. If an historical pattern of transaction intervals for a user ID or network address is identified as being in group 1, then the present invention applies a highest level of monitoring because there are very few client requests being sent at lower transaction rates.

Group 2 in table 1800 includes transactions included in performance level 2, along with combinations of transactions in performance levels 1 and 3 and combinations of transactions in performance levels 1 and 4. The combinations of transactions in levels 1 and 3 and levels 1 and 4 represent a mixture of transactions at the fastest performance level transaction rate with transactions at the two slowest performance level transaction rates. According to predetermined criteria, the mixture of transactions in the aforementioned combinations of transactions in levels 1 and 3 and levels 1 and 4 indicate an amount of variation sufficient to require a level of monitoring that is lesser than group 1's.

Group 3 in table 1800 includes transactions at middling levels of transaction rates, which collectively appear to be similar to a steady transaction rate associated with performance level 3. Group 4 in table 1800 includes the lowest transaction rate associated with performance level 4 while allowing for a small mix of transaction rates at performance level 2 and/or performance level 3.

Figure 19A:
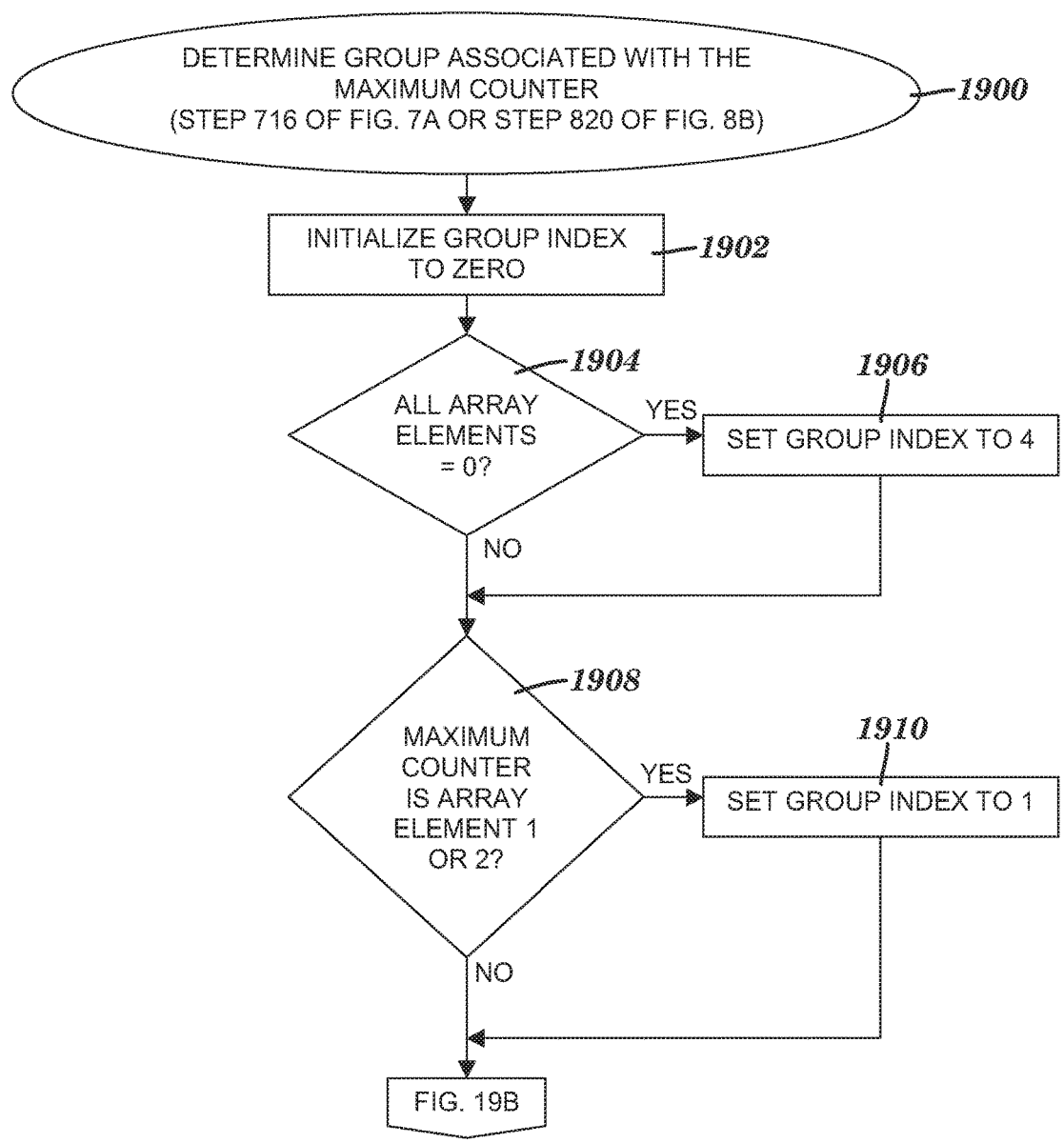
FIGS. 19A-19B depict a flow diagram of an exemplary process included in the processes of FIG. 7A and FIG. 8B, where the process determines a group in the table of FIG. 18 that is associated with a maximum counter of the counters generated in the process of FIG. 17, in accordance with embodiments of the present invention.
Figure 19B:
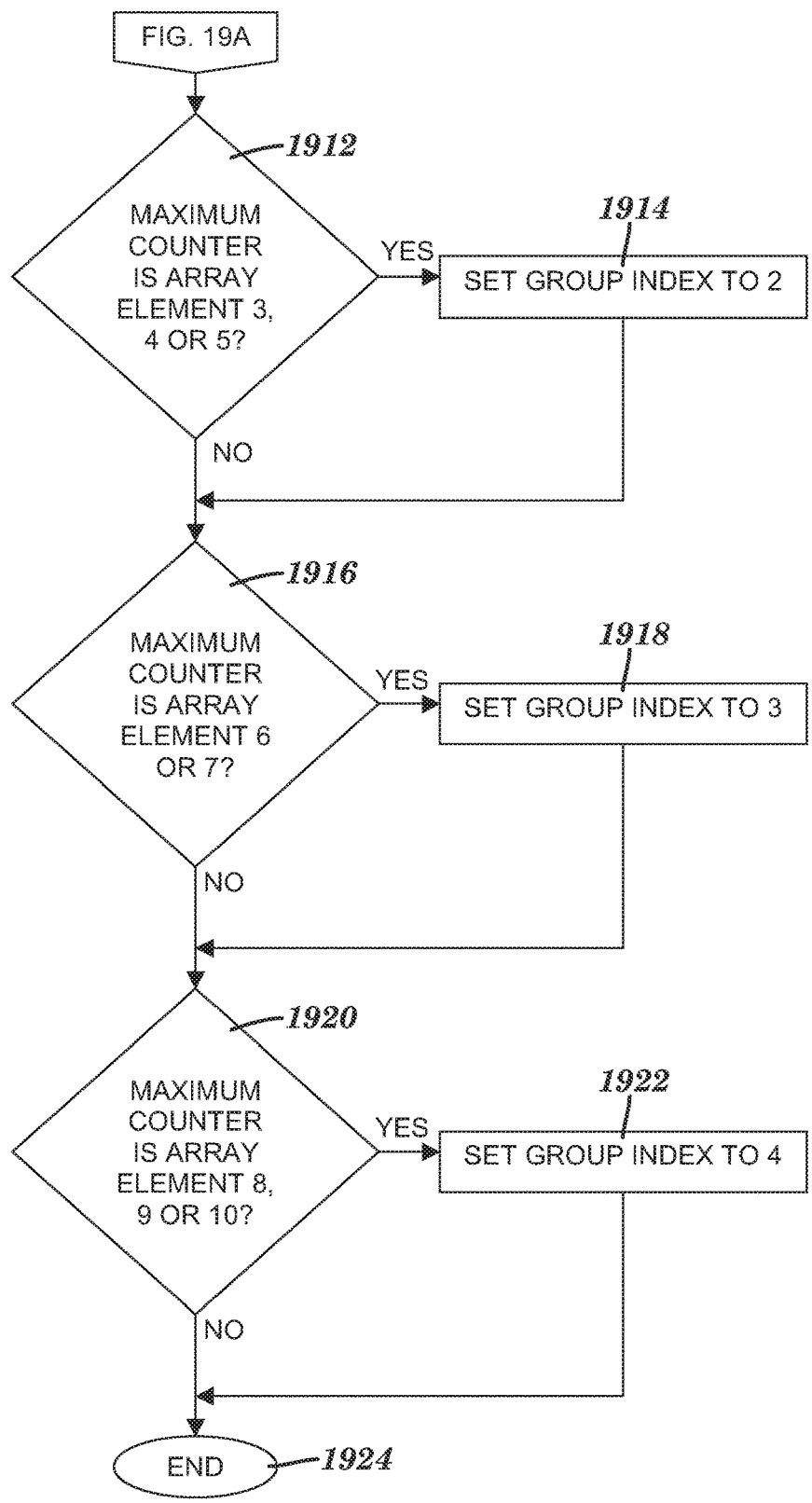

FIGS. 19A-19B depict a flow diagram of a process for determining the group of table 1800 (see FIG. 18) that is associated with the maximum counter of the set of counters set up in the array constructed in the process of FIG. 17. The process of FIGS. 19A-19B is included in step 716 of FIG. 7A and step 820 of FIG. 8B. The process of FIGS. 19A-19B starts at step 1900. In step 1902, security exit program 116 (see FIG. 1) initializes a group index to zero. If security exit program 116 determines in step 1904 that all of the elements of the array are equal to zero, then in step 1906, the security exit program sets the group index to 4 (i.e., indicating that the maximum counter is associated with group 4 in table 1800 of FIG. 18); otherwise, the process of FIGS. 19A-19B continues with step 1908. Step 1908 also follows step 1906.

If security exit program 116 (see FIG. 1) determines in step 1908 that the maximum counter is array element 1 or 2, then in step 1910, the security exit program sets the group index to 1 (i.e., indicating that the maximum counter is associated with group 1 in table 1800 of FIG. 18); otherwise, the process of FIGS. 19A-19B continues with step 1912 of FIG. 19B. Step 1912 of FIG. 19B also follows step 1910.

If security exit program 116 (see FIG. 1) determines in step 1912 of FIG. 19B that the maximum counter is array element 3, 4 or 5, then in step 1914, the security exit program sets the group index to 2 (i.e., indicating that the maximum counter is associated with group 2 in table 1800 of FIG. 18); otherwise, the process of FIGS. 19A-19B continues with step 1916. Step 1916 also follows step 1914.

If security exit program 116 (see FIG. 1) determines in step 1916 that the maximum counter is array element 6 or 7, then in step 1918, the security exit program sets the group index to 3 (i.e., indicating that the maximum counter is associated with group 3 in table 1800 of FIG. 18); otherwise, the process of FIGS. 19A-19B continues with step 1920. Step 1920 also follows step 1918.

If security exit program 116 (see FIG. 1) determines in step 1920 that the maximum counter is array element 8, 9 or 10, then in step 1922, the security exit program sets the group index to 4; otherwise, the process of FIGS. 19A-19B ends at step 1924. The termination of the process of FIGS. 19A-19B in step 1924 also follows step 1922.

FIGS. 20A-20E depict a flow diagram of an exemplary process for selecting and applying an accumulator adjustment value in step 724 of FIG. 7B and step 828 of FIG. 8B. The process of FIGS. 20A-20E utilizes the groups indicated by the group indexes set up in FIGS. 19A-19B. The accumulator adjustment value selection and application process begins at step 2000. If security exit program 116 (see FIG. 1) determines in step 2002 that the current transaction interval is less than the time interval associated with performance level 1 in table 1350 (see FIG. 13B), then the process of FIGS. 20A-20E continues with step 2004.

If security exit program 116 (see FIG. 1) determines in step 2004 that the group index set in the process of FIGS. 19A-19B is equal to 1, then in step 2006, the security exit program adds the accumulator adjustment value associated with performance level 1 (i.e., 50 in table 1600 of FIG. 16) to the accumulator; otherwise, the process of FIGS. 20A-20E continues with step 2008.

If security exit program 116 (see FIG. 1) determines in step 2008 that the group index set in the process of FIGS. 19A-19B is equal to 2, then in step 2010, the security exit program adds the accumulator adjustment value associated with performance level 2 (i.e., 33 in table 1600 of FIG. 16) to the accumulator; otherwise, the process of FIGS. 20A-20E continues with step 2012.

If security exit program 116 (see FIG. 1) determines in step 2012 that the group index set in the process of FIGS. 19A-19B is equal to 3, then in step 2014, the security exit program adds the accumulator adjustment value associated with performance level 3 (i.e., 17 in table 1600 of FIG. 16) to the accumulator; otherwise, the process of FIGS. 20A-20E continues with step 2016.

If security exit program 116 (see FIG. 1) determines in step 2016 that the group index set in the process of FIGS. 19A-19B is equal to 4, then in step 2018, the security exit program adds the accumulator adjustment value associated with performance level 4 (i.e., 8 in table 1600 of FIG. 16) to the accumulator; otherwise, the process of FIGS. 20A-20E ends at step 2020. The process of FIGS. 20A-20E also ends at step 2020 following step 2006, step 2010, step 2014 and step 2018. Returning to step 2002, if the current transaction interval is greater than or equal to the time interval associated with performance level 1 in table 1350 (see FIG. 13B), then the process of FIGS. 20A-20E continues with step 2022 of FIG. 20B.

If security exit program 116 (see FIG. 1) determines in step 2022 that the current transaction interval is less than the time interval associated with performance level 2 in table 1350 (see FIG. 13B), then the process of FIGS. 20A-20E continues with step 2024.

If security exit program 116 (see FIG. 1) determines in step 2024 that the group index set in the process of FIGS. 19A-19B is equal to 1, then in step 2026, the security exit program adds the accumulator adjustment value associated with performance level 2 (i.e., 33 in table 1600 of FIG. 16) to the accumulator; otherwise, the process of FIGS. 20A-20E continues with step 2028.

If security exit program 116 (see FIG. 1) determines in step 2028 that the group index set in the process of FIGS. 19A-19B is equal to 2, then in step 2030, the security exit program adds the accumulator adjustment value associated with performance level 2 (i.e., 33 in table 1600 of FIG. 16) to the accumulator; otherwise, the process of FIGS. 20A-20E continues with step 2032.

If security exit program 116 (see FIG. 1) determines in step 2032 that the group index set in the process of FIGS. 19A-19B is equal to 3, then in step 2034, the security exit program adds the accumulator adjustment value associated with performance level 3 (i.e., 17 in table 1600 of FIG. 16) to the accumulator; otherwise, the process of FIGS. 20A-20E continues with step 2036.

If security exit program 116 (see FIG. 1) determines in step 2036 that the group index set in the process of FIGS. 19A-19B is equal to 4, then in step 2038, the security exit program adds the accumulator adjustment value associated with performance level 4 (i.e., 8 in table 1600 of FIG. 16) to the accumulator; otherwise, the process of FIGS. 20A-20E ends at step 2040. The process of FIGS. 20A-20E also ends at step 2040 following step 2026, step 2030, step 2034 and step 2038. Returning to step 2022, if the current transaction interval is greater than or equal to the time interval associated with performance level 2 in table 1350 (see FIG. 13B), then the process of FIGS. 20A-20E continues with step 2042 of FIG. 20C.

If security exit program 116 (see FIG. 1) determines in step 2042 that the current transaction interval is less than the time interval associated with performance level 3 in table 1350 (see FIG. 13B), then the process of FIGS. 20A-20E continues with step 2044.

If security exit program 116 (see FIG. 1) determines in step 2044 that the group index set in the process of FIGS. 19A-19B is equal to 1, then in step 2046, the security exit program subtracts the accumulator adjustment value associated with performance level 1 (i.e., 50 in table 1600 of FIG. 16) from the accumulator; otherwise, the process of FIGS. 20A-20E continues with step 2048.

If security exit program 116 (see FIG. 1) determines in step 2048 that the group index set in the process of FIGS. 19A-19B is equal to 2, then in step 2050, the security exit program subtracts the accumulator adjustment value associated with performance level 2 (i.e., 33 in table 1600 of FIG. 16) from the accumulator; otherwise, the process of FIGS. 20A-20E continues with step 2052.

If security exit program 116 (see FIG. 1) determines in step 2052 that the group index set in the process of FIGS. 19A-19B is equal to 3, then in step 2054, the security exit program adds the accumulator adjustment value associated with performance level 3 (i.e., 17 in table 1600 of FIG. 16) to the accumulator; otherwise, the process of FIGS. 20A-20E continues with step 2056.

If security exit program 116 (see FIG. 1) determines in step 2056 that the group index set in the process of FIGS. 19A-19B is equal to 4, then in step 2058, the security exit program adds the accumulator adjustment value associated with performance level 4 (i.e., 8 in table 1600 of FIG. 16) to the accumulator; otherwise, the process of FIGS. 20A-20E ends at step 2060. The process of FIGS. 20A-20E also ends at step 2060 following step 2046, step 2050, step 2054 and step 2058. Returning to step 2042, if the current transaction interval is greater than or equal to the time interval associated with performance level 3 in table 1350 (see FIG. 13B), then the process of FIGS. 20A-20E continues with step 2062 of FIG. 20D.

If security exit program 116 (see FIG. 1) determines in step 2062 that the current transaction interval is less than the time interval associated with performance level 4 in table 1350 (see FIG. 13B), then the process of FIGS. 20A-20E continues with step 2064.

If security exit program 116 (see FIG. 1) determines in step 2064 that the group index set in the process of FIGS. 19A-19B is equal to 1, then in step 2066, the security exit program subtracts the accumulator adjustment value associated with performance level 1 (i.e., 50 in table 1600 of FIG. 16) from the accumulator; otherwise, the process of FIGS. 20A-20E continues with step 2068.

If security exit program 116 (see FIG. 1) determines in step 2068 that the group index set in the process of FIGS. 19A-19B is equal to 2, then in step 2070, the security exit program subtracts the accumulator adjustment value associated with performance level 2 (i.e., 33 in table 1600 of FIG. 16) from the accumulator; otherwise, the process of FIGS. 20A-20E continues with step 2072.

If security exit program 116 (see FIG. 1) determines in step 2072 that the group index set in the process of FIGS. 19A-19B is equal to 3, then in step 2074, the security exit program subtracts the accumulator adjustment value associated with performance level 3 (i.e., 17 in table 1600 of FIG. 16) from the accumulator; otherwise, the process of FIGS. 20A-20E continues with step 2076.

If security exit program 116 (see FIG. 1) determines in step 2076 that the group index set in the process of FIGS. 19A-19B is equal to 4, then in step 2078, the security exit program adds the accumulator adjustment value associated with performance level 4 (i.e., 8 in table 1600 of FIG. 16) to the accumulator; otherwise, the process of FIGS. 20A-20E ends at step 2080. The process of FIGS. 20A-20E also ends at step 2080 following step 2066, step 2070, step 2074 and step 2078. Returning to step 2062, if the current transaction interval is greater than or equal to the time interval associated with performance level 4 in table 1350 (see FIG. 13B), then the process of FIGS. 20A-20E continues with step 2082 of FIG. 20E.

Figure 20A:
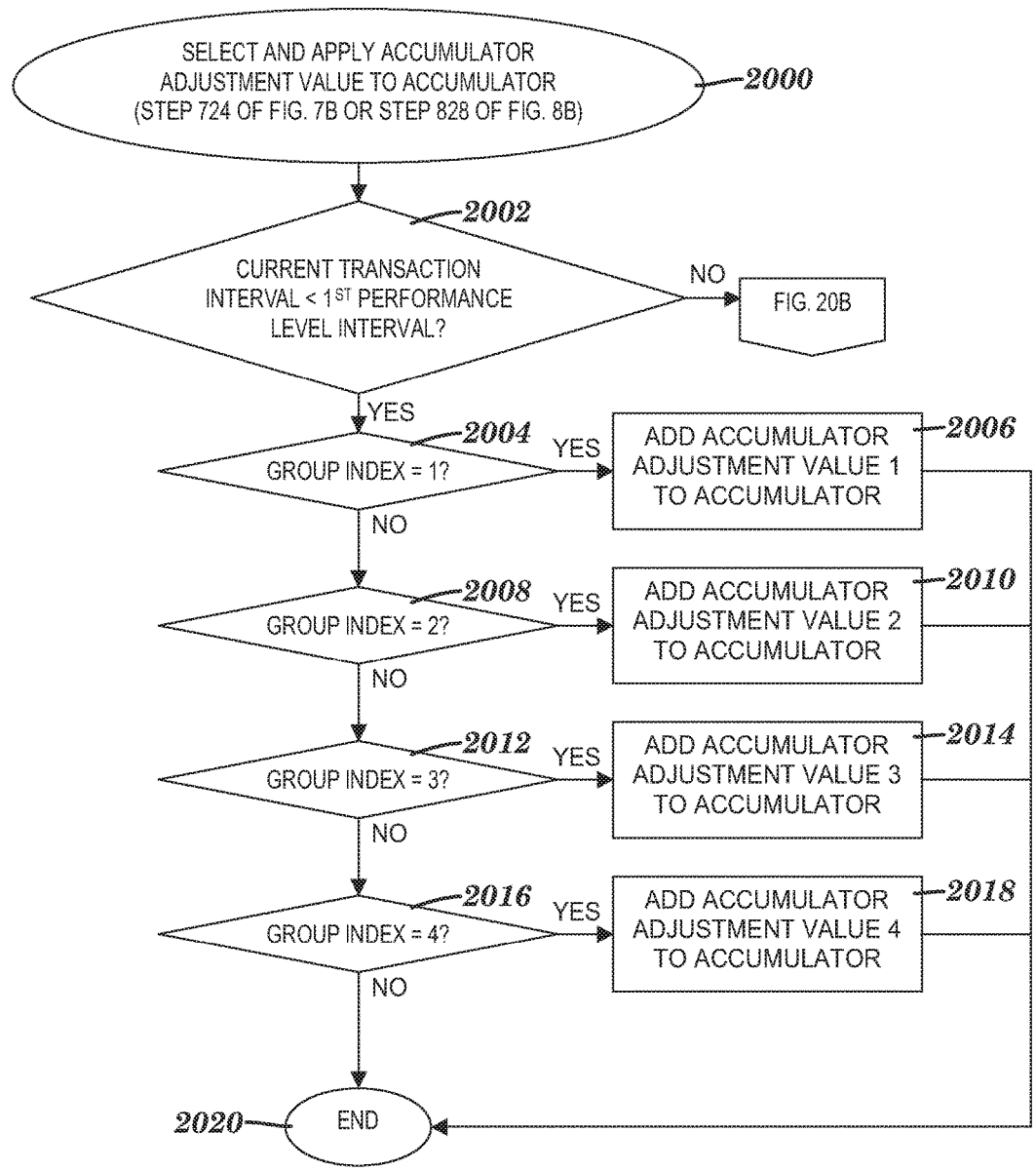
FIGS. 20A-20E depict a flow diagram of an accumulator adjustment value selection and application process included in the processes of FIG. 7B and FIG. 8B, in accordance with embodiments of the present invention.
Figure 20B:
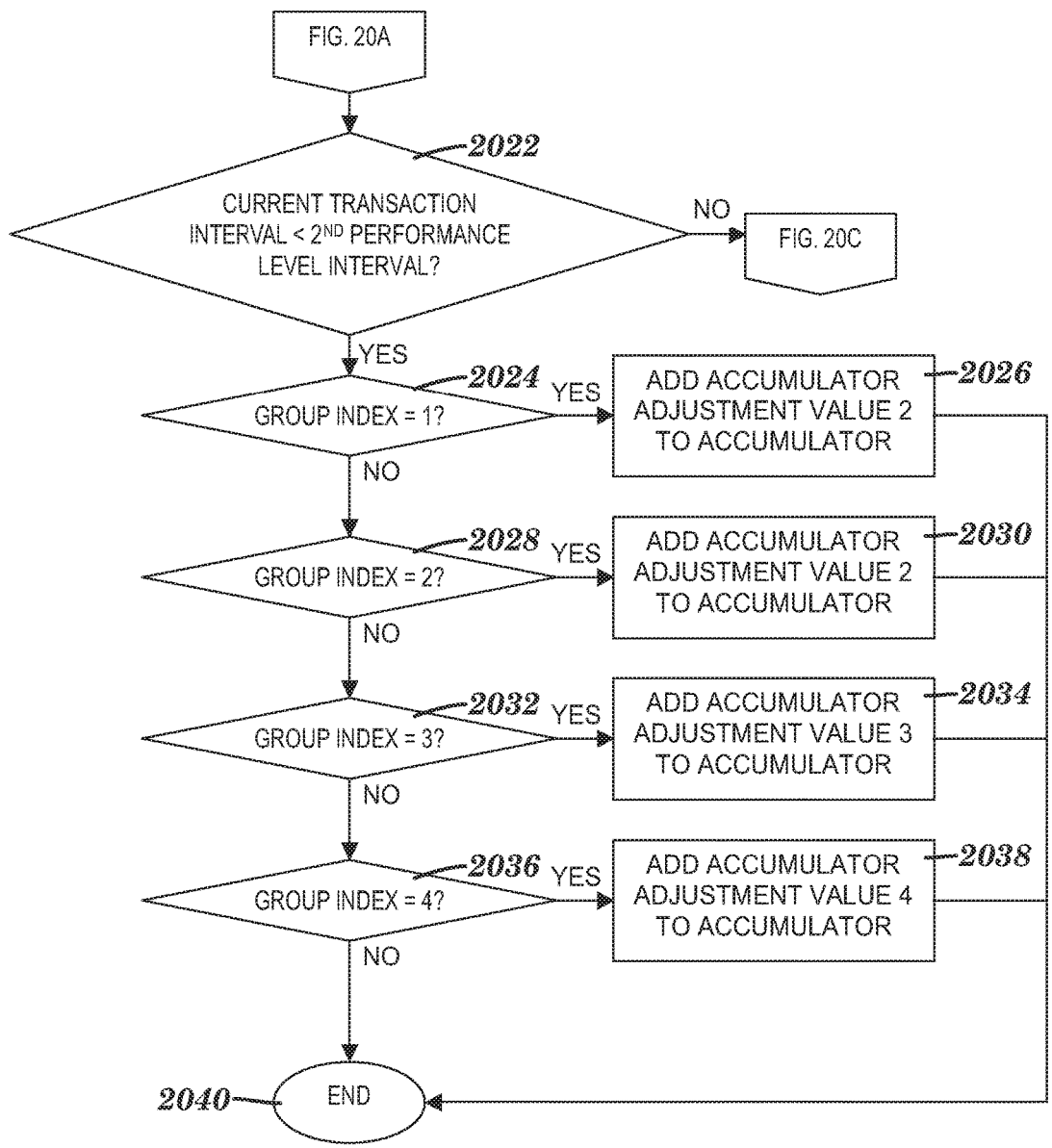
Figure 20C:
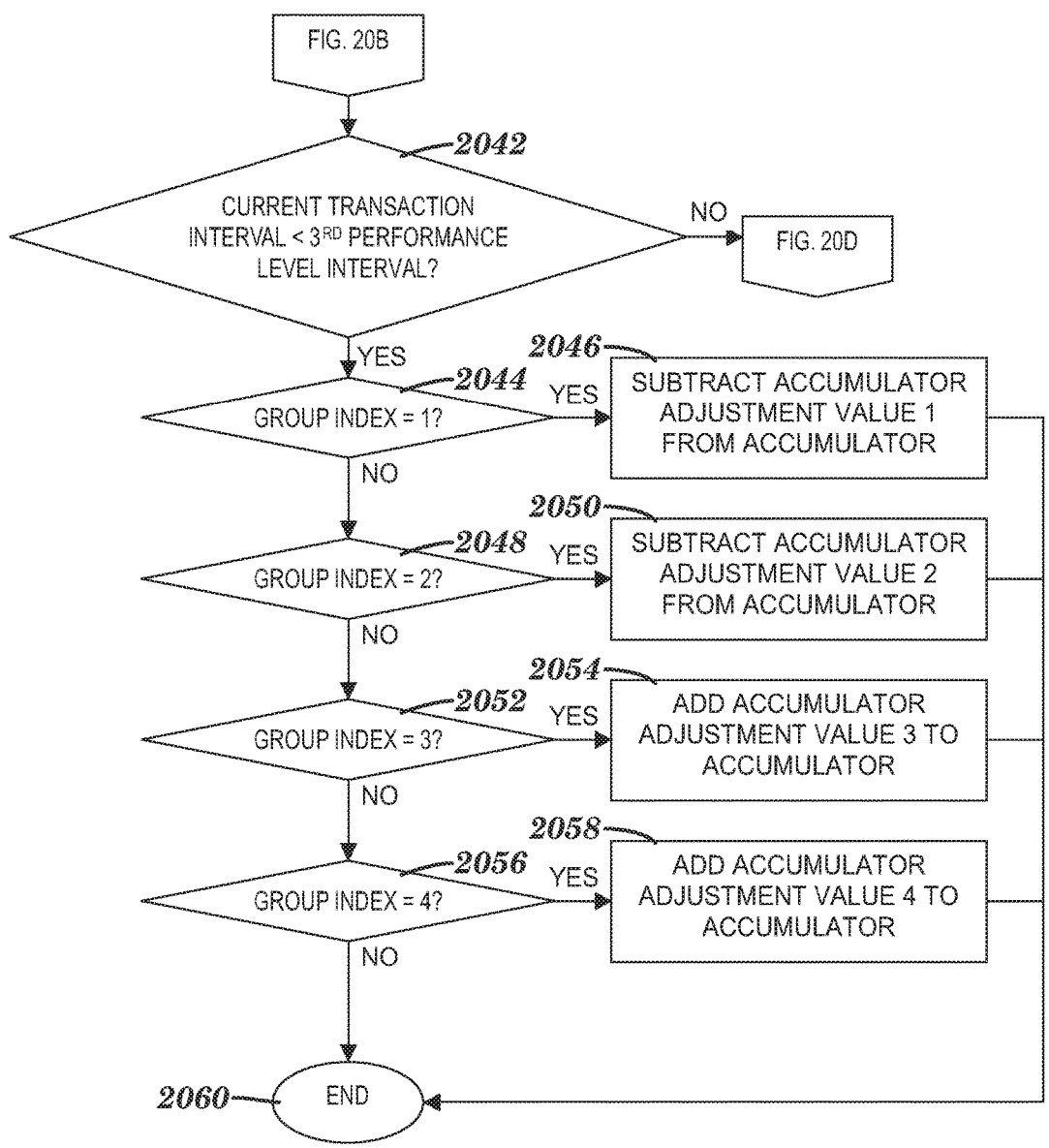
Figure 20D:
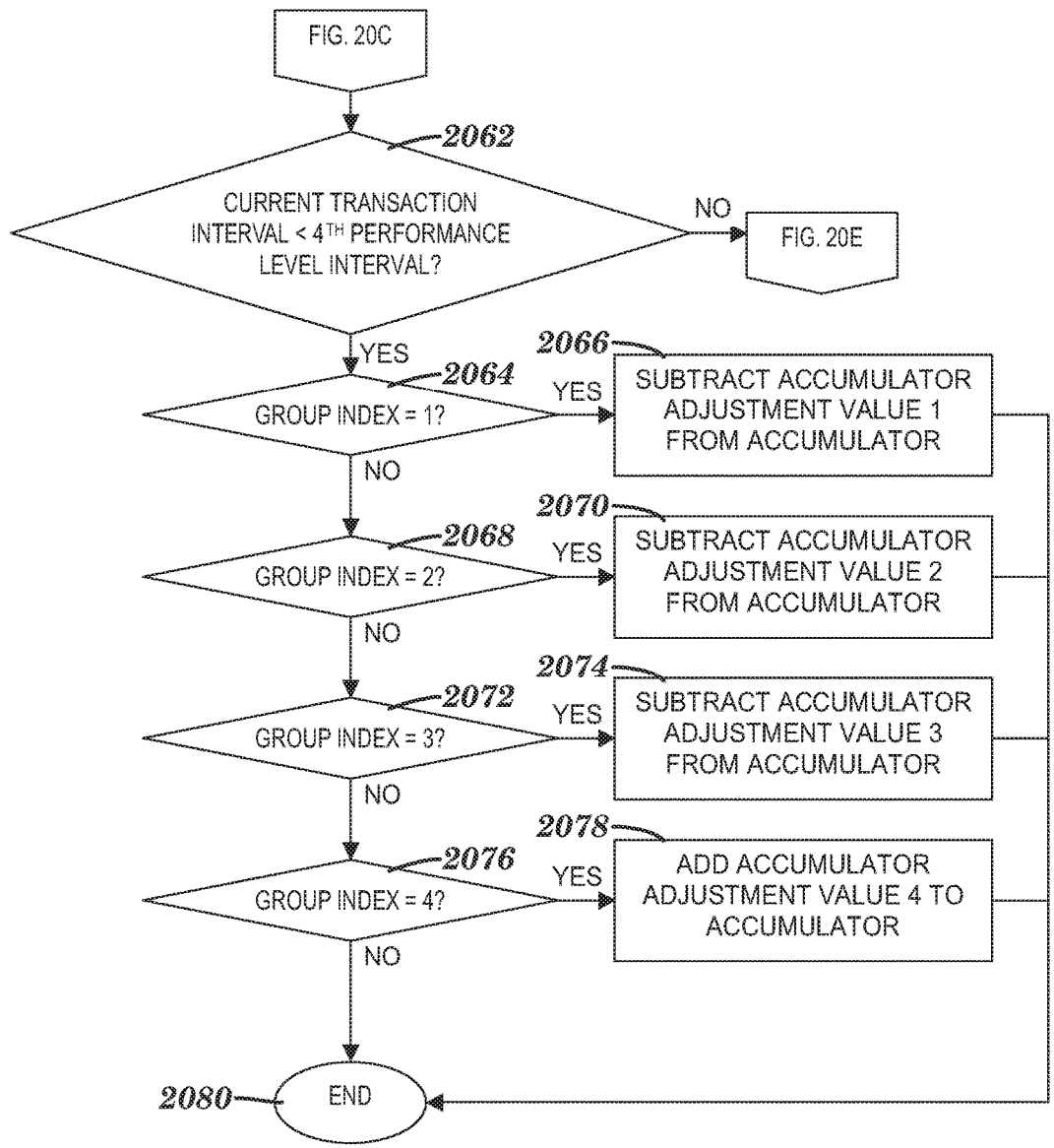
Figure 20E:
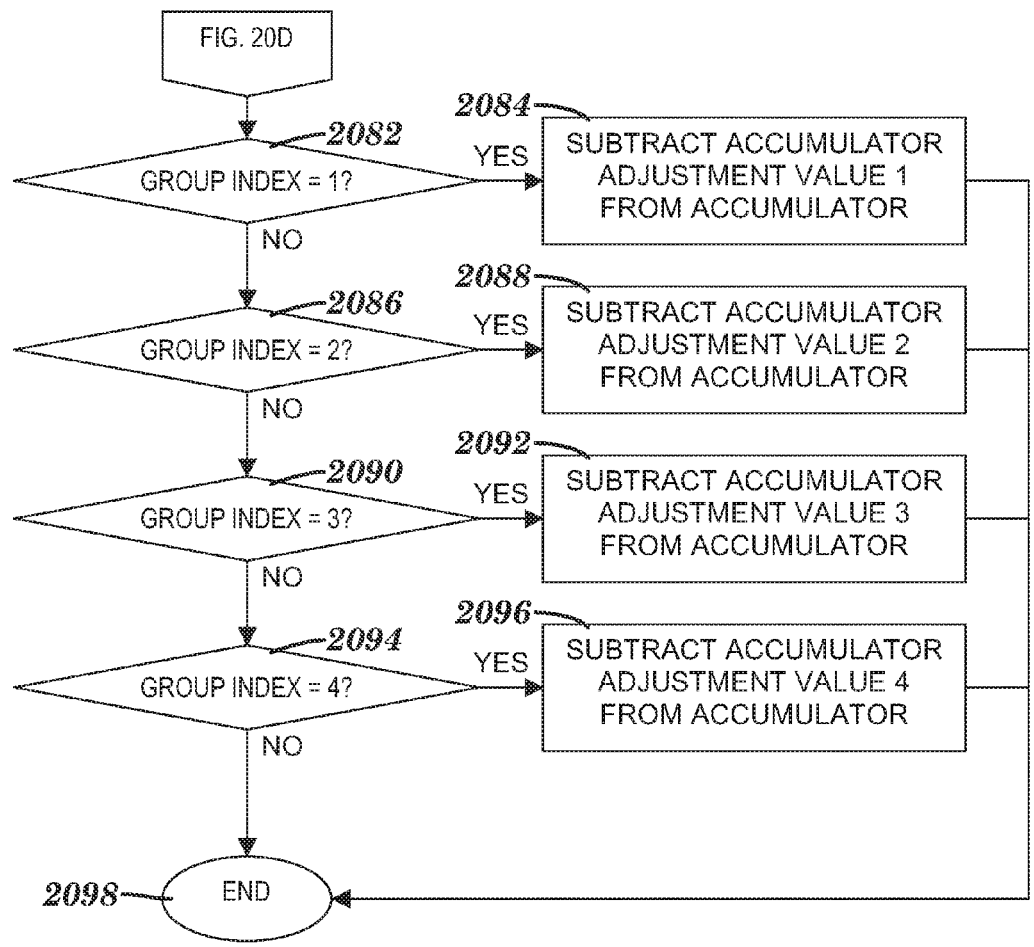

At step 2082, security exit program 116 (see FIG. 1) knows that the current transaction interval is greater than or equal to the time interval associated with performance level 4 in table 1350 (see FIG. 13B) because the No branches were taken at step 2002 (see FIG. 20A), step 2022 (see FIG. 20B), step 2042 (see FIG. 20C), and step 2062 (see FIG. 20D).

If security exit program 116 (see FIG. 1) determines in step 2082 that the group index set in the process of FIGS. 19A-19B is equal to 1, then in step 2084, the security exit program subtracts the accumulator adjustment value associated with performance level 1 (i.e., 50 in table 1600 of FIG. 16) from the accumulator; otherwise, the process of FIGS. 20A-20E continues with step 2086.

If security exit program 116 (see FIG. 1) determines in step 2086 that the group index set in the process of FIGS. 19A-19B is equal to 2, then in step 2088, the security exit program subtracts the accumulator adjustment value associated with performance level 2 (i.e., 33 in table 1600 of FIG. 16) from the accumulator; otherwise, the process of FIGS. 20A-20E continues with step 2090.

If security exit program 116 (see FIG. 1) determines in step 2090 that the group index set in the process of FIGS. 19A-19B is equal to 3, then in step 2092, the security exit program subtracts the accumulator adjustment value associated with performance level 3 (i.e., 17 in table 1600 of FIG. 16) from the accumulator; otherwise, the process of FIGS. 20A-20E continues with step 2094.

If security exit program 116 (see FIG. 1) determines in step 2094 that the group index set in the process of FIGS. 19A-19B is equal to 4, then in step 2096, the security exit program subtracts the accumulator adjustment value associated with performance level 4 (i.e., 8 in table 1600 of FIG. 16) to the accumulator; otherwise, the process of FIGS. 20A-20E ends at step 2098. The process of FIGS. 20A-20E also ends at step 2098 following step 2084, step 2088, step 2092 and step 2096.

In a first example (as shown above in the discussion of FIG. 16), the accumulator adjustment value of 50 is determined for 2000 performance level 1 transactions being sent in 20 seconds (i.e., being sent at 100 transactions/second) because 2000×50=100,000. As a second example in which the transactions alternate between performance level 1 transactions and performance level 2 transactions, the value of the accumulator first exceeds 100,000 after 2410 transactions—1205 transactions at the performance level 1 rate and 1205 transactions at the performance level 2 rate (i.e., (1205×50)+(1205×33)=100,015). Thus, reaching the temporary transaction halt threshold takes longer in the second example than in the first example, because half of the transactions in the second example have transaction rates of less than 100 transactions/second.

FIG. 21 is an exemplary table 2100 of accumulator adjustments as determined by the process of FIGS. 20A-20E, in accordance with embodiments of the present invention. Each row entry in table 2100 includes a current transaction interval level (i.e., the performance level associated with a current transaction interval or a steady state level) for a user ID or network address, a group from table 1800 (see FIG. 18) representing the accumulated, historical transaction intervals of a user ID or network address, and the arithmetic operation performed on the accumulator with the accumulator adjustment value that is associated with the current transaction interval level and the group. Thus, table 2100 is used to determine whether to add to the value of the accumulator as the transaction rate increases or is sustained at a single performance level, or to subtract from the value of the accumulator as the transaction rate is reduced. For example, if the accumulated, historical transaction intervals are in group 4, but the current transaction interval is associated with performance level 1, then 8 is added to the value of the accumulator, as shown in the fourth data row of table 2100.

A steady state level indicates that the transaction rate is lower than the rate associated with performance level 4 (i.e., lower than 10 transactions/second). Table 2100 also indicates that a current transaction interval greater than the reset time interval causes the value of the accumulator and all of the performance level counters to be reset to zero.

Warning Return Codes

As the user ID accumulator or network address accumulator reaches the warning threshold in table 1100 (see FIG. 11) (i.e., 70% of 100,000 or 70,000), the server computing unit 102 (see FIG. 1) starts sending a return code to the client computing unit (e.g., client computing unit 104 of FIG. 1) to warn the client computing unit that the frequency of requests from the user ID or the network address needs to decrease or else thresholds that will cause delay and halt actions will be reached.

Delay Mechanism

As the accumulator reaches the delay threshold in table 1100 (see FIG. 11) (i.e., 90% of 100,000 or 90,000), a delay in the processing is set by security exit program 116 (see FIG. 1). In one embodiment, this delay in the processing is implemented through a CICS socket interface by updating a field in the common area exchanged between the listener program 112 (see FIG. 1) and the security exit program 116 (see FIG. 1) to indicate a start of a delay time interval before the sub task is initiated by the listener program. In table 1200 (see FIG. 12), the delay time interval is one second.

The delay in processing has a throttling or governor effect on the client computing unit by slowing the client computing unit's transaction rate, holding the client at the value of 90% of 100,000 in the accumulator. This throttling or governor effect occurs no matter what transaction rate is present when the accumulator reaches the delay threshold, except for concurrent sessions which are discussed in the next section.

If a client computing unit had been sending transactions at a steady rate (i.e., no matter what the rate), then the accumulator will be increased by the same accumulator adjustment value up to the point of reaching the delay threshold. As soon as the delay threshold is reached by the accumulator, the delay is added to the response time. Thus, the next transaction arrives at a steady state level, which is lower than the transaction rate of performance level 4 of table 1000 (see FIG. 10). Since the delay causes the next transaction to arrive at the steady state level, the same accumulator adjustment value that had been added to reach the delay threshold is now subtracted from the accumulator. If the client computing unit keeps sending in transactions at the steady rate that caused the delay threshold to be reached, the client experiences an alternating fast and slow response from server computing unit 102 (see FIG. 1) as the value of the accumulator toggles between 90% of 100,000 (i.e., a delayed state) and a substantially small amount less than 90% of 100,000 (i.e., a non-delayed state).

If a client computing unit has been sending transactions at varying rates (i.e., at varying transaction intervals), the various rates are "averaged" so that the accumulated history of varying transaction intervals is identified as one of the groups in table 1800 (see FIG. 18). Given the group associated with the varying transaction intervals, a specific accumulator adjustment value is selected in table 2100 (see FIG. 21) as the delay threshold is reached. After reaching the delay threshold, the selected group remains the same, so that the same accumulator adjustment value is selected and used to decrement the accumulator following the application of the delay.

Bypassing the Delay Threshold

The throttling or governor effect provided by the delay mechanism prevents the accumulator from exceeding the delay threshold in a single-threaded client environment. The value of the accumulator, however, may continue to increase beyond the delay threshold in an environment in a multi-tasking server environment in which a client (e.g., client computing unit 104 of FIG. 1) sends concurrent requests to the server. In a multi-tasking server environment provided by, for example, a CICS transaction processing system, multiple client requests are handled concurrently because listener 112 (see FIG. 1) creates subtasks to process each request. Typically, the subtasks take longer to process the request for access to application program 114 (see FIG. 1) than the processing time of listener 112 (see FIG. 1), including the processing of the security exit program 116 (see FIG. 1). A multi-tasking client computing unit that sends concurrent requests to server computing unit 102 (see FIG. 1) may undermine the delay mechanism. During the delay for the first transaction that experiences the delay, additional, multi-tasked transactions are received from the same client computing unit and those additional transactions are not subject to the delay. The additional transactions arrive within a time interval that causes an increase in the value of the accumulator, thereby allowing the value of the accumulator to increase beyond the delay threshold.

As one example using the thresholds of table 1100 (see FIG. 11) and the control parameters of table 1200 (see FIG. 12), a client computing unit is sending transactions to a server computing unit at a rate of 100 transactions/second and is utilizing 100 concurrent connections for the transactions. After the client computing unit sends 1800 transactions in 18 seconds, the delay of one second is activated because the accumulator reaches the delay threshold of 90% of 100,000. Within the one second delay, 100 transactions arrive at the server computing unit from the client computing unit. Each of the 100 arriving transactions have a current transaction interval of 10 milliseconds (see FIG. 13B) relative to each other. Thus, the current transaction interval level is 1 and the group in table 1800 (see FIG. 18) is 1. Using table 2100 (see FIG. 21), a current transaction interval level of 1 and a group of 1 indicates an accumulator adjustment of adding the accumulator adjustment value of 50 to the accumulator for each of the 100 transactions, resulting in an accumulator increase of 50×100 or 5000. At the end of the one second delay time interval, another 100 transactions are received by the server computing unit, resulting in the value of the accumulator increasing 5000 per second. Starting at the 90% of 100,000 threshold level (i.e., 90,000), the value of the accumulator reaches 100,000 in 2 seconds, thereby causing the temporary transaction halt threshold to be reached. In response to reaching the temporary transaction halt threshold, all transactions from the client are rejected for a cool down period of one minute (i.e., the one minute reset time interval in table 1200 of FIG. 12). During the cool down period of one minute, the client computing unit experiences 100 transactions/second×60 seconds or 6000 transaction rejections, which appears to the client computing unit as a server computing unit outage. The client computing unit recognition of the warning and halt return codes are described below in the Client Responsibility section.

Maximum Concurrent Connections

The concurrent connection limit (a.k.a. maximum concurrent sessions) in table 1200 (see FIG. 12) and the concurrent connection checks in steps 408 and 410 of FIG. 4A limit the number of concurrent requests sent by a client computing unit (e.g., client computing unit 104 of FIG. 1). Once the concurrent connection limit is reached all additional concurrent connections are rejected with a unique return code. Using the example in the previous section, the client computing unit sending 100 transactions per second is limited to 10 concurrent requests per second according to the concurrent connection limit in table 1200 of FIG. 12. Pushing through 10 transactions per second on each of the concurrent sessions allows the client computing unit to reach 100 transactions/second, but only up to the point at which the accumulator reaches the delay threshold. Upon reaching the delay threshold, the rate is then reduced to 10 transactions/second, with each transaction delayed for 1 second. Security exit program 116 (see FIG. 1) calculates the transaction rate at 10 transactions/second, which is a performance level 4 rate (i.e., the current transaction interval level for each delayed transaction is level 4). Since the counter for performance level 1 includes the counts for all of the accumulated transaction intervals, the group in table 1800 (see FIG. 18) is group 1. Using a current transaction interval level 4 and group 1 in table 2100 (see FIG. 21), each delayed transaction causes the accumulator to be decremented by the accumulator adjustment value for performance level 1 (i.e., 50). The aforementioned decrementing of the accumulator causes the accumulator to drop below the 90% of 100,000 delay threshold and allows faster response times, which in turn activates the governor throttling effect that holds the client computing unit to the 90% of 100,000 threshold level.

By carefully tuning the concurrent connection limit, the server computing unit is protected from excessive processing requests that can exhaust the resources of the server computing unit, while allowing maximum throughput for client computing units.

Client Responsibility

It is necessary for clients who program to an interface of server computing unit 102 (see FIG. 1) to understand the limiting controls that are described herein, and be programmed accordingly. For example, the client computing unit (e.g., client computing unit 104 of FIG. 1) is programmed to implement slowdown actions in response to receiving a warning return code that is set in step 742 (see FIG. 7C) or step 846 (see FIG. 8C). Further, when a delay is imposed by step 746 (see FIG. 7D) or step 850 (see FIG. 8D), a noticeable response time reduction may be perceived by users of the client computing unit. Still further, when the concurrent connection limit is reached in step 408 or step 410 of FIG. 4A, some transactions fail while others are successfully processed. The failed transactions have a return code that indicates that too many concurrent sessions have occurred, and in one embodiment, the client computing unit is programmed to queue up the failed requests for retry and perform a processing slowdown to prevent future rejections (e.g., by monitoring and limiting the concurrent requests to server computing unit 102 of FIG. 1). Further yet, the client computing unit is programmed to recognize and handle a halt return code followed by a total rejection of all requests from the client for the reset time interval (e.g., 1 minute in FIG. 12). If the halt return code is ignored by the client, such a rejection of requests appears as a total outage at server computing unit 102 (see FIG. 1), which may cause requests for support on the server computing unit even though the source of the problem is the client.

The process of controlling client access to server application program 114 (see FIG. 1) described herein protects the server computing unit 102 (see FIG. 1) from three abnormal conditions, which are described below. In any of the three conditions described below, server computing unit 102 (see FIG. 1) handles a substantially high rate of transactions through, for example, a TCP/IP interface whether the transactions are valid or not. As long as the listener 112 (see FIG. 1) is monitoring the TCP/IP port, the listener must respond to every network request.

The first condition is herein referred to as a batch program, which is constructed on a client (e.g., computing system 104 of FIG. 1) to make a substantial number of repetitive requests of server computing unit 102 (see FIG. 1), often in a logical, sequential manner. A batch program used to browse or cull information from a database coupled to server computing unit 102 (see FIG. 1) runs at a very high rate, as fast as the client can run, and is typically designed in a form of a program loop until the end of the database records is reached. Such a batch program is logical and orderly in its requests, requests information at a substantially high rate, often runs unregulated on the client end, and therefore must be regulated by server computing unit 102 (see FIG. 1).

The second condition is a client (e.g., client computing unit 104 of FIG. 1) that experiences a runaway situation in a program that causes a loop to occur which includes sending the same or similar transactions to the server at a substantially high rate. The recursive transactions may be legitimate transactions that require normal processing by the application program on server computing unit 102 (see FIG. 1), or may be defective or incomplete transaction requests that still require error processing. Such a problem related to defective or incomplete transaction requests often goes undetected by the client users or operators and therefore can consume a large amount of resources without anyone having knowledge of the problem.

The third condition is a denial of service attack, where a client (e.g., client computing unit 104 of FIG. 1) is maliciously constructed to send an extreme amount of either valid or useless transactions in a substantially short period of time in order to overrun server computing unit 102 (see FIG. 1) and make the server unavailable to all other users. Network monitors implemented to detect denial of service attacks are tuned to protect network designs. The present invention protects application program 114 (see FIG. 1) on server computing unit 102 (see FIG. 1) at a level of parameters that are appropriate for the resources that are available to the server computing unit, not the network 110 (see FIG. 1).

Computing System

Figure 22:
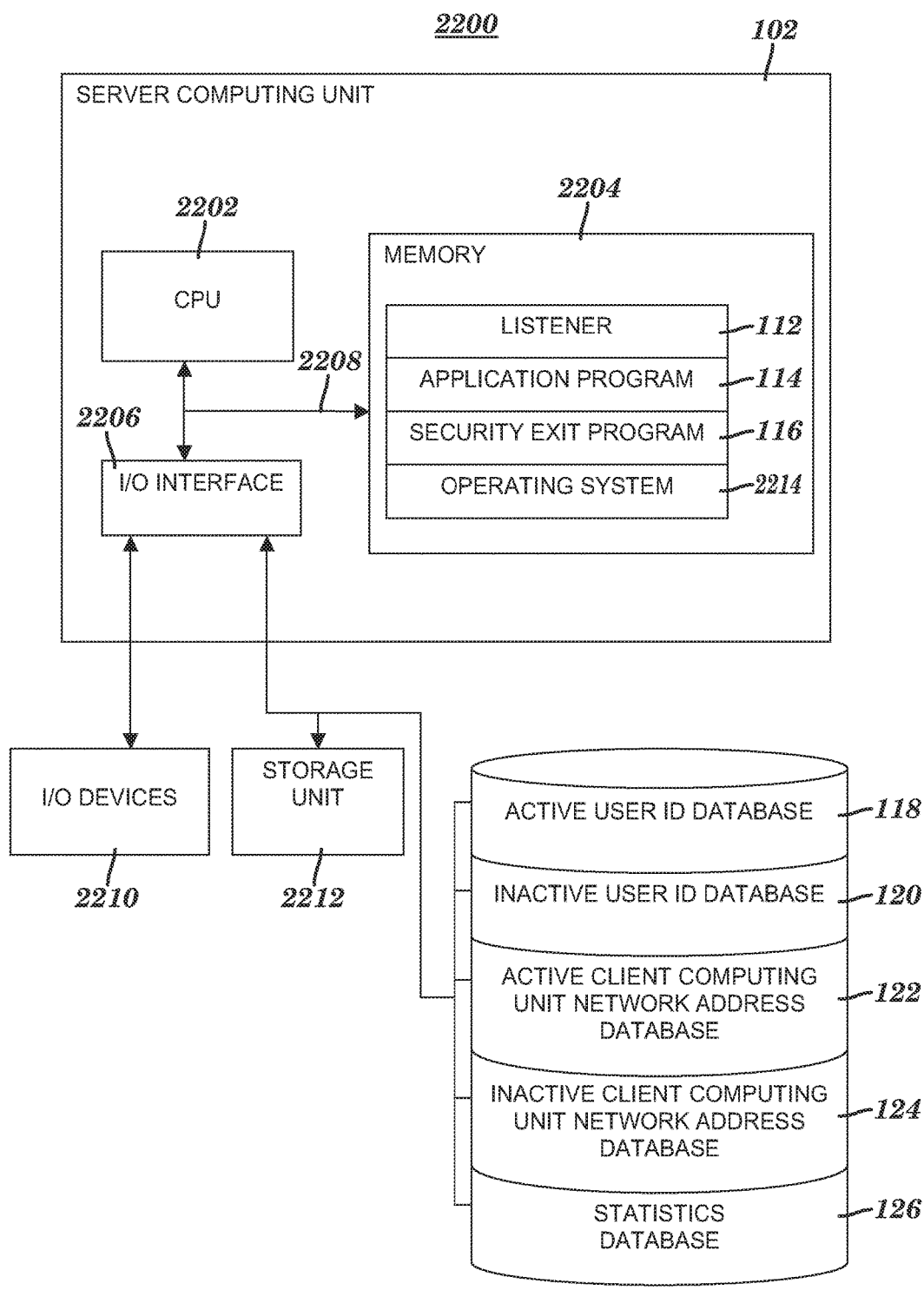
FIG. 22 is a block diagram of a computing system that is included in the system of FIG. 1 and that implements the process of FIGS. 2A-2B, in accordance with embodiments of the present invention.

FIG. 22 is a block diagram of a computing system 2200 that is included in the system of FIG. 1 and that implements the process of FIGS. 2A-2B, in accordance with embodiments of the present invention. Server computing unit 102 generally comprises a central processing unit (CPU) 2202, a memory 2204, an input/output (I/O) interface 2206, and a bus 2208. Computing system 2200 includes I/O devices 2210, and a storage unit 2212. Furthermore, computing system 2200 includes active user ID database 118, inactive user ID database 120, active network address database 122, inactive network address database 124 and statistics database 126 coupled to server computing unit 102. In another embodiment, one or more of databases 118, 120, 122, 124 and 126 are included in storage unit 2212. CPU 2202 performs computation and control functions of server computing unit 102. CPU 2202 may comprise a single processing unit, or be distributed across one or more processing units in one or more locations (e.g., on a client and server).

Memory 2204 may comprise any known type of data storage and/or transmission media, including bulk storage, magnetic media, optical media, random access memory (RAM), read-only memory (ROM), a data cache, a data object, etc. Cache memory elements of memory 2204 provide temporary storage of at least some program code in order to reduce the number of times code must be retrieved from bulk storage during execution. Storage unit 2212 is, for example, a magnetic disk drive or an optical disk drive that stores data. Moreover, similar to CPU 2202, memory 2204 may reside at a single physical location, comprising one or more types of data storage, or be distributed across a plurality of physical systems in various forms. Further, memory 2204 can include data distributed across, for example, a LAN, WAN or storage area network (SAN) (not shown).

I/O interface 2206 comprises any system for exchanging information to or from an external source. I/O devices 2210 comprise any known type of external device, including a display monitor, keyboard, mouse, printer, speakers, handheld device, printer, facsimile, etc. Bus 2208 provides a communication link between each of the components in server computing unit 102, and may comprise any type of transmission link, including electrical, optical, wireless, etc.

I/O interface 2206 also allows server computing unit 102 to store and retrieve information (e.g., program instructions or data) from an auxiliary storage device (e.g., storage unit 2212). The auxiliary storage device may be a non-volatile storage device (e.g., a CD-ROM drive which receives a CD-ROM disk). Server computing unit 102 can store and retrieve information from other auxiliary storage devices (not shown), which can include a direct access storage device (DASD) (e.g., hard disk or floppy diskette), a magneto-optical disk drive, a tape drive, or a wireless communication device.

Memory 2204 includes program code relative to the client access control process disclosed herein, including listener 112, application program 114, and security exit program 116. Further, memory 2204 includes an operating system 2214 (e.g., Linux) that runs on CPU 2202 and provides control of various components within and/or connected to server computing unit 102.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code 116 and/or program code 112 for use by or in connection with a computing system 2200 or any instruction execution system to provide and facilitate the capabilities of the present invention. For the purposes of this description, a computer-usable or computer-readable medium can be any apparatus that can contain, store, communicate, propagate, or transport the program for use by or in connection with the instruction execution system, apparatus, or device. The program code 112 and program code 116 are stored on the computer-readable disk storage unit 2212 for execution by CPU 2202 via the computer-readable RAM 2204.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, RAM 2204, ROM, a rigid magnetic disk and an optical disk. Current examples of optical disks include compact disk-read-only memory (CD-ROM), compact disk-read/write (CD-R/W) and DVD.

Any of the components of the present invention can be deployed, managed, serviced, etc. by a service provider that offers to deploy or integrate computing infrastructure with respect to the method of controlling client access to a server application. Thus, the present invention discloses a process for supporting computer infrastructure, comprising integrating, hosting, maintaining and deploying computer-readable code into a computing system (e.g., computing system 2200), wherein the code in combination with the computing unit is capable of performing a method of controlling client access to a server application.

In another embodiment, the invention provides a business method that performs the process steps of the invention on a subscription, advertising and/or fee basis. That is, a service provider, such as a Solution Integrator, can offer to create, maintain, support, etc. a method of controlling client access to a server application. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

The flow diagrams depicted herein are provided by way of example. There may be variations to these diagrams or the steps (or operations) described herein without departing from the spirit of the invention. For instance, in certain cases, the steps may be performed in differing order, or steps may be added, deleted or modified. All of these variations are considered a part of the present invention as recited in the appended claims.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method of controlling a rate at which requests from a client computer will be received by a server application, executed on a server computer, for processing, the method comprising the steps of:
   the server computer receiving a multiplicity of requests at a respective multiplicity of different times from the client computer and measuring a multiplicity of time intervals between different pairs of successive requests of the multiplicity of requests;
   the server computer determining each time interval in the multiplicity of time intervals is within a predefined range of time intervals; and
   based in part on each time interval in the multiplicity of time intervals being within the predefined range, the server computer determining and blocking a denial of service attack or an overload of requests from the client computer.

2. The method of claim 1, further comprising the steps of:
   the server computer determining a first count of requests in the multiplicity of requests;
   the server computer receiving another multiplicity of requests at a respective other multiplicity of times from the client computer, the other multiplicity of requests being different from the multiplicity of requests and the other multiplicity of times being different from the multiplicity of times;
   the server computer determining a second count of requests in the other multiplicity of requests; and
   the server computer determining the first count is greater than the second count,
   wherein the step of blocking the denial of service attack or the overload of requests from the client computer is based in part on the first count being greater than the second count.

3. The method of claim 1, wherein the step of blocking the denial of service attack or the overload of requests from the client computer includes sending a warning return code to indicate an excessive usage of the server application and warn the client computer to decrease a rate at which the client computer sends subsequent requests to the server computer.

4. The method of claim 1, wherein the step of blocking the denial of service attack or the overload of requests from the client computer includes delaying a processing of a current request from the client computer for a predefined delay time interval.

5. The method of claim 1, wherein the step of blocking the denial of service attack or the overload of requests from the client computer includes temporarily halting a processing of subsequent requests from the client computer until an end of a predefined reset time interval.

6. The method of claim 1, wherein the step of blocking the denial of service attack or the overload of requests from the client computer includes:
   terminating a connection between the client computer and the server computer; and
   permanently denying subsequent requests from the client computer.

7. The method of claim 1, further comprising the step of:
   providing at least one support service for at least one of creating, integrating, hosting, maintaining, and deploying computer readable program code in the computer, the program code being executed by a processor of the computer to implement the steps of receiving the multiplicity of requests, measuring the multiplicity of time intervals between different pairs of successive requests of the multiplicity of requests, determining each time interval in the multiplicity of time intervals is within the predefined range of time intervals, and determining and blocking the denial of service attack or the overload of requests from the client computer.

8. A computer program product for controlling a rate at which requests from a client computer will be received by a server application, executed on a server computer, for processing, the computer program product comprising one or more computer-readable storage devices having program instructions stored on the one or more computer-readable storage devices, the program instructions comprising:
   program instructions to receive a multiplicity of requests at a respective multiplicity of different times from the client computer and to measure a multiplicity of time intervals between different pairs of successive requests of the multiplicity of requests;
   program instructions to determine each time interval in the multiplicity of time intervals is within a predefined range of time intervals; and
   program instructions to determine and block, based in part on each time interval in the multiplicity of time intervals being within the predefined range, a denial of service attack or an overload of requests from the client computer.

9. The computer program product of claim 8, wherein the program instructions stored on the one or more computer-readable storage devices further comprise:
   program instructions to determine a first count of requests in the multiplicity of requests;
   program instructions to receive another multiplicity of requests at a respective other multiplicity of times from the client computer, the other multiplicity of requests being different from the multiplicity of requests and the other multiplicity of times being different from the multiplicity of times;
   program instructions to determine a second count of requests in the other multiplicity of requests; and
   program instructions to determine the first count is greater than the second count,
   wherein the program instructions to block the denial of service attack or the overload of requests from the client computer block the denial of service attack or the overload of requests based in part on the first count being greater than the second count.

10. The computer program product of claim 8, wherein the program instructions to block the denial of service attack or the overload of requests from the client computer include program instructions to send a warning return code to indicate an excessive usage of the server application and warn the client computer to decrease a rate at which the client computer sends subsequent requests to the server computer.

11. The computer program product of claim 8, wherein the program instructions to block the denial of service attack or the overload of requests from the client computer include program instructions to delay a processing of a current request from the client computer for a predefined delay time interval.

12. The computer program product of claim 8, wherein the program instructions to block the denial of service attack or the overload of requests from the client computer include program instructions to temporarily halt a processing of subsequent requests from the client computer until an end of a predefined reset time interval.

13. The computer program product of claim 8, wherein the program instructions to block the denial of service attack or the overload of requests from the client computer includes:
   program instructions to terminate a connection between the client computer and the server computer; and
   program instructions to permanently deny subsequent requests from the client computer.

14. A computer system comprising:
   a central processing unit (CPU);
   a memory coupled to the CPU; and
   a computer-readable storage device coupled to the CPU, the computer-readable storage device containing instructions that are executed by the CPU via the memory to implement a method of controlling a rate at which requests from a client computer will be received by a server application, executed on a server computer, for processing, the method comprising the steps of:
   the server computer receiving a multiplicity of requests at a respective multiplicity of different times from the client computer and measuring a multiplicity of time intervals between different pairs of successive requests of the multiplicity of requests;
   the server computer determining each time interval in the multiplicity of time intervals is within a predefined range of time intervals; and
   based in part on each time interval in the multiplicity of time intervals being within the predefined range, the server computer determining and blocking a denial of service attack or an overload of requests from the client computer.

15. The computer system of claim 14, wherein the method further comprises the steps of:
   the server computer determining a first count of requests in the multiplicity of requests;
   the server computer receiving another multiplicity of requests at a respective other multiplicity of times from the client computer, the other multiplicity of requests being different from the multiplicity of requests and the other multiplicity of times being different from the multiplicity of times;
   the server computer determining a second count of requests in the other multiplicity of requests; and
   the server computer determining the first count is greater than the second count,
   wherein the step of blocking the denial of service attack or the overload of requests from the client computer is based in part on the first count being greater than the second count.

16. The computer system of claim 14, wherein the step of blocking the denial of service attack or the overload of requests from the client computer includes sending a warning return code to indicate an excessive usage of the server application and warn the client computer to decrease a rate at which the client computer sends subsequent requests to the server computer.

17. The computer system of claim 14, wherein the step of blocking the denial of service attack or the overload of requests from the client computer includes delaying a processing of a current request from the client computer for a predefined delay time interval.

18. The computer system of claim 14, wherein the step of blocking the denial of service attack or the overload of requests from the client computer includes temporarily halting a processing of subsequent requests from the client computer until an end of a predefined reset time interval.

19. The computer system of claim 14, wherein the step of blocking the denial of service attack or the overload of requests from the client computer includes:
   terminating a connection between the client computer and the server computer; and
   permanently denying subsequent requests from the client computer.

* * * * *